(12) United States Patent
Liu et al.

(10) Patent No.: US 12,281,888 B2
(45) Date of Patent: Apr. 22, 2025

(54) OPTICALLY COMPUTED PHASE MICROSCOPY

(71) Applicant: New Jersey Institute of Technology, Newawrk, NJ (US)

(72) Inventors: Xuan Liu, Berkeley Heights, NJ (US); Yuwei Liu, Harrison, NJ (US); Yuanwei Zhang, New Providence, NJ (US); Zhaoxiong Wan, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 111 days.

(21) Appl. No.: 17/984,726

(22) Filed: Nov. 10, 2022

(65) Prior Publication Data
US 2024/0068803 A1  Feb. 29, 2024

Related U.S. Application Data

(60) Provisional application No. 63/277,668, filed on Nov. 10, 2021.

(51) Int. Cl.
*G01B 11/24* (2006.01)
*G02B 21/00* (2006.01)
*G02B 21/36* (2006.01)

(52) U.S. Cl.
CPC ...... *G01B 11/2441* (2013.01); *G02B 21/0056* (2013.01); *G02B 21/008* (2013.01); *G02B 21/364* (2013.01)

(58) Field of Classification Search
CPC ............ G01B 11/2441; G02B 21/0056; G02B 21/008; G02B 21/364; G02B 21/14
See application file for complete search history.

(56) References Cited

U.S. PATENT DOCUMENTS 5,194,918 A  *  3/1993  Kino .................. G01B 9/02084
                                                    382/280
8,169,620 B1 *  5/2012  Stahl .................. G01B 9/02041
                                                    356/513
(Continued)

OTHER PUBLICATIONS

Zernike F, How I discovered phase contrast. Science 121, 345-349 (1955).
(Continued)

*Primary Examiner* — Tarifur R Chowdhury
*Assistant Examiner* — Akbar H. Rizvi
(74) *Attorney, Agent, or Firm* — McCarter & English, LLP

(57) ABSTRACT

Optically computed phase imaging systems and methods are provided. An example system includes an interferometer configured to output 3D spatial-spectral data of a sample including an interferometric signal and an optical computation assembly having a spatial light modulator configured to modulate the 3D spatial-spectral data with a modulation pattern. The modulation pattern modulates the interferometric signal along a spectral dimension to select a depth to obtain a sample signal at the selected depth and modulates the interferometric signal along a first spatial dimension to create a waveform to facilitate phase extraction. The system further includes a detector configured to detect 2D spatial data of the sample. The system further includes a processor coupled to a memory, the processor configured to process the 2D spatial data to extract phase information of the sample.

28 Claims, 42 Drawing Sheets
(20 of 42 Drawing Sheet(s) Filed in Color)

(56) References Cited

U.S. PATENT DOCUMENTS

| | | | |
|---|---|---|---|
| 9,389,069 B2* | 7/2016 | Bloom | G01B 11/2527 |
| 2015/0153163 A1* | 6/2015 | Dresel | G01B 11/2441 |
| | | | 356/511 |
| 2018/0275097 A1* | 9/2018 | Sandoghdar | G01N 15/1484 |
| 2019/0162520 A1* | 5/2019 | Shaked | G01B 11/2441 |
| 2020/0278527 A1* | 9/2020 | Shiraishi | G02B 21/245 |
| 2021/0080742 A1* | 3/2021 | Ruan | G02B 26/105 |
| 2021/0267457 A1* | 9/2021 | Liu | G06E 3/003 |

OTHER PUBLICATIONS

Allen et al., The Zeiss-Nomarski differential interference equipment for transmitted-light microscopy. Zeitschrift fur wissenschaftliche Mikroskopie und mikroskopische Technik 69, 193-221 (1969).
Weiner et al. The nature of enzyme catalysis in trypsin. Proceedings of the National Academy of Sciences 83, 649-653 (1986).
Huang et al., Optical coherence tomography. science 254, 1178-1181 (1991).
Dubois et al., Phase measurements with wide-aperture interferometers. Applied optics 39, 2326-2331 (2000).
Zhao et al., Phase-resolved optical coherence tomography and optical Doppler tomography for imaging blood flow in human skin with fast scanning speed and high velocity sensitivity. Optics letters 25, 114-116 (2000).
Ding et al., Real-time phase-resolved optical coherence tomography and optical Doppler tomography. Optics Express 10, 236-245 (2002).
Dubois et al., High-resolution full-field optical coherence tomography with a Linnik microscope. Applied optics 41, 805-812 (2002).
Cognet et al. Single metallic nanoparticle imaging for protein detection in cells. Proceedings of the National Academy of Sciences 100, 11350-11355 (2003).
Leitgeb et al. Performance of fourier domain vs. time domain optical coherence tomography. Optics Express 11, 889-894 (2003).
Popescu, et al. Fourier phase microscopy for investigation of biological structures and dynamics. Optics letters 29, 2503-2505 (2004).
Ikeda T, et al. Hilbert phase microscopy for investigating fast dynamics in transparent systems. Optics letters 30, 1165-1167 (2005).
Lichtman et al. Fluorescence microscopy. Nature methods 2, 910-919 (2005).
Vakoc et al., Phase-resolved optical frequency domain imaging. Optics express 13, 5483-5493 (2005).
Yazdanfar et al,. Frequency estimation precision in Doppler optical coherence tomography using the Cramer-Rao lower bound. Optics express 13, 410-416 (2005).
Dormann et al. Imaging of cell migration. Embo j 25, 3480-3493 (2006).
Wang et al., Tissue Doppler optical coherence elastography for real time strain rate and strain mapping of soft tissue. Applied Physics Letters 89, 144103 (2006).
Iida et al., Synthesis of Fe304 nanoparticles with various sizes and magnetic properties by controlled hydrolysis. Journal of colloid and interface science 314, 274-280 (2007).
Lue et al., Quantitative phase imaging of live cells using fast Fourier phase microscopy. Applied Optics 46, 1836-1842 (2007).
Lue et al., Tissue refractometry using Hilbert phase microscopy. Optics letters. Dec. 15, 2007;32(24):3522-4.
Klauschen et al. Quantifying cellular interaction dynamics in 3D fluorescence microscopy data. Nature protocols 4, 1305-1311 (2009).
Lippincott-Schwartz et al., Putting super-resolution fluorescence microscopy to work. Nature methods 6, 21-23 (2009).
Liu et al., Towards automatic calibration of Fourier-Domain OCT for robot-assisted vitreoretinal surgery. Optics express 18, 24331-24343 (2010).
Maurer et al., What spatial light modulators can do for optical microscopy. Laser & Photonics Reviews 5, 81-101 (2011).
Nwaneshiudu et al., Introduction to confocal microscopy. The Journal of Investigative Dermatology 132, e3-e3 (2012).
Hesse et al., Direct visualization of cell division using high-resolution imaging of M-phase of the cell cycle. Nat Commun 3, 1076 (2012).
Liu et al., Optimization of an angled fiber probe for common-path optical coherence tomography. Optics Letters 38, 2660-2662 (2013).
Kraft et al., Emerging research and clinical development trends of liposome and lipid nanoparticle drug delivery systems. Journal of pharmaceutical sciences 103, 29-52 (2014).
Nguyen et al., Quantitative phase imaging with partially coherent illumination. Optics Letters 39, 5511-5514 (2014).
Solli et al., Analog optical computing. Nature Photonics 9, 704-706 (2015).
Zhang et al., Single-pixel imaging by means of Fourier spectrum acquisition. Nature Communications 6, 6225 (2015).
Mathieu et al., Time-lapse lens-free imaging of cell migration in diverse physical microenvironments. Lab Chip 16, 3304-3316 (2016).
Qiu, et al. Quantitative optical coherence elastography based on fiber-optic probe for in situ measurement of tissue mechanical properties. Biomedical optics express 7, 688-700 (2016).
Icha et al., Phototoxicity in live fluorescence microscopy, and how to avoid it. BioEssays 39, 1700003 (2017).
Ventola, Progress in Nanomedicine: Approved and Investigational Nanodrugs. P & T : a peer-reviewed journal for formulary management 42, 742-755 (2017).
Liu et al., Assessment and removal of additive noise in a complex optical coherence tomography signal based on Doppler variation analysis. Applied optics 57, 2873-2880 (2018).
Liu et al. Temporally and spatially adaptive Doppler analysis for robust handheld optical coherence elastography. Biomedical optics express 9, 3335-3353 (2018).
Moscatelli, Adieu to photobleaching. Nature Nanotechnology 13, 620-620 (2018).
Park et al., Quantitative phase imaging in biomedicine. Nature photonics 12, 578-589 (2018).
Patra et al., Nano based drug delivery systems: recent developments and future prospects. Journal of Nanobiotechnology 16, 71 (2018).
Tamura et al., Chemistry for covalent modification of endogenous/native proteins: from test tubes to complex biological systems. Journal of the American Chemical Society 141, 2782-2799 (2018).
Sharifi, et al., Plasmonic gold nanoparticles: Optical manipulation, imaging, drug delivery and therapy. Journal of Controlled Release 311-312, 170-189 (2019).
Zhang et al., Optical computing optical coherence tomography with conjugate suppression by dispersion. Optics Letters 44, 2077-2080 (2019).
Ashraf, et al., Quantitative particle uptake by cells as analyzed by different methods. Angewandte Chemie International Edition 59, 5438-5453 (2020).
Wang et al., Optically computed optical coherence tomography for volumetric imaging. Optics letters 45, 1675-1678 (2020).
Helmerich et al., Photoblueing of organic dyes can cause artifacts in super-resolution microscopy. Nature Methods 18, 253-257 (2021).
Hou et al., Lipid nanoparticles for mRNA delivery. Nature Reviews Materials, 1-17 (2021).
Shahriari et al., Reflectance confocal microscopy: Principles, basic terminology, clinical indications, limitations, and practical considerations. Journal of the American Academy of Dermatology 84, 1-14 (2021).
Liu et al., Optically computed phase microscopy to assess cellular uptake of lipid nanoparticles, CLEO 2022, Optica Publishing Group.
Liu et al., Complex optically computed phase microscopy for label-free sub-cellular imaging, Optics Letters, Sep. 4, 2022.
Liu et al., Quantitative dynamic cellular imaging based on 3D unwrapped optically computed phase microscopy, Applied Optics, vol. 61, No. 27, Sep. 20, 2022, 7999-8005.
U.S. Appl. No. 63/277,668, filed Nov. 10, 2021.

* cited by examiner

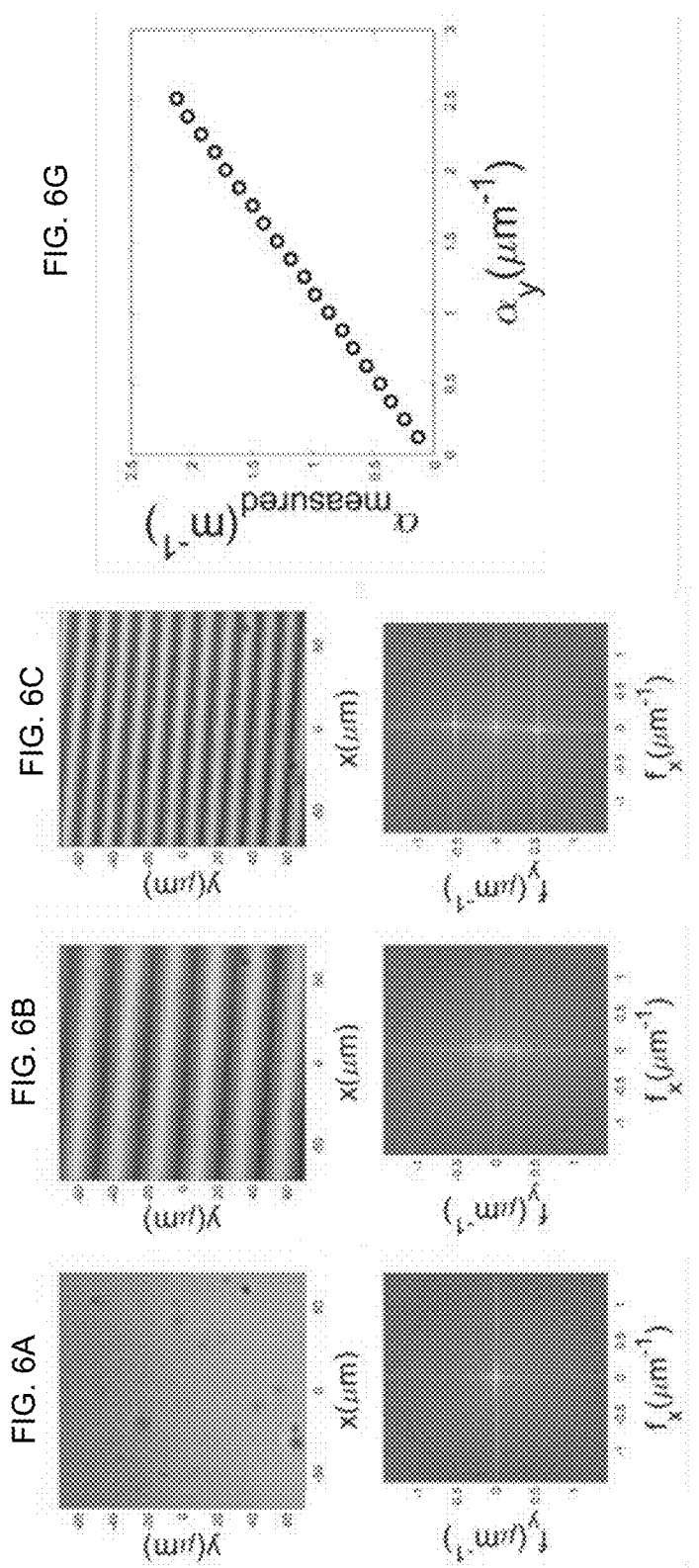

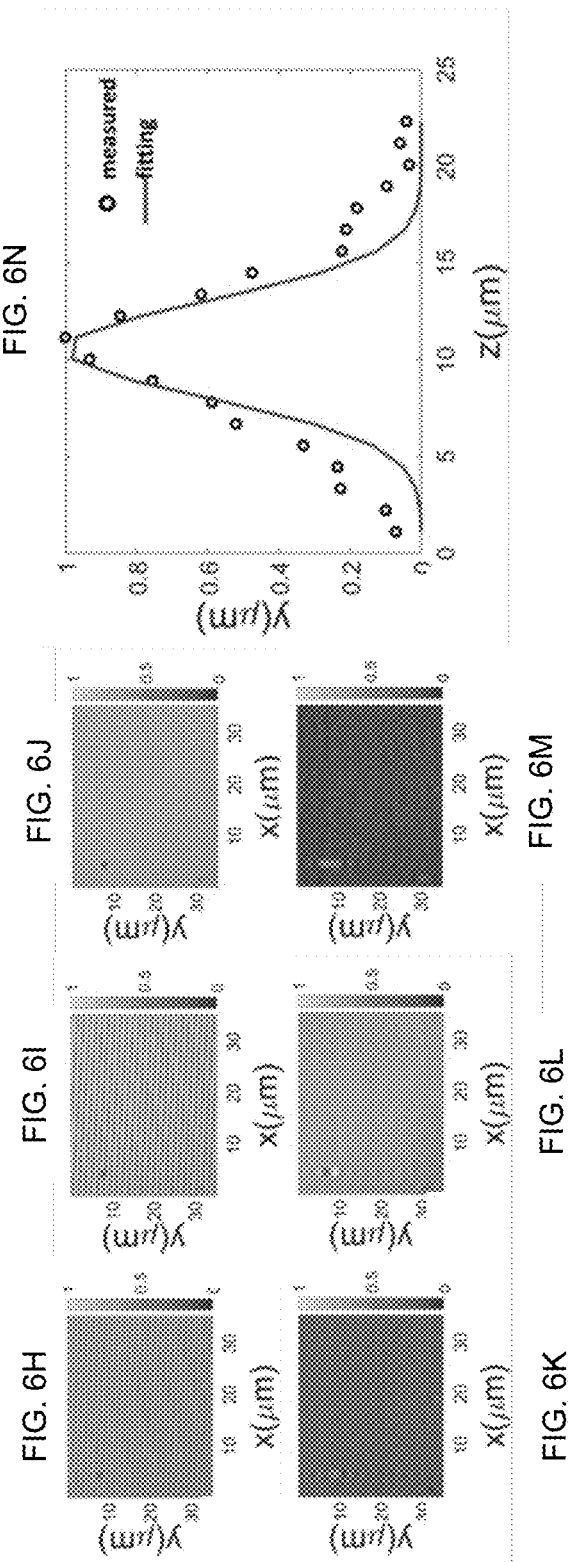

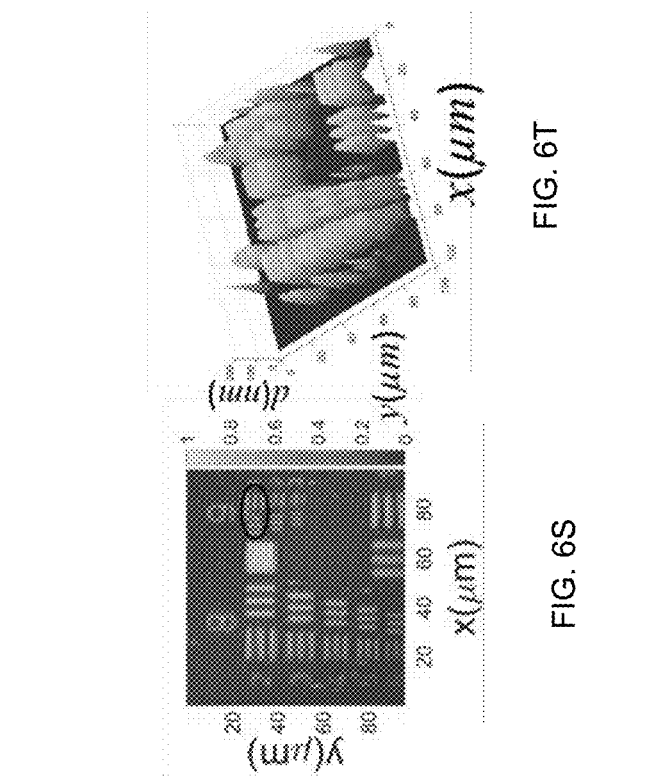
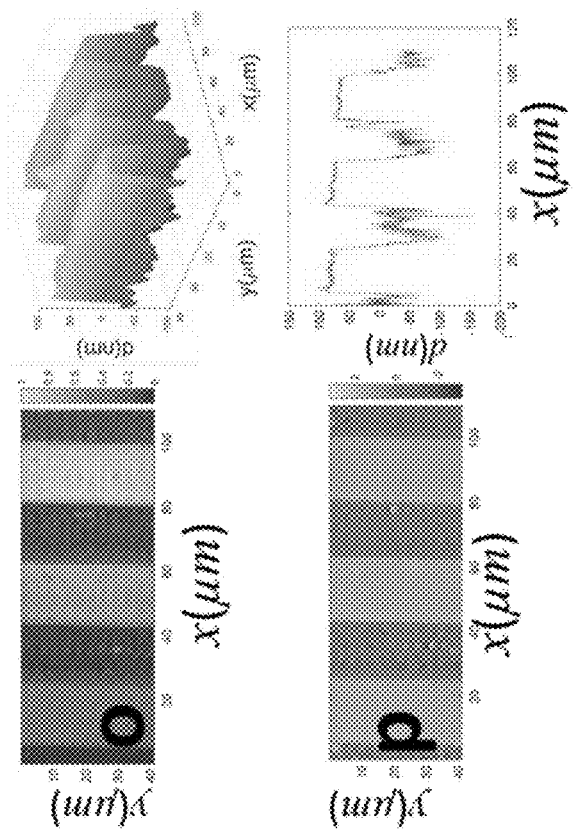
FIG. 6O  FIG. 6P  FIG. 6Q  FIG. 6R  FIG. 6S  FIG. 6T

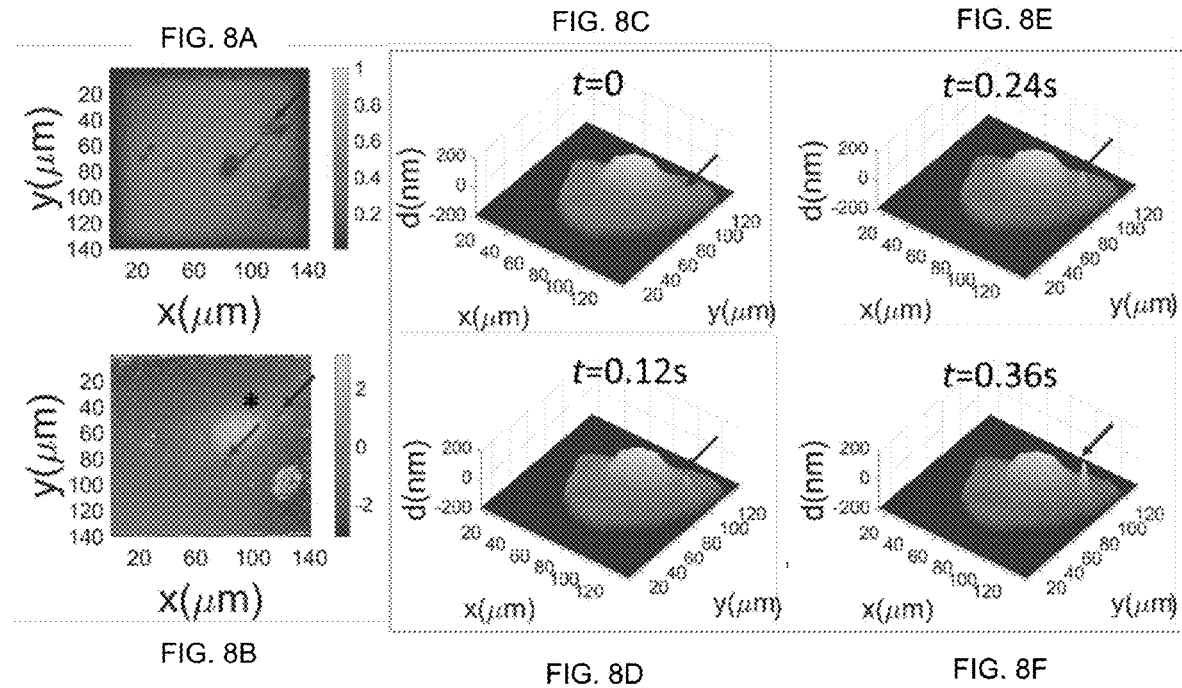
FIG. 8A FIG. 8C FIG. 8E
FIG. 8B FIG. 8D FIG. 8F
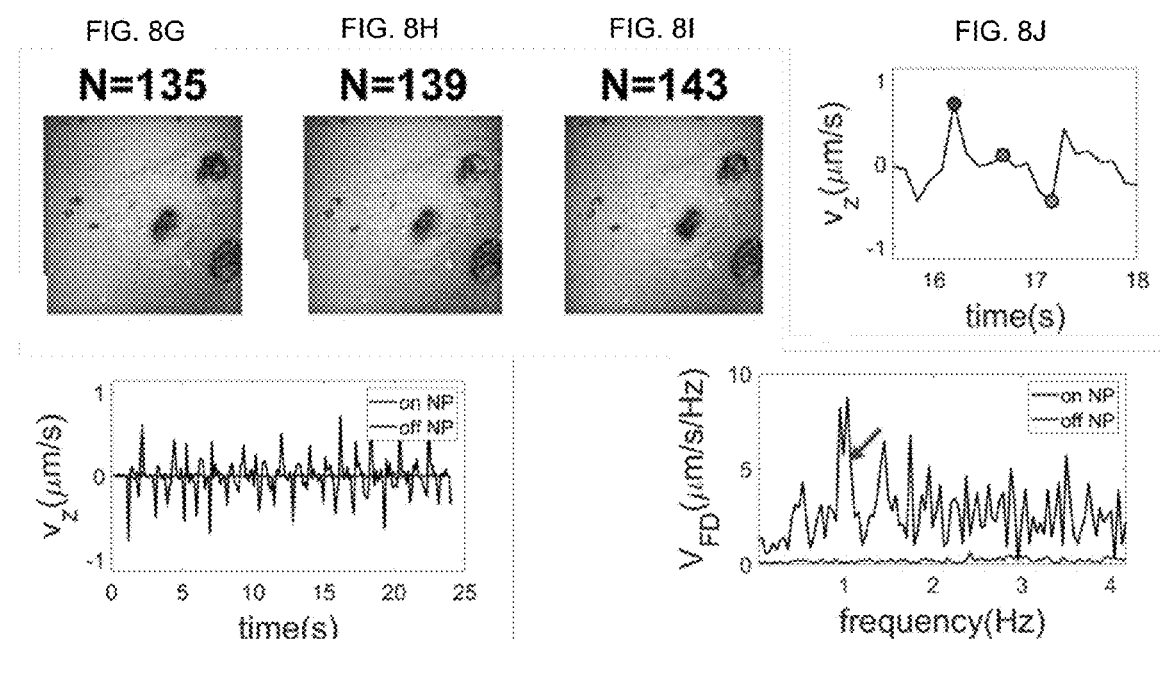
FIG. 8G  FIG. 8H  FIG. 8I  FIG. 8J
FIG. 8K  FIG. 8L

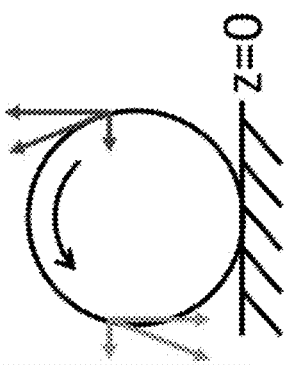
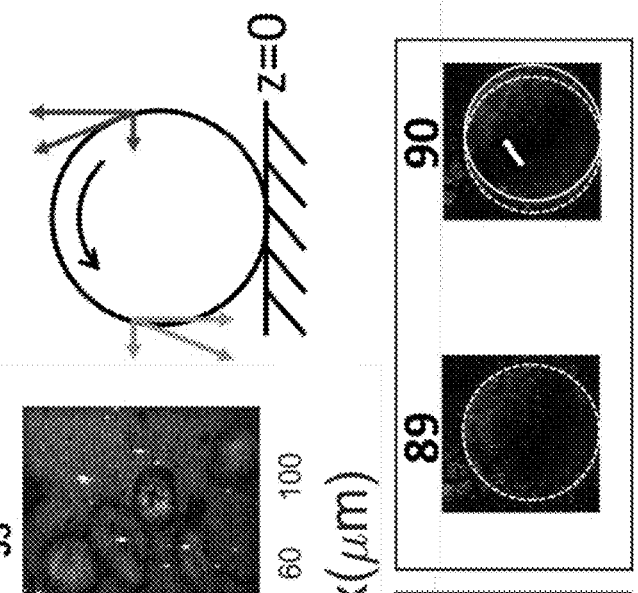
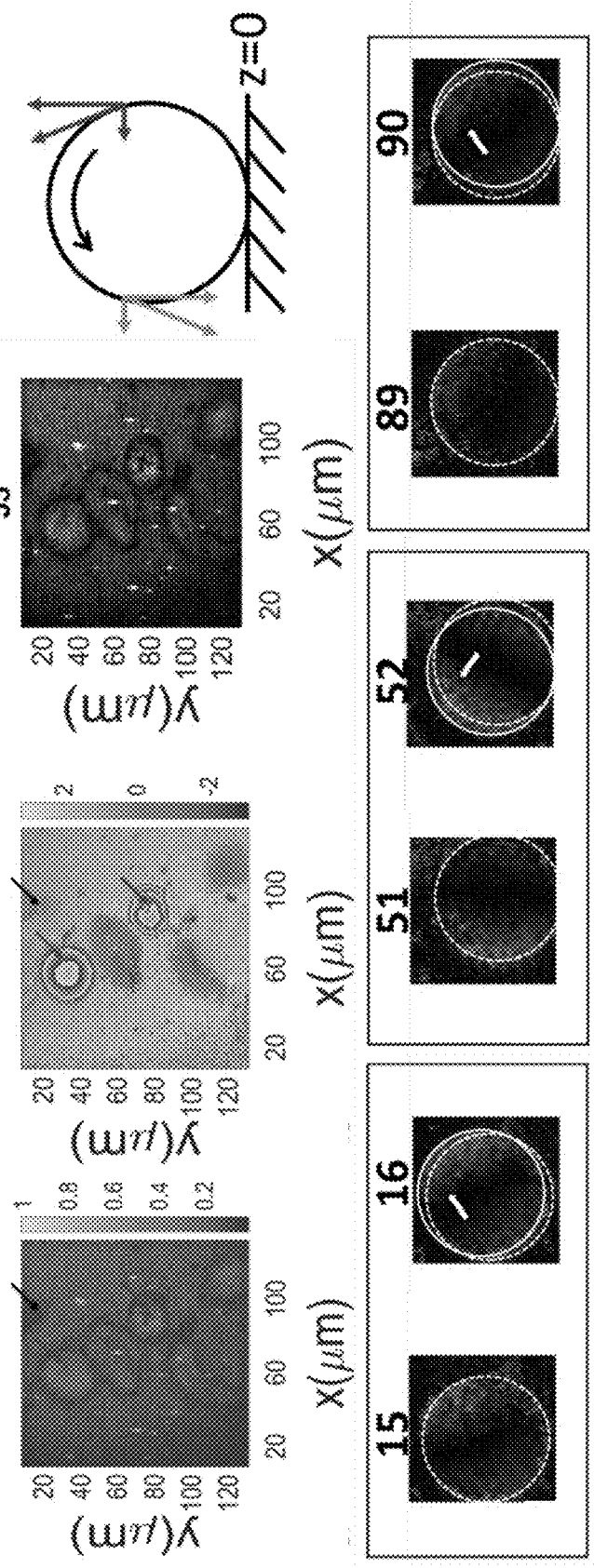
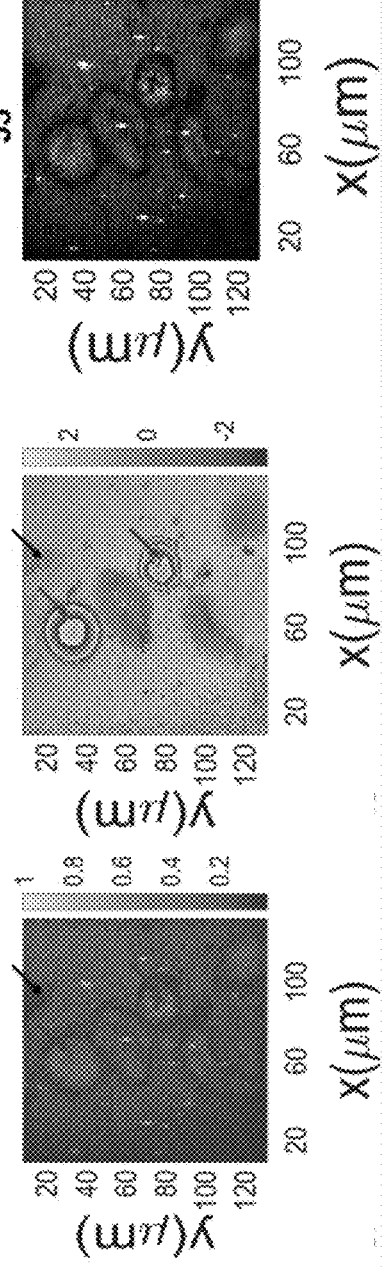
FIG. 9A  FIG. 9B  FIG. 9C  FIG. 9D
FIG. 9E  FIG. 9F  FIG. 9G

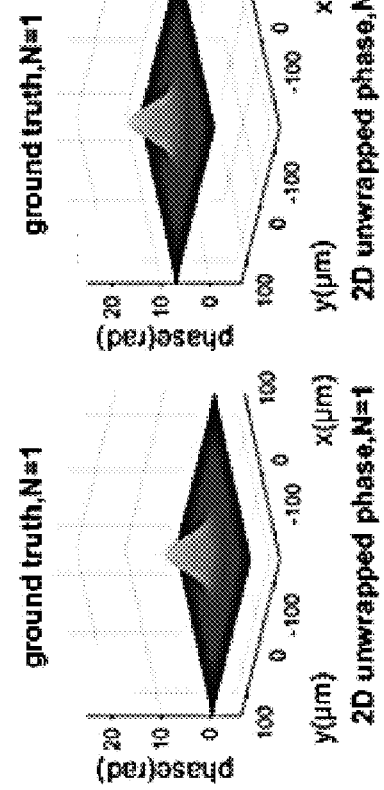

Top View of the Variable Line Grating Target

OPTICALLY COMPUTED PHASE MICROSCOPY

RELATED APPLICATIONS

This application claims priority to U.S. Provisional Application No. 63/277,668 filed on Nov. 10, 2021, the entire content of which is hereby incorporated by reference in its entirety.

GOVERNMENT SUPPORT

This invention was made with Government support under Agreement No. 1 R21 GM140438-01 awarded by the National Institutes of Health. The government has certain rights in the invention.

BACKGROUND

A wide range of phase resolved optical microscopy technologies has been developed to enable high-resolution imaging of cellular dynamics with sub-nanometer displacement sensitivity. However, these techniques generally operate in a transmission mode and image a transparent specimen that can be considered as a phase object. There remains an unmet need for a phase microscopy technology to image dynamic events in a more complicated environment where cells interact with nontransparent objects in 3D space.

SUMMARY

Described herein are systems and methods for optically computed phase imaging of samples (e.g., transparent objects, non-transparent objects, a thin layer from a bulk object, or the like). In accordance with example embodiments of the disclosure, an optically computed phase imaging system (also referred as to "system") is disclosed. The system includes an interferometer configured to output three-dimensional (3D) spatial-spectral data of a sample by superimposing reference light from a reference arm of the interferometer and sample light from a sample arm of the interferometer. The 3D spatial-spectral data includes an interferometric signal from the sample. The system also includes an optical computation assembly including a spatial light modulator configured to modulate the 3D spatial-spectral data with a modulation pattern (e.g., a cosine pattern, a sine pattern, or other suitable pattern for modulation). The modulation pattern modulates the interferometric signal along a spectral dimension (e.g., wavenumber k dimension) to select a depth to obtain a sample signal at the selected depth and modulates the interferometric signal along a first spatial dimension (e.g., a Cartesian coordinate y dimension) to create a waveform to facilitate phase extraction. The system further includes a detector (e.g., an imaging sensor or camera) configured to detect two-dimensional (2D) spatial data of the sample. The 2D spatial data is an integral of the modulated 3D spatial-spectral data over the spectral dimension. The system further includes a processor coupled to a memory (e.g., a computer). The processor is configured to generate the modulation pattern; control the spatial light modulator to project the modulation pattern for spectral and spatial modulations; receive the 2D spatial data from the detector; and process the 2D spatial data to extract phase information and/or amplitude information of the sample (e.g., via 2D Fourier transform, bandpass filtering, frequency shifting/scaling, inverse Fourier transform).

In some embodiments, the processor is further configured to determine that the extracted phase is a wrapped phase that has phase wrapping artifact; determine a difference of the wrapped phase between neighboring sampling points along the first spatial dimension (e.g., a Cartesian coordinate y dimension), a second spatial dimension (e.g., a Cartesian coordinate x dimension), and a temporal dimension (e.g., acquisition time); apply a wrapping operation to the difference of the wrapped phase to generate a wrapped phase difference; and determine a 3D unwrapped phase by minimizing a difference between a difference of unwrapped phase and the wrapped phase difference using a non-iterative and transform-based method. For example, the processor is further configured to generate a 3D discrete cosine transform of the wrapped phase difference; apply a coefficient correction to the 3D discrete cosine transform; and estimate the 3D unwrapped phase by taking an inverse 3D discrete cosine transform on the corrected 3D discrete cosine transform.

In some embodiments, the 3D spatial-spectral data includes a complex optical signal of the sample. The modulation pattern (e.g., a cosine pattern) allows the system to obtain a real part of the complex optical signal. The 2D spatial data includes the real part of the complex optical signal. The processor is further configured to generate an additional modulation pattern. The additional modulation pattern allows the optically computed phase imaging system to take a direct measurement to obtain an imaginary part of the complex optical signal by modulating the 3D spatial-spectral data along the spectral dimension to obtain the sample signal at the selected depth and modulates the 3D spatial-spectral data along the first spatial dimension to create a different waveform; control the spatial light modulator to project the additional modulation pattern; control the detector to detect additional 2D spatial data associated with the additional modulation pattern, the additional 2D spatial data comprising the imaginary part of the complex optical signal; receive the additional 2D spatial data; and extract the phase information as an argument of the complex optical signal using the 2D spatial data and the additional 2D spatial data in absence of a signal processing (e.g., 2D Fourier transform, bandpass filtering, frequency shifting/scaling, inverse Fourier transform) to convert the 2D spatial data and the additional 2D spatial data from a spatial domain into a frequency domain.

In some embodiments, the processor is further configured to calculate a temporal phase variation based on a square root of a mean square of a series of phase frames over a time period; and determine a motion of a region of interest in the sample based on the temporal phase variation.

In some embodiments, the processor is further configured to control the detector to detect a plurality of 2D spatial data over a time period. The plurality of 2D spatial data includes time information associated with each 2D spatial data and the 2D spatial data. The processor is further configured to receive the plurality of 2D spatial data; process the plurality of 2D spatial data to extract phase information over the time period; determine a phase difference between different 2D spatial data at different time slots; and generate a Doppler image using the phase difference.

In accordance with other example embodiments of the disclosure, a method is disclosed for optically computed phase imaging. The method includes superimposing reference light from a reference arm of an interferometer and sample light from a sample arm of the interferometer to output 3D spatial-spectral data of a sample. The method further includes modulating the 3D spatial-spectral data using a modulation pattern that modulates the interferometric signal along a spectral dimension to select a depth to obtain a sample signal at the selected depth and modulates the interferometric signal along a first spatial dimension to create a waveform to facilitate phase extraction. The method further includes detecting 2D spatial data of the sample and processing the 2D spatial data to extract phase information of the sample.

In some embodiments, the method further includes determining that the extracted phase is a wrapped phase that has phase wrapping artifacts; determining a difference of the wrapped phase between neighboring sampling points along the first spatial dimension, a second spatial dimension, and a temporal dimension; applying a wrapping operation to the difference of the wrapped phase to generate a wrapped phase difference; and determining a 3D unwrapped phase by minimizing a difference between a difference of unwrapped phase and the wrapped phase difference.

In some embodiments, the method further includes taking a direct measurement to obtain an imaginary part of a complex optical signal of the 3D spatial-spectral data by using an additional modulation pattern to modulate the 3D spatial-spectral data along the spectral dimension to obtain the sample signal at the selected depth and modulate the 3D spatial-spectral data along the first spatial dimension to create a different waveform. The method further includes detecting additional 2D spatial data associated with the additional modulation pattern, the additional 2D spatial data comprising the imaginary part of the complex optical signal; and extracting the phase information as an argument of the complex optical signal using the 2D spatial data and the additional 2D spatial data in absence of a signal processing to convert the 2D spatial data and the additional 2D spatial data from a spatial domain into a frequency domain.

In some embodiments, the method further includes calculating a temporal phase variation based on a square root of a mean square of a series of phase frames over a time period; and determining a motion of a region of interest in the sample based on the temporal phase variation.

In some embodiments, the method further includes detecting a plurality of 2D spatial data over a time period, the plurality of 2D spatial data comprising time information associated with each 2D spatial data and the 2D spatial data; processing the plurality of 2D spatial data to extract phase information over the time period; determining a phase difference between different 2D spatial data at different time slots; and generate a Doppler image using the phase difference.

Numerous nanoparticle drug delivery systems have been investigated in preclinical studies and clinical trials. BioNTech/Pfizer's and Moderna's Covid vaccines both use lipid nanoparticles as mRNA carriers. Quantitatively imaging the mechanical interactions between cells and nanoparticles are critical to advance the efficiency and safety of drug delivery using nanoparticles. However, conventional phase imaging methods, including phase contrast (PC) microscopy and differential interference contrast (DIC) microscopy are qualitative and do not provide quantitative phase measurement. Conventional quantitative phase measurement (e.g., optical coherence tomography (OCT), quantitative phase imaging (QPI), optical diffraction tomography (ODT)) have a limited spatiotemporal resolution, require the sample to be a thin and transparent phase object, and/or require multiple interferometric measurements under different illumination conditions. To address issues in the conventional phase imaging techniques and address the unmet need for dynamic imaging of cell-nanoparticle interaction with high spatiotemporal resolution, the system can use the optical computation assembly to process 3D spatial-spectral data before 2D photon detection by using a spatial light modulator (SLM) to alter light intensity with high spatial and value precision. First, the optical computation assembly achieves depth resolution, by computing the inner product between the interferometric spectrum and a Fourier basis projected by the SLM. Second, the optical computation assembly imposes a sinusoidal modulation on the interferometric term of optical signal, resulting in a waveform that facilitates phase quantification.

Additionally, the system has the potential to advance the knowledge on the mechanical interaction between cells and nanoparticles, and lead to nanoparticle drug delivery systems with improved efficacy and safety. The spatial resolution and displacement sensitivity of the system makes it an ideal candidate to image the dynamic interaction between cells and nanoparticles. First, the system does not rely on labeling reagents, and allows cell movements and behaviors to remain unaffected during the imaging process. Second, the system allows quantitative phase measurement and has the capability to track subtle motion with nanoscale displacement sensitivity. Third, with depth resolution derived from low coherence interferometry and optical computation assembly, the system can operate in a reflective mode to image transparent and non-transparent objects. This is critical for imaging cells in a complicated environment where non-transparent objects such as nanoparticles exist. Moreover, the system also has the capability to resolve a thin layer from a bulk object. Therefore, the system is translatable to in vivo studies on animals or human subjects.

Often, continuous phase imaging can be affected by phase wrapping artifacts, which affects correct quantification of sample dynamics. To address this issue, the system provides a 3D unwrapping method that exploits data correlation in space as well as in time and utilize the continuity of phase in time to achieve 3D phase unwrapping imaging to reduce phase wrapping artifact.

High-resolution imaging with quantitative phase contrast remains challenging. To study the dynamics of cells when they interact with each other and their environment, there is an unmet need for quantitative phase measurement with high motion sensitivity and spatial resolution. To address this unmet need, the system provides direct measurements of complex optical field (e.g., direct measurements of real and imaginary parts of a complex sample signal) and extraction of the phase as the argument of the complex optical field. The system can enable high resolution phase imaging of label-free living cells for high-resolution quantitative phase imaging.

Doppler optical coherence tomography (DOCT) is a conventional and effective technique that permits the real-time imaging of structure and blood flow with relatively high sensitivity and resolution. However, applying conventional DOCT to monitor the motion of cell and nanoparticles still have some problems. First, conventional DOCT scans the object Ascan by A-scan and it should sample the same A-scan for multiple times, resulting a time delay between different sample point at the same transverse coordinate. Second, due to the DOCT mechanism, much time will be consumed if DOCT in the en face plane is needed. To address these problems, the system can perform quantitative Doppler analysis by taking direct measurements of real parts of the complex signals using the optical computation assembly over a time period to determine a phase difference between images obtained at different time slots and determine a velocity using the determined phase difference.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. To assist those of skill in the art in making and using the disclosed systems and methods, reference is made to the accompanying figures, wherein:

FIGS. 6A-6C illustrate measurements taken by a camera when an SLM projected patterns with different values of a modulation parameter $\alpha_y$.

FIGS. 6D-6F illustrate spatial frequency domain representations for FIGS. 6A-6C.

FIG. 6G is a graphical depiction showing measured values of $\alpha_y$ versus $\alpha_y$ values used to create an SLM pattern.

FIGS. 6H-6J illustrate measurements taken by a camera when an SLM projected patterns with different depth valucs.

FIGS. 6K-6M are amplitude images obtained using measurements in FIGS. 6H-6J.

FIG. 6N is a graphical depiction showing axial PSF measurement versus Gaussian fitting.

FIG. 6O is an amplitude image of a first variable light grating target.

FIG. 6P is a phase image of the first variable light grating target in FIG. 6O.

FIG. 6Q is 3D surface profile of the first variable light grating target in FIG. 6O.

FIG. 6R is a surface profile along a central row of the 3D surface profile in FIG. 6Q.

FIG. 6S is an amplitude image of a second resolution target.

FIG. 6T is a surface profile of the second resolution target in FIG. 6S rendered based on phase measurement.

FIG. 8A is an amplitude image of a HeLa cell and clusters of nanoparticles sedimented to the surface of the HeLa cell.

FIG. 8B is a phase image of the HeLa cell in FIG. 8A.

FIGS. 8C-8F are 3D surface profiles showing motion of nanoparticles.

FIGS. 8G-8I are overlaid images each overlaying amplitude image with Doppler image to show motion of nanoparticles.

FIG. 8J is a graphical depiction showing an axial velocity assessed for regions with nanoparticles within a time window when images in FIGS. 8G-8I were taken.

FIG. 8K is a graphical depiction showing an axial velocity assessed for regions with and without nanoparticles.

FIG. 8L is a graphical depiction showing a Fourier analysis of axial velocity shown in FIG. 8K.

FIG. 9A is an amplitude image obtained from a culture dish with detached HeLa cells and magnetic nanoparticles.

FIG. 9B is a phase image obtained from the culture dish in FIG. 9A.

FIG. 9C is a frame of a Doppler image that quantifies an instantaneous motion.

FIG. 9D illustrates a diagram showing a motion of a detached cell being similar to a ball on a rigid surface.

FIGS. 9E-9G are adjacent Doppler frames.

FIG. 12A illustrates a rendered 3D topology of ground truth phase for 1st frame.

FIG. 12B illustrates a rendered 3D topology of ground truth phase for 50th frame.

FIG. 12C illustrates a rendered 3D topology of wrapped phase for 1st frame.

FIG. 12D illustrates a rendered 3D topology of wrapped phase for 50th frame.

FIG. 12E illustrates a rendered 3D topology of 2D unwrapped phase for 1st frame.

FIG. 12F illustrates a rendered 3D topology of 2D unwrapped phase for 50th frame.

FIG. 12G illustrates a rendered 3D topology of 3D unwrapped phase for 1st frame.

FIG. 12H illustrates a rendered 3D topology of 3D unwrapped phase for 50th frame.

DETAILED DESCRIPTION

Figure 1:
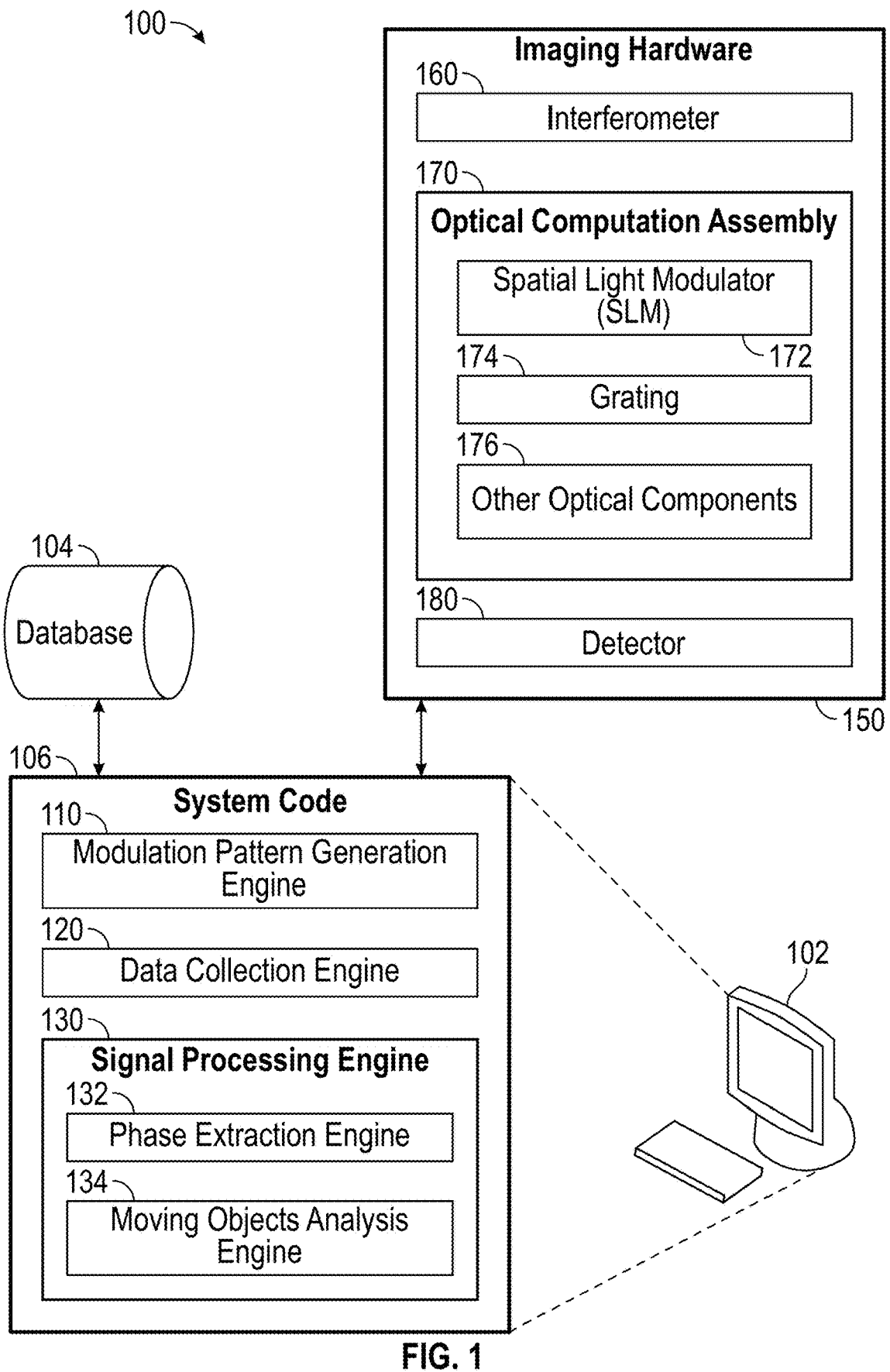
FIG. 1 is a diagram illustrating an example embodiment of a optically computed phase imaging system (also referred to as system) of the present disclosure.

The present disclosure relates to systems, methods, and computer-readable media for optically computed phase imaging. Example systems and methods are described in detail below in connection with FIGS. 1-31.

Embodiments of the present disclosure can provide several technical benefits. For example, the system can image the dynamics of microscopic objects (e.g., cells and nanoparticles) with nanoscale displacement sensitivity and image dynamics of cells interacting with other microscopic objects in 3D space. The system can also utilize capabilities of resolving depth and phase sensitivity to image the dynamics of transparent or nontransparent objects in reflective mode, and perform quantitative motion tracking on the transparent and nontransparent objects through Doppler analysis.

The optical computation assembly of the system can achieve depth resolution and phase quantification by optically processing (e.g., via various optical elements including a spatial light modulator, a diffraction grating, or the like instead of using signal processing to process detected data) 3D spatial-spectral data before 2D light/photon detection, which can address fundamental challenges in phase imaging. The optical computation assembly can also allow the system to achieve scanning-free volumetric imaging. The optical computation assembly can provide an alternative approach to manage massive data in 3D imaging, for applications such as OCT imaging and single pixel imaging.

Additionally, the system can have the capability to advance the knowledge on the mechanical interaction between cells and nanoparticles, and lead to nanoparticle drug delivery systems with improved efficacy and safety, because of its unique imaging capabilities. The system can also have capability to resolve a thin layer from a bulk object and is translatable to in vivo studies on animals or human subjects. The system can also observe mechanical interaction between cells and magnetic nanoparticles (nontransparent) and obtain quantitative, spatially and temporally resolved motion tracking results for magnetic nanoparticles and cells.

As used herein, "coherence" refers to the property of light of keeping the same behavior at different times and/or different places. The first is referred to as temporal coherence while the second is referred to as spatial coherence. One of the properties of coherence is the ability to produce interference fringes. For example, the coherence of a wave is the extent to which its phase at some point in space (or time) is predictable from its phase at some other point in space (or time).

As used herein, "coherence length" refers to a propagation distance over which a coherent wave (e.g. an electromagnetic wave) maintains a specified degree of coherence.

As used herein, "optical computing" or "optical computation" or "optically compute" refers to using light waves or photons produced, delivered, and/or processed by optics (e.g., optical hardware) for data processing, data storage or data communication for computing. For example, the optical computation can replace computer or electronic components with optical components and replace electronic signals with optical signals for processing. In another example, the optical computation replaces signal processing on computers with optical signal processing using various optical components.

As used herein, "wavenumber" refers to a spatial frequency of a wave, measured in cycles per unit distance (ordinary wavenumber) or radians per unit distance (angular wavenumber). The wavenumber can be represented by k and calculated by $k=2\pi/\lambda$ ($\lambda$ is wavelength of light).

1. Optically Computed Phase Microscopy 1.1 System Overview

Turning to the drawings, FIG. 1 is a diagram illustrating an example embodiment of a optically computed phase imaging system 100 (also referred to as system 100 or optically computed phase microscopy) of the present disclosure. The system 100 can be embodied as a computing device 102 (e.g., the computing device described with respect to FIG. 31) in communication with a database 104. The computing device 102 can include, but is not limited to, a computer system, a server, a personal computer, a cloud computing device, a smart phone, or any other suitable device programmed to carry out the processes disclosed herein. Still further, the system 100 can be embodied as a customized hardware component such as a field-programmable gate array ("FPGA"), an application-specific integrated circuit ("ASIC"), embedded system, or other customized hardware components without departing from the spirit or scope of the present disclosure. It should be understood that FIG. 1 is just one potential configuration, and that the system 100 of the present disclosure can be implemented using a number of different configurations.

The database 104 includes various types of data including, but not limited to, 3D spatial data (e.g., data in x, y z Cartesian coordinate dimensions), 2D spatial data (e.g., data in x, y dimensions, data in x, z dimensions, data in y, z dimensions), 3D spatial-spectral data (e.g., data in x, y dimensions and wavenumber k dimension), 3D spatial-temporal data (e.g., data in x, y dimensions and temporal dimension), 4D spatial-temporal data (e.g., data in x, y, z, t dimensions), and/or other suitable data in one or more of x, y, z, k, t dimensions, various modulation patterns, data associated with amplitude and/or phase information, data associated with moving objects, data associated with various components of the system 100 (e.g., a modulation pattern generation engine 110, a data collection engine 120, a signal processing engine 130 including a phase extraction engine 132 and a moving-object analysis engine 134, an imaging hardware assembly 150, an interferometer 160, an optical computation assembly 170, one or more spatial light modulators (SLM) 172, one or more diffraction gratings 174, one or more other optical components 176, one or more detectors 180, other suitable components of the system 100).

The system 100 includes an imaging hardware assembly 150 for optically computed phase imaging of samples (e.g., cells, nanoparticles, and/or suitable microscopic objects). The imaging hardware assembly 150 can include, but not limited to, the interferometer 160 for obtaining interferometric spectra, the optical computation assembly 170 for optically processing (as defined above), the SLM(s) 172, the diffraction grating(s) 174, the other optical components 176 (e.g., beam splitters, optical lenses, objectives, or the like), and the detectors 180 for detecting outputs from the optical computation assembly 170. Each component of the imaging hardware assembly 150 is further described with respect to FIG. 2.

The system 100 further includes system code 106 (non-transitory, computer-readable instructions) stored on a non-transitory computer-readable medium and executable by the hardware computing device 102 or one or more computer systems. The system code 106 can include various custom-written software modules that carry out the steps/processes described herein, and can include, but is not limited to, the modulation pattern generation engine 110, the data collection engine 120, the signal processing engine 130 including the phase extraction engine 132 and the moving-object analysis engine 134, the imaging hardware assembly 150, the interferometer 160, the optical computation assembly 170, the one or more spatial light modulators (SLM) 172, the one or more diffraction gratings 174, the one or more other optical components 176, and the one or more detectors 180. Each component of the system code 106 is described herein, e.g., with respect to FIGS. 3, 10, 17A, 17B, 19, and 24.

The system code 106 can be programmed using any suitable programming languages including, but not limited to, C, C++, C#, Java, Python, or any other suitable language. Additionally, the system code 106 can be distributed across multiple computer systems in communication with each other over a communications network, and/or stored and executed on a cloud computing platform and remotely accessed by a computer system in communication with the cloud platform. The system code 106 can communicate with the database 104, which can be stored on the same computer system as the system code 106, or on one or more other computer systems in communication with the system code 106.

Figure 2:
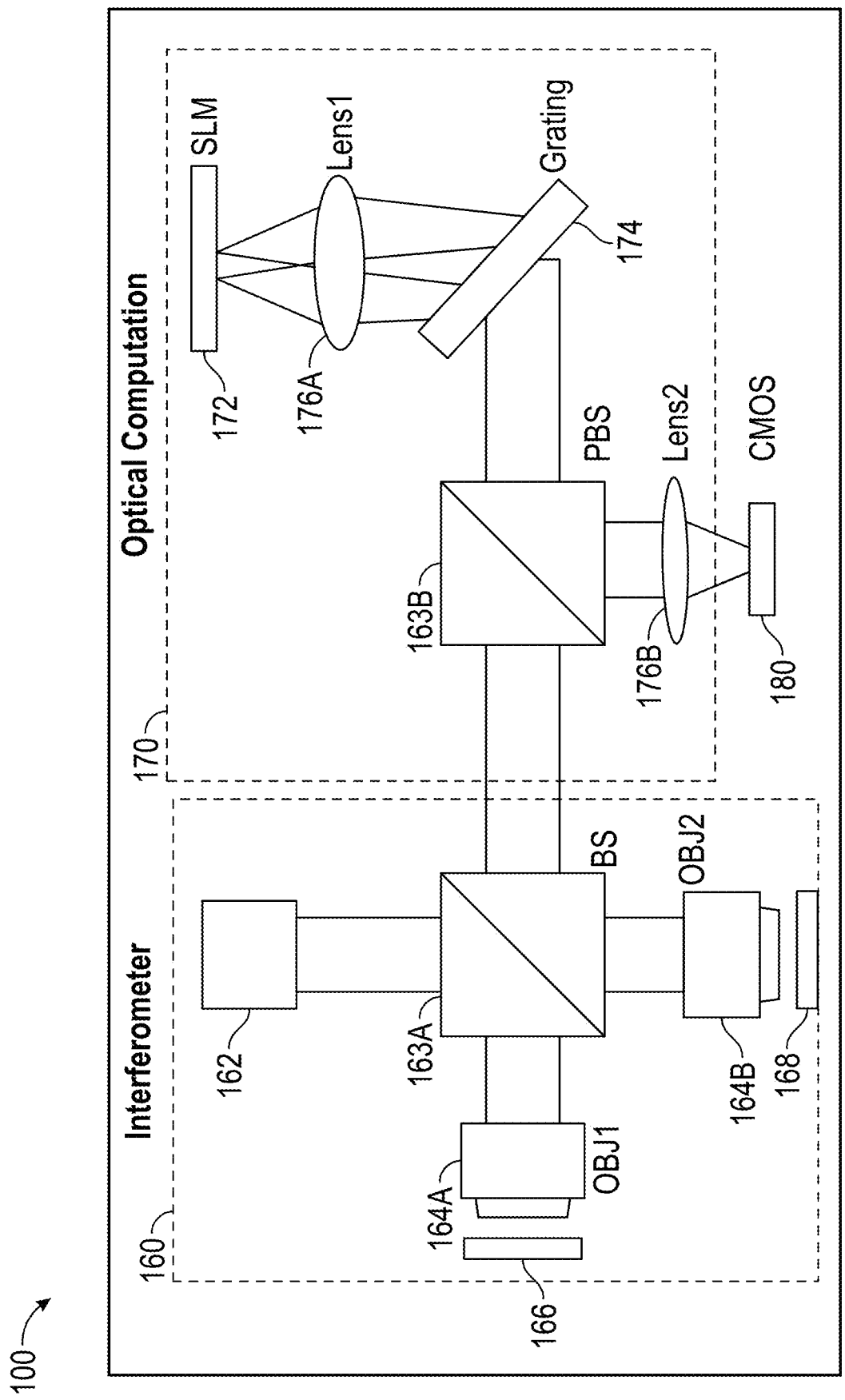
FIG. 2 illustrates an example embodiment of the system in accordance with embodiments of the present disclosure.

FIG. 2 illustrates an example embodiment of the system 100 in accordance with embodiments of the present disclosure. The system 100 includes an interferometer 160 (e.g., Michelson interferometer or the like), an optical computation assembly 170, and a detector 180.

The interferometer 160 can be configured to superimpose waves to create interference signals. The interferometer 160 can include a light source 162, a beam splitter 163A, objectives 164A and 164B, and a reference reflector 166. The light source 162 can emit light to illuminate the reference reflector 166 and a sample 168. The light source 162 can be a broadband light source (e.g., sources that emit light over a broad range of frequencies). Examples of the light source 162 can include a superluminescent diode (e.g., a light emitting diode having wavelengths in a range of 730 nanometers (nm)±20 nm), an ultrashort pulsed laser, and a supercontinuum laser. The beam splitter 163A (e.g., a prism or the like) can split a light beam into a transmitted and a reflected beam. The objectives 164A and 164B focus a light beam on the reference reflector 166 (e.g., a mirror) and the sample 168, respectively.

The beam splitter 163A, the objective 164A, and the reference reflector 166 can form a reference arm where light emitted from the light source 162 can be directed by the beam splitter 163A and can be focused by the objective 164A onto the reference reflector 166 to produce a reference light beam reflected from the reference reflector 166. The beam splitter 163A, the objective 164B, and the sample 168 can form a sample arm where light emitted from the light source 162 can be directed by the beam splitter 163A and can be focused by the objective 164B onto the sample 168 to produce a sample light beam reflected from the sample 168. The reference light beam and sample light beam can be superimposed by the beam splitter 163A to produce a superimposed light beam having an interference spectrum only when path difference lies within the coherence length (as defined above) of the light source 162. Unlike conventional interferometer having long coherence length (e.g., interference of light occurs over a distance of meters), the coherence light of the interference spectrum provided by the interferometer 160 can be shortened to a distance of micrometers, owing to the use of the broad-bandwidth light source 162. The superimposed light beam having spatial and spectral information of the sample 168 can be directed by the beam splitter 163A to the optical computation assembly 170.

The optical computation assembly 170 includes optical hardware components to optically compute (as defined above) the superimposed light received from the interferometer 160. The optical computation assembly 170 includes a beam splitter 163B, a diffraction grating 174, optical lenses 176A and 176B, and an SLM 172. The optical computation assembly 170 can be placed between the interferometer 160 and the detector 180.

The beam splitter 163B can direct light (e.g., the superimposed light) to the diffraction grating 174 and can direct light from the diffraction grating 174 to the optical lens 176B. The diffraction grating 174 can disperse light from the beam splitter 163B (e.g., the superimposed light) and light from the SLM 172 (e.g., modulated light as described below) along a particular spatial dimension. The optical lens 176A can focus light from the diffraction grating 174 onto the SIM 172.

The SLM 172 can be a device that imposes some form of spatially varying modulation on a beam of light. In some embodiments, the SLM 172 can modulate light spatially in amplitude and phase based on liquid crystal microdisplays, so they act as a dynamic optical element. The optical function or information to be displayed can be taken directly from the optic design of the SLM 172 or an image source and can be transferred by a computer interface of the computing device 102. For example, the SLM 172 modulates light using a modulation pattern as further described with respect to FIGS. 3 and 24.

The modulated light from the SIM 172 can pass through the optical lens 176A and can be dispersed by the diffraction grating 174 again such that the dispersion introduced during its previous passage (e.g., from the beam splitter 163B to the SLM 172 via diffraction grating 174 as described above) can be canceled out. The modulated light dispersed from the diffraction grating 174 can be directed to the optical lens 176B by the beam splitter 163B and can be focused on the detector 180 by the optical lens 176B.

The detector 180 can detect light and create images using the detected light, such as a complementary metal-oxide-semiconductor (CMOS) camera, charge-coupled device (CCD) camera or other suitable camera. Unlike conventional optical coherence tomography systems that must have detectors with spectral discrimination (e.g., spectrometers), the detector 180 is not necessary to have the ability of spectral discrimination.

Phase describes a position of a point within a cycle of a waveform. To quantify the phase within a 2D plane ((x,y)) at a time point, one has to perform a 3D measurement $i(x,y,w)$, where w indicates the dimension of the waveform and can be different variables in different imaging systems. High speed quantitative phase imaging is intrinsically challenging, because it needs a 3D measurement of $i(x,y,w)$ to extract the phase, while light detection is performed in 2D using an array detectors (CCD or CMOS camera). The phase is usually estimated quantitatively at a cost of temporal or spatial resolution.

Figure 3:
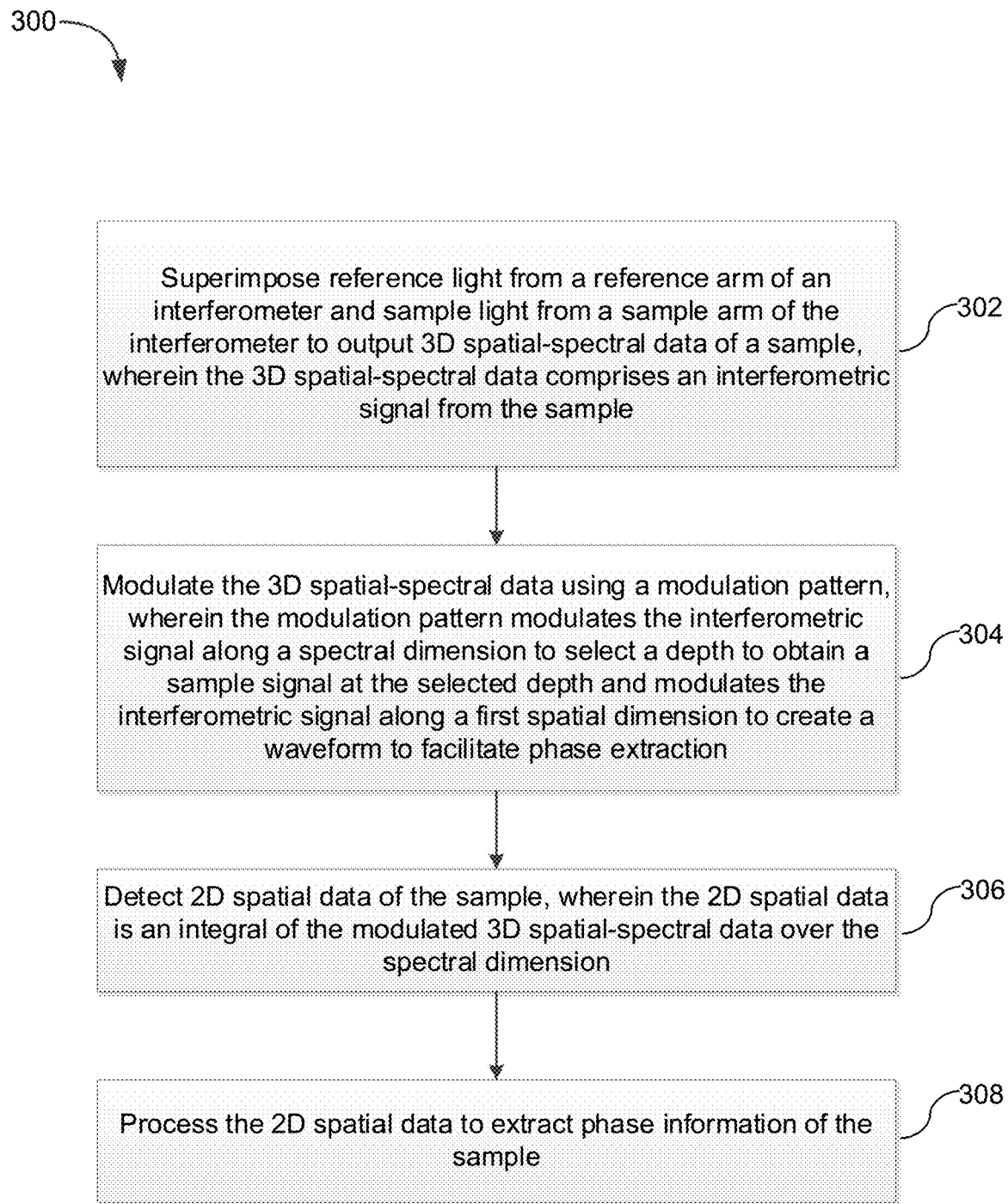
FIG. 3 is a flowchart illustrating overall processing steps carried out by the system of the present disclosure.

To address the challenge in conventional phase measurements, the system 100 can use the interferometer 160 to output 3D data (e.g., can be represented by $i(x,y,k)$ where k is the wavenumber) and can further utilize the optical computation assembly 170 to processes the 3D signal optically, and create a 2D output from which the phase can be directly extracted, as further described with respect to FIG. 3.

FIG. 3 is a flowchart illustrating overall processing steps 300 carried out by the system 100 of the present disclosure. In step 302, the system 100 superimposes reference light from a reference arm of an interferometer and sample light from a sample arm of the interferometer to output 3D spatial-spectral data of a sample. The 3D spatial-spectral data includes an interferometric signal from the sample. For example, as shown in FIG. 2, the system 100 superimposes reference light from the reference arm of the interferometer 160 and sample light from the sample arm of the interferometer 160 to output 3D spatial-spectral data of the sample 168. The 3D spatial-spectral data can be the superimposed light having the interferometric spectrum from the sample 168 and spatial information of the sample 168.

In step 304, the system 100 modulates the 3D spatial-spectral data using a modulation pattern. The modulation pattern modulates the interferometric signal along a spectral dimension to select a depth to obtain a sample signal at the selected depth and modulates the interferometric signal along a first spatial dimension to create a waveform to facilitate phase extraction. For example, as shown in FIG. 2, the SLM 172 can modulate the superimposed light from the interferometer 160 passing through the beam splitter 163B, the diffraction grating 174, and the optical lens 176A.

In some embodiments, the sample 168 can be defined in a 3D coordinate system (x,y,z), where z is along the direction of light propagation and (x,y) is the transverse coordinate. The sample 168 can be represented by the complex field reflectivity: $i_{sample}(x,y,z)=A(x,y,z)e^{j\phi(x,y,z)}$. The system 100 can extract phase $\phi(x,y,z)$ at a specific time as described below.

Figure 4A:
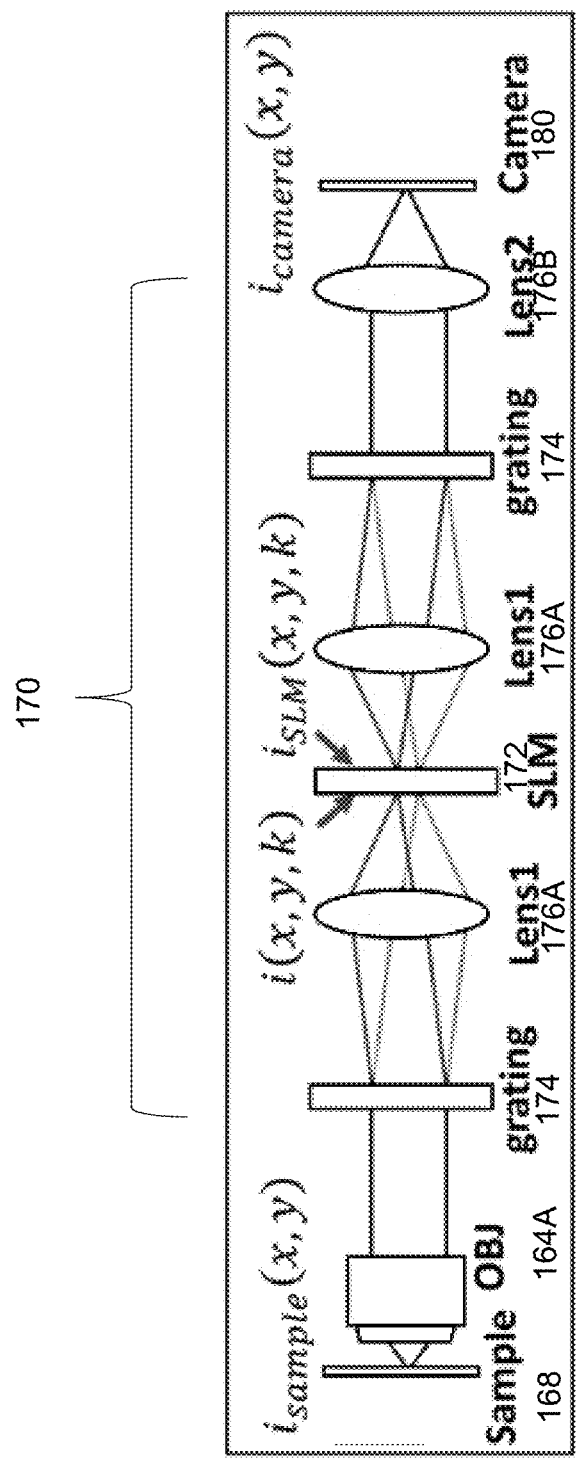
FIG. 4A illustrates a light propagation from a sample to a camera via the optical computation assembly of the present disclosure.
Figure 4B:
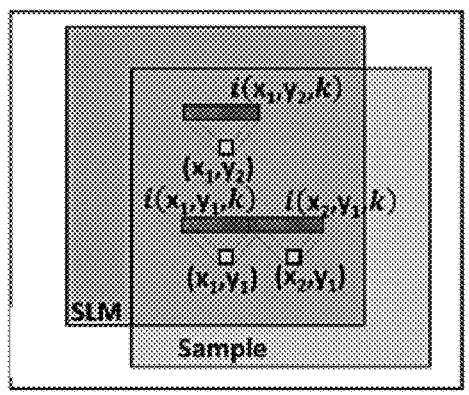
FIG. 4B illustrates a mapping between pixels in a sample plane and spectra seen by a spatial light modulator (SLM).
Figure 4C:
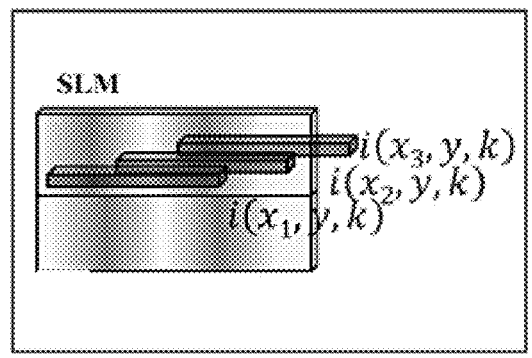
FIG. 4C illustrates each pixel of the SLM seeing a signal from different combinations of (x,k).
Figure 4D:
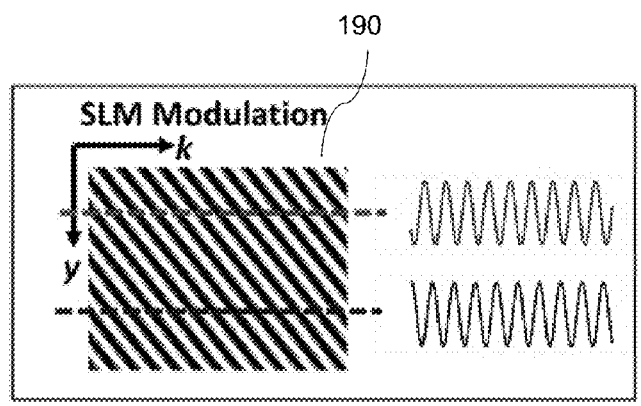
FIG. 4D illustrates a SLM pattern for light modulation.

FIG. 4A illustrates a light propagation from the sample 168 to the camera 180 via the optical computation assembly 170. FIG. 4B illustrates a mapping between pixels in a sample plane and spectra seen by the SLM 172. FIG. 4C illustrates each pixel of the SLM 172 seeing a signal from different combinations of (x,k). FIG. 4D illustrates a SLM pattern for light modulation.

The output from the interferometer 160 can be interfaced with the optical computation assembly 170 detailed in FIG. 2 and FIG. 4A. For simplicity, the reference arm and other components of the interferometer 160 are not shown in FIG. 4A. As shown in FIG. 4B, the diffraction grating 174 and the optical lens 176A map i(x,y,k) from different y coordinates to different rows of the SLM 172, and the spectrum hitting the SLM 172 has a linear shift within the row depending on the corresponding x coordinate. On the other hand, each pixel of the 2D SLM 172 sees superposition of signal from different (x,k) combinations (as shown in FIG. 4C).

The output from the interferometer 160 can be denoted as a 3D spatial-spectral data i(x,y,k) as follows:

$$i(x,y,k)=S_0(k)\int(|A(x,y,z)|^2+|R_0|^2+2\,\text{Re}\,(R_0 A(x,y,z)e^{j(2kz-2kz_{ref})})dz \quad (1.1)$$

where $S_0(k)$ represents the source spectrum, $R=R_0$ is the field reflectivity of the reference mirror, and Re( ) indicates to take the real part of a complex number. Let the axial location of the reference arm be 0 ($z_{ref}=0$) and simplify Equation (1.1) to Equation (1.2) as follows:

$$i(x,y,z)=S_0(k)g(x,y)+2R_0 S_0(k)\text{Re}[\int A(x,y,z)e^{2jkz}dz] \quad (1.2)$$

On the right-hand side of Equation (1.2), the first term is the autocorrelation term $(g(x,y)=\int(|A(x,y,z)|^2+|R_0|^2)dz)$ and the second term is the interference term. Afterwards, i(x,y,k) is modulated by the SLM 172 with a sinusoidal pattern f(k,y) (Equation (1.3) and FIG. 4D). Equation (1.3) is listed as follows:

$$f(k,y)=1+\cos(kz_{sim}+\alpha_y y) \quad (1.3)$$

The result is $i_{SLM}(x,y,k)$ proportional to f(k,y) and i(x/M, y/M,k) where M is the magnification from the sample plane to the SLM 172.

As shown in Equation (1.3) and FIG. 4D, the modulation pattern 190 modulates the interferometric signal along the spectral dimension (e.g., along k dimension) to select a depth to obtain a sample signal at the selected depth and modulates the interferometric signal along the spatial y dimension to create a waveform to facilitate phase extraction. In some embodiments, the modulation pattern 190 modulates the 3D spatial-spectral data i(x,y,k) along the k dimension by imposing a first sinusoidal modulation to the interferometric signal to obtain the sample signal at the selected depth, resulting in an inner product between the first sinusoidal modulation and the interferometric signal. The modulation pattern 190 also modulates the 3D spatial-spectral data along the y dimension by imposing a second sinusoidal modulation to the interferometric spectrum to create the waveform. In some embodiments, the modulation pattern 190 can be generated by a Fourier basis function (e.g., the cosine function) having a modulation parameter (e.g., $\alpha_y y$) indicative of a density of fringes in the modulation pattern 190 along the y dimension. The denser fringes in the modulation pattern 190 produces a larger frequency shift in a spatial frequency domain. The modulation pattern 190 is a cosine pattern allowing the system 100 to take a measurement of a real part of a complex signal of the sample 168 as further described below with respect to Equation (1.4).

Reflected by the SLM 172, $i_{SLM}(x,y,k)$ goes through the diffraction grating 174 for the second time and is detected by the camera 180 without spectral discrimination.

In some embodiments, the system 100 uses the computing device 102 to generate a modulation pattern via the modulation pattern generation engine 110. The system 100 sends the modulation pattern to the SLM 172 to project the modulation pattern.

Referring back to FIG. 3, in step 306, the system 100 detects 2D spatial data of the sample. The 2D spatial data is an integral of the modulated 3D spatial-spectral data over the spectral dimension. For example, the system 100 can control the detector 180 to detect the signals from the optical computation assembly 170 via the data collection engine 120. In some embodiments, the signal (e.g., a 2D image) detected by the camera 180, $i_{camera}(x,y)$, is the integral of $i_{SLM}$ over k, and is found to be Equation (1.4) as follows (details of the derivation can be found in the section of methods and systems described below):

$$i_{camera}(x,y) = \eta \int i_{SLM}\left(\frac{x}{m}, \frac{y}{m}, k\right)dk = \quad (1.4)$$

$$\varepsilon\eta\int i\left(\frac{x}{mM}, \frac{y}{mM}, k\right)f\left(k, \frac{y}{m}\right)dk = \varepsilon\eta\gamma_0(0)g\left(\frac{x}{mM}, \frac{y}{mM}\right) +$$

$$\frac{\varepsilon\eta R_0}{2}e^{j(\alpha_y\frac{y}{m}-\phi)}\left[\gamma_0(\tau)\otimes A^*\left(\frac{x}{mM}, \frac{y}{mM}\right)\right]\Big|_{\tau=2z-z_{SLM}} +$$

$$\frac{\varepsilon\eta R_0}{2}e^{-j(\alpha_y\frac{y}{m}-\phi)}\left[\gamma_0(\tau)\otimes A\left(\frac{x}{mM}, \frac{xy}{mM}, \tau\right)\right]\Big|_{\tau=z_{SLM}-2z}$$

where $\varepsilon$ is a constant accounting for system efficiency, $\eta$ is a constant representing detector sensitivity, m is the magnification from the SLM 172 to the camera 180, $\gamma_0(z)$ is related to source spectrum $S_0(k)$ through Fourier transform and represents coherence gating of the interferometric imaging system, and $\otimes$ represents convolution along z dimension. According to Equation (1.4), the sinusoidal pattern f(k,y) effectively selects $z_{SLM}$ as the imaging depth, because $\gamma_0(2z-z_{SLM})$ and $\gamma_0(-2z+z_{SLM})$ diminishes as z/2 deviates from $z_{SLM}$. On the other hand, the modulation parameter $\alpha_y y$ in Equation (1.3) results in a sinusoidal waveform in Equation (1.4) along y dimension ($\exp(j\alpha_y y/m-\phi)$ and its complex conjugate, and enables the retrieval of the phase $\phi$. The waveform is created through optical computation and its fringe density is determined by $\alpha_y$. By utilizing a pattern with larger $\alpha_y$, the system 100 can achieve a high spatial resolution.

In some embodiments, the Equation (1.4) can be expressed as Equation (1.4') as follows:

$$i_{camera}(x,y) = \quad (1.4')$$

$$r_0(x,y) + \frac{1}{2}e^{j(\alpha_y\frac{y}{m}-\phi)}r_s(2z-z_{SLM}) + \frac{1}{2}e^{-j(\alpha_y\frac{y}{m}-\phi)}r_s^*(2z-z_{SLM})$$

where $r_0(x,y)$ is a low frequency term, $$r_s(z) = \gamma_0(x)\otimes A*\left(\frac{x}{mM}, \frac{y}{mM}, z\right),$$

$\gamma_0(z)$ represents the axial point spread function (PSF) that is related to source spectrum $S_0(k)$ through Fourier transform, and $\otimes$ represents convolution along z dimension. According to Equation (1.4'), the sinusoidal component along k dimension in $f(k,y)$ ensures the signal comes from $z_{SLM}/2$, and the sinusoidal component along y dimension ensures creates a waveform $(\exp(j\alpha_y y/m-\phi)$ to facilitate phase extraction.

In step 308, the system 100 processes the 2D spatial data to extract phase information of the sample. For example, the system 100 receives the 2D spatial data form the detector 180 and process the 2D spatial data via the signal processing engine 130 on the computing device 102. To obtain the phase, the system 100 can generate a 2D Fourier transform $I_{camera}(\xi)$ of the 2D spatial data $i_{camera}(x,y)$ expressed as Equation (1.5) as follows:

$$i_{camera}(\xi) = mM\eta\varepsilon\gamma_0(0)G(mM\xi) + mM\eta\varepsilon\gamma_0(0)\frac{R_0}{2}[I_{sample}(mM(\xi-\alpha)) + I^*_{sample}(-mM(\xi-\alpha))] \quad (1.5)$$

where $\xi$ is the spatial frequency vector $\xi=[\xi_x, \xi_y]'$, $\alpha=[0, \alpha_y/m]'$, and $I_{sample}(\xi)$ is the spatial frequency domain representation of $i_{sample}(x,y)$ expressed as Equation (1.6) as follows:

$$i_{sample}(x,y)=A(x,y)e^{j\phi(x,y)} \quad (1.6)$$

Figure 4E:
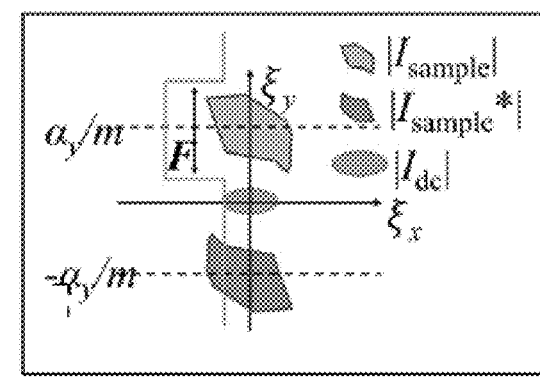
FIG. 4E illustrates a spatial frequency domain signal after SLM modulation.

According to Equation (1.6) and FIG. 4E, $I_{camera}(\xi)$ has a term $I_{sample}(mM(\xi-\alpha))$ that is displaced from DC term $(\eta\varepsilon\gamma_0 G(\xi))$ and $I_{sample}*(-mM(\xi-\alpha))$. Therefore, the system 100 can obtain $I_{sample}(\xi)$ from $I_{camera}(\xi)$, following spatial frequency domain filtering, frequency shifting and scaling. With $I_{sample}(\xi)$ is obtained, the system 100 can perform inverse Fourier transform to obtain complex $i_{sample}(x,y)$ and extract $\phi(x,y)$. The signal originates from depth $z_{SLM}/2$ because of coherence gating and optical computation (Equation (1.4)) and the phase measured is in fact $\phi(x,y,z_{SLM}/2)$.

In some embodiments, the system 100 can generate a 2D Fourier transform $I_{camera}(\xi)$ of the 2D spatial data $i_{camera}(x,y)$. Utilizing the Fourier transform property of a modulated signal, $I_{camera}(\xi)$ is expressed as Equation (1.5') as follows:

$$I_{camera}(\xi)=R_0(\xi)+\hat{I}_{sample}(mM(\xi-\alpha))+\hat{I}_{sample}*(-mM(\xi-\alpha)) \quad (1.5')$$

where $\xi$ is the spatial frequency vector $\xi=[\xi_x, \xi_y]'$, $\alpha=[0, \alpha_y/m]'$, and $R_0(\xi)$ is the 2D Fourier transform of $r_0(x,y)$, and $\hat{I}_{sample}$ is defined in Equation (1.7). In Equation (1.5'), the first term is located at the origin of the spatial frequency plane, while the second and third terms are displaced from each other, as illustrated in FIG. 4E, which illustrates a spatial frequency domain signal after SLM modulation. Therefore, $\hat{I}_{sample}(\xi)$ can be obtained from $I_{camera}(\xi)$, following spatial frequency domain filtering, frequency shifting and scaling. $\hat{I}_{sample}(\xi)$ can be expressed as Equation (1.7) as follows:

$$\hat{I}_{sample}(\xi)=\gamma_0(2z-z_{SLM})\otimes(I_{sample}(\xi,2z-z_{SLM})) \quad (1.7)$$

The system 100 can generate an inverse Fourier transform $\hat{I}_{sample}(x,y)$ of the processed 2D Fourier transform $\hat{I}_{sample}(\xi)$ to generate a spatial domain signal having the phase information and amplitude information of the sample. Spatial domain signal, $\hat{I}_{sample}(x,y)$ can be expressed as Equation (1.8) as follows:

$$\hat{i}_{sample}(x,y)=\gamma_0(2z-z_{SLM})\otimes(i_{sample}(x,y,2z-z_{SLM})) \quad (1.8)$$

Although $\hat{I}_{sample}(x,y)$ does not explicitly depend on depth z, the coherence gating of the system 100 convolution with the axial PSF in Equation (1.8)) effectively selects signal at depth $z_{SLM}/2$. Therefore, the amplitude and phase of the sample at depth $z_{SLM}/2$ can be estimated from $\hat{I}_{sample}(x,y)$. For example, the phase is an argument of the $\hat{I}_{sample}(x,y)$: $\hat{\phi}(x, y, z_{SLM}/2)=\arg(\hat{I}_{sample}(x,y))$. The amplitude is a magnitude of $\hat{I}_{sample}(x,y)$: $\hat{A}(x, y, z_{SLM}/2)=|\hat{I}_{sample}(x,y)|$.

Figure 5A:
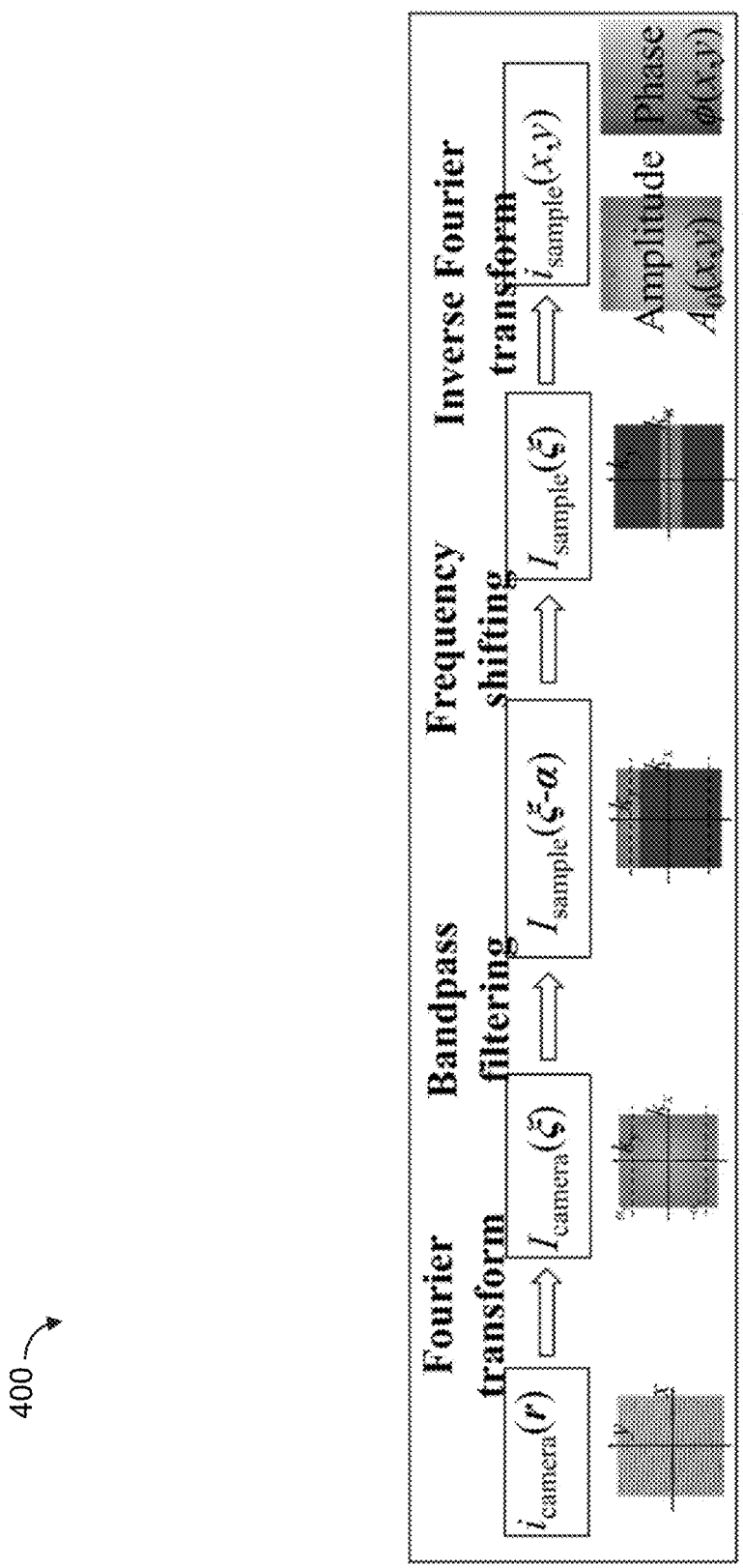
FIG. 5A illustrates a signal processing procedure of the present disclosure.

FIG. 5A illustrates a signal processing procedure 400 of the present disclosure. The signal processing procedure 400 based on Equations (1.4)-(1.6) are summarized. The phase $\phi$ depends on sub-resolution change in optical path length. Therefore, the change in phase is proportional to displacement in z dimension $\delta d=\delta z=(\delta\phi)/(4\pi)$ and the motion sensitivity of the system 100 is along z dimension.

Figure 5B:
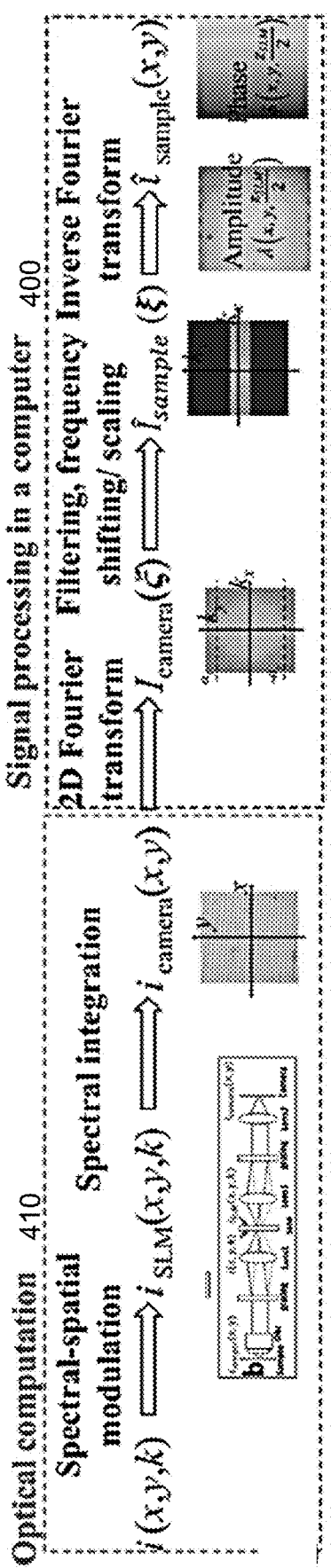
FIG. 5B illustrates optical computation and signal processing of the present disclosure.

FIG. 5B illustrates optical computation 410 and signal processing 400 of the present disclosure. The system 100 processes the 3D spatial-spectral data $i(x,y,k)$ in two steps, as summarized in FIG. 5B. Before detection, the optical computation assembly 170 performs the optical computation 410 to optically compute the inner product between $i(x,y,k)$ and a Fourier basis (sinusoidal modulation along k followed by integration with regard to k) to achieve depth resolution, and creates modulation in y direction to facilitate phase extraction. After detection by the 2D camera 180, the signal processing 400 can be accomplished in the computing device 102 based on Equations (1.5'), (1.7) and (1.8) via the signal processing engine 130 which performs 2D Fourier transform, bandpass filtering, frequency shifting/scaling, inverse Fourier transform, and amplitude and phase extraction.

In some embodiments, the axial resolution of the system 100 can be determined by Equation (1.8) and the bandwidth of the light source 162. The lateral resolution in x dimension can be determined by the mechanisms of the system 100, such as lens aberration or diffraction. In y dimension, the lateral resolution can be also determined by spatial frequency domain filtering (as shown in FIG. 4E). The full bandwidth of spatial frequency domain signal after filtering can $\alpha_y/(m)$ and the smallest structure resolvable in y direction has a dimension of $\delta y_{filt}=1/(\alpha_y/m)$. A denser modulation imposed to the SLM 172 will lead to a stronger resolving power in y dimension.

In some embodiments, the system 100 can achieve a 1 μm lateral resolution, 8.4 μm axial resolution, a nanoscale displacement sensitivity (2.8 nm), and frame rate up to 60 Hz determined by the SLM 172 updating rate. The system 100 can quantitatively study the dynamics of cells and magnetic nanoparticles, with motion introduced by an external magnetic field. Notably, the magnetic nanoparticles are not transparent objects and its axial motion cannot be quantified using a common phase imaging platform operated on transmission mode. The results of the system 100 can validate the capability to quantitatively image the cell-nanoparticle interaction with high spatiotemporal resolution and motion sensitivity. Examples are described with respect to FIGS. 6-9.

In some embodiments, the system 100 can be used to investigate the dynamics of cells, when the cells were mechanically driven by Fe nanoparticles and the nanoparticles were excited with an external magnetic field. The results described herein show the potential of the system 100 in studying the dynamic interaction between cells and extracellular objects, in vitro and in vivo. The system 100 can achieve a sub-nanometer displacement sensitivity. This is advantageous compared to conventional amplitude imaging modalities such as a high-resolution fluorescent microscope.

In addition, a low power light source with excitation wavelength in the near infrared range (730 nm) permits the system 100 for deep tissue in vivo imaging. The results described herein suggest that the system 100 has great potential to investigate the dynamics of cell when interacting with extracellular objects, in vitro and in vivo. The method described herein can allow long-time tracking of the interactions between cells and nanoparticles. In comparison, conventional end-point imaging observes the particles that have been fully taken by the cell normal images, and does not provide much information on the uptake process. The knowledge of these interactions can guide the design and engineering of proper nanoparticles on the rising of nanoparticle-based drug delivering systems. Examples are described with respect to FIGS. 6-9.

1.2 Experimental Results for Snapshot Quantitative Phase Imaging

Details about components used in the system 100 used can be found in the section of methods and systems described below. The system 100 can obtain results on the axial resolution, lateral resolution, and phase sensitivity of the system 100. 2D measurements can be taken by the camera 180. A mirror as the sample 168 can be placed at the sample arm, projected different patterns at the SLM 172 (Equation (1.3) with $z_{SLM}$=90 μm and different values of $α_y$), and the optical path length of the sample arm such that $z=z_{SLM}/2$=45 μm to maximize the contrast of the interference fringe.

FIGS. 6A-6C illustrate measurements taken by the camera 180 when the SLM 172 projected patterns with different $α_y$ values. $α_y$=0, 0.63, 1.26, 1.89 μm$^{-1}$. As ay increases, the measurements show increasingly denser fringe along y dimension.

FIGS. 6D-6F illustrate spatial frequency domain representations for FIGS. 6A-6C. FIGS. 6D-6F illustrate 2D Fourier transform of FIGS. 6A-6C, suggesting $I_{sample}(mM(ξ-α))$ and $I_{sample}*(-mM(ξ-α))$ are located further away from the origin with increasing $α_y$. When $α_y$=0, the signal is located at zero frequency (as shown in FIG. 6D).

FIG. 6G is a graphical depiction showing $α_y$ measured versus the value used to create SLM pattern. In FIG. 6G, the value of $α_y$ can be correlated to generate a modulation pattern according to Equation (1.3), and the frequency shift observed ($α_{measured}$) in the measurements. Consistency between $α_y$ and $α_{measured}$ can be clearly observed.

Results in FIGS. 6A-6G validated Equation (1.5) and validated the capability of optical computation to create different waveforms for phase extraction. Notably, for all the measurements described subsequently in the present disclosure, $α_y$=2.51 μm$^{-1}$ was used.

FIGS. 6H-6J show measurements taken by the camera 180 when the SLM 172 projected patterns with different $z_{SLM}$ values. FIGS. 6K-6M are amplitude images obtained using measurements in FIGS. 6H-6J. FIG. 6N is a graphical depiction showing axial PSF (circles: measurement; line: Gaussian fitting).

To evaluate the depth resolution of the system 100, a mirror was used as the sample 168, the mirror 168 was maintained at the same depth z=45 μm, and modulation patterns were created at the SLM 172 according to Equation (1.3) with $α_y$=2.51 μm$^{-1}$ and different $z_{SLM}$ ($z_{SLM}$=79 μm. 90 μm, and 101 μm). The measurements taken by the camera 180 are shown in FIGS. 6H-6J. The amplitude images were reconstructed and shown in FIGS. 6K-6M. When the sample position matches the depth selected by the SLM 172, the fringe has the highest contrast (as shown in FIG. 6I) and the amplitude signal has the highest magnitude (as shown in FIG. 6L). The mirror 168 can be maintained the at the same depth, varied $z_{SLM}$. Amplitude images can be obtained and the axial point spread function (PSF) for amplitude imaging of the system 100 can be obtained, using amplitude signal A (0,0, z-$z_{SLM}$/2) obtained with different $z_{SLM}$ (as shown in FIG. 6N). As shown in FIG. 6N, assuming a Gaussian PSF, the axial resolution was estimated to be 8.4 μm through curve fitting.

FIG. 6O shows an amplitude image of a first variable light grating target. FIG. 6P shows a phase image of the first variable light grating target. FIG. 6Q shows 3D surface profile of the first variable light grating target. FIG. 6R is a surface profile along a central row of the 3D surface profile in FIG. 6Q. FIG. 6S shows an amplitude image of a second resolution target. FIG. 6T shows a surface profile of the second resolution target rendered based on phase measurement.

To demonstrate the capability of the system 100 in measuring nanoscale optical path length variation, a first resolution target (Variable Line Grating Target, Thorlabs, R1L3S6P) and a second resolution target (e.g., 1951 USAF) were used as the sample 168. Following procedures summarized in FIG. 5, the system 100 obtained the complex sample reflectivity, the amplitude image (as shown in FIG. 6O) and the phase image (as shown in FIG. 6P). The vertical bars correspond to chrome pattern deposited to the glass substrate of the first resolution target. FIG. 6O shows amplitude signal varying between different bars, probably because of nonuniform illumination and variation in surface reflectivity. However, FIG. 6P shows a rather uniform phase signal corresponding to uniform height of the chrome layer.

The system 100 converted the phase to the height (d=φ/(4πλ$_0$)), and showed the 3D surface profile of the first resolution target in FIG. 6Q. The system 100 also plotted the height at the central row in FIG. 6R. The system 100 calculated the optical path length difference between the two regions of interests (ROI$_1$ from x=48 μm to x=55 μm; ROI$_2$ from x=69 μm to x=76 μm) to estimate the thickness of the chrome. The result obtained is 109 nm and is consistent with the chrome thickness provided by the manufacturer (120 nm).

The system 100 evaluated the transverse resolution by imaging the resolution target. The system 100 took measurements, and obtained the amplitude and phase image of the second resolution target. FIG. 6S shows the amplitude image. FIG. 6T shows the 3D surface topology of the second resolution target. The phase data in FIG. 6T was thresholded by the amplitude image, to suppress the large phase noise from the glass substrate where the amplitude signal is low. As indicated by the black oval in FIG. 6S, the system 100 can resolve the 1$^{st}$ element of the 9th group (~0.98 μm), in x and y direction, suggesting a 0.98 μm transverse resolution. To assess the sensitivity in phase measurement, the system 100 used a mirror as the sample 168, matched the optical path length (z=$z_{SLM}$/2), and obtained the phase image.

The system 100 selected a window at the center of the field of view. The size of the window was chosen to cover a resolution cell in transverse plane (7-by-7 window, given 0.14 μm sampling interval and 0.98 μm resolution). Within the window, the system 100 calculated op, the standard deviation of the extracted the phase, to assess the phase sensitivity. The experimentally measured σφ was 0.048 rad, corresponding to a 2.8 nm displacement sensitivity.

1.3 Experimental Results for Label Free Imaging of Live Cells

After confirming the performance of the system 100 on samples (resolution targets and mirror) with well-known characteristics, the system 100 was used to image live Hela cells.

Figure 7A:
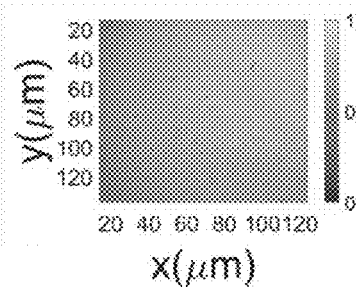
FIG. 7A illustrates a measurement taken from cultured HeLa cells (two cells are within the field of view).
Figure 7B:
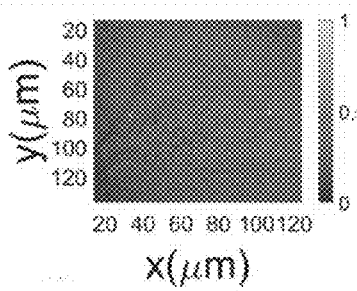
FIG. 7B is an amplitude image of the Hela cells in FIG. 7A.
Figure 7C:
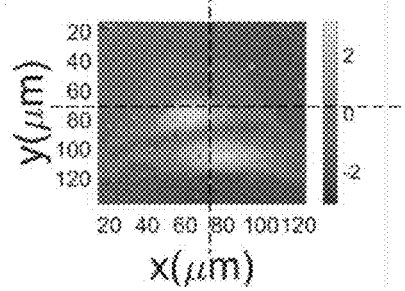
FIG. 7C is a phase image of the Hela cells in FIG. 7A.
Figure 7D:
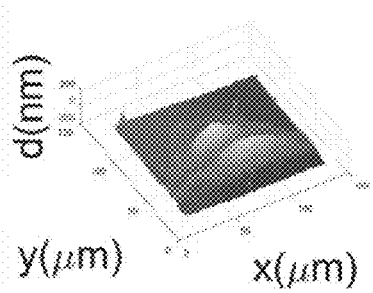
FIG. 7D is a 3D rendered surface profile of the HeLa cells in FIG. 7A
Figure 7E:
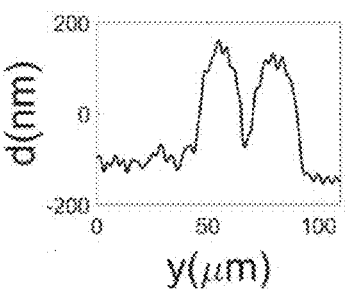
FIG. 7E is a graphical depiction showing a surface profile along the vertical line in FIG. 7C.
Figure 7F:
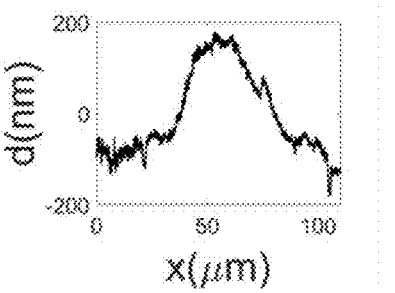
FIG. 7F is a graphical depiction showing a surface profile along the horizontal line in FIG. 7C.
Figure 7G:
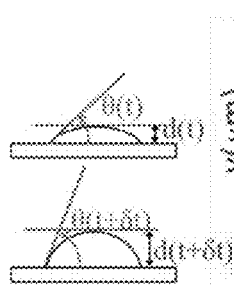
FIG. 7G illustrates a change in optical path length and angle with a culture dish, when cells detach from the culture dish.
Figure 7H:
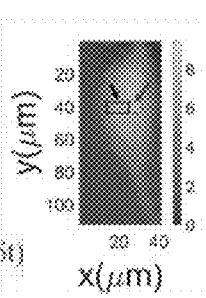
FIG. 7H illustrates a cell observed during detachment process.
Figure 7I:
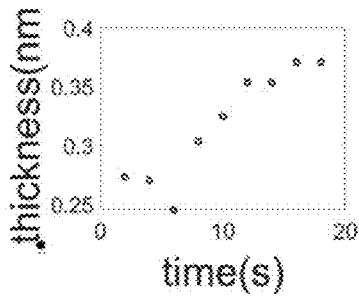
FIG. 7I illustrates a change in optical path length.
Figure 7J:
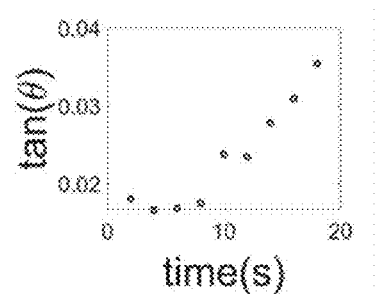
FIG. 7J illustrates a change in angle between the cell and the culture dish substrate in FIG. 7H.

FIG. 7A shows a measurement taken from cultured Hela cells (two cells are within the field of view). FIG. 7B shows an amplitude image. FIG. 7C shows a phase image. FIG. 7D shows a 3D rendered surface profile of the cells. FIG. 7E is a graphical depiction showing a surface profile along the vertical line in FIG. 7C. FIG. 7F is a graphical depiction showing a surface profile along the horizontal line in FIG. 7C. FIG. 7G shows a change in optical path length and angle with the culture dish, when the cells detach from the culture dish. FIG. 7H shows the cell observed during the detachment process. FIG. 7I shows a change in optical path length. FIG. 7J shows a change in angle between the cell and the culture dish substrate.

FIGS. 7A-7D show snapshot measurements taken by the camera 180, the amplitude image, the phase image and the 3D surface profile of the cells. Two individual cells can be observed within the field of view. The phase image in FIG. 7C shows cell morphology consistent with HeLa cells observed in other quantitative phase imaging techniques. Clear cell body can be observed and a larger phase retardation is found at regions corresponding to the nucleus. The contrast of FIG. 7C is significantly higher than the contrast of FIG. 7B, because cells are highly transparent and do not alter the amplitude of incident light significantly.

The system 100 selected two lines in FIG. 7C (vertical line for x=76 μm and horizontal line for y=69 μm), converted the phase signal to optical path length, and showed the optical path lengths in FIGS. 7E and 7F. FIG. 7E shows a lower noise level and blurred structural details compared to FIG. 7F. This is because bandpass filtering (in FIG. 5) is utilized to extract $I_{sample}(mM(\xi-\alpha))$, which removes the noise and limits the signal bandwidth. The system 100 also imaged label free HeLa cells over extended time period. The system 100 used Trypsin (a serine protease that breaks down the proteins which enable cell adhesion) to introduce cell dissociation and detachment from the dish. When the cells are fully detached from the substrate of the culture dish, the cell body becomes a sphere.

During the detachment process, the dry mass of the cell becomes more concentrated in its center. As a result, the optical path length (d) at the center of the cell, and the angle (θ) between cell surface and culture dish substrate are expected to increase over time (FIG. 7G where the change is exaggerated for illustration purpose). The phase image of the cell selected for observation is shown in FIG. 7H. The first measurement was taken immediately after Trypsin was added to the cell culturing medium (t=0). Afterwards, a snapshot measurement was taken every two minutes. The system 100 calculated the mean value of the optical path length within the region enclosed by the red rectangle in FIG. 7H and showed the results in FIG. 7I. An increase in optical path length over time is observed.

To evaluate the angle θ, the system 100 selected the region corresponding to the edge of the cell, as indicated by the black rectangle in FIG. 7H. Within this region, the optical path length increases as x because more dry mass is located at the center of the cell. The system 100 averaged the phase along y dimension, converted the phase to optical path length and obtain $d_{ROI}(x)$. Assuming $d_{ROI}(x)$ has a linear dependence on x ($d_{ROI}(x)=\tan(\theta)x+b$), the system 100 obtained the slope tan (θ) through linear fitting and show the result in FIG. 7J. FIG. 7I shows sub-nanometer thickness change, while the displacement sensitivity was characterized to be 2.8 nm. This is feasible because the optical path length (d) was evaluated from a region with 4000 pixels and the mean value of the phase evaluated within the region was expected to have a smaller standard deviation $$\left(\frac{2.8}{\sqrt{4000}} \text{ nm} = 0.044 \text{ nm}\right).$$

1.4 Experimental Results for Dynamic Imaging of Cells and Nanoparticles

With depth resolution achieved via coherence gating and optical computation, the system 100 operated in a reflective mode has the unique capability to image a more complicated environment where cells dynamically interact with extracellular nontransparent particles. The system 100 was first used to image the dynamics of nanoparticles attached to a live cell. The system 100 added magnetic nanoparticles to the dish where HeLa cells were cultured. The system 100 acquired 200 frames of data over a 24 s time period, and summarize the results in FIGS. 8A-8L.

FIG. 8A shows an amplitude image of a HeLa cell and clusters of nanoparticles (arrows) sedimented to the surface of the cell. FIG. 8B is a phase image. FIGS. 8C-8F illustrate 3D surface profiles showing the motion of nanoparticles (arrows). FIGS. 8G-8I illustrate an overlaid amplitude image and Doppler image that show the motion of the nanoparticles. FIG. 8J is a graphical depiction showing an axial velocity assessed for regions with (black) nanoparticles within the time window when images in FIGS. 8G-8I were taken. FIG. 8K is a graphical depiction showing an axial velocity assessed for regions with (black) and without (blue) nanoparticles. FIG. 8L is a graphical depiction showing a Fourier analysis of axial velocity shown in FIG. 8K.

FIGS. 8A and 8B show amplitude and phase image obtained from one measurement of the sequence acquired. In FIG. 8A, regions corresponding to nanoparticle clusters (indicated by the arrows) show reduced signal magnitude, because of light attenuation induced by nanoparticles. The dimension of the nanoparticle cluster was in the order of 10 μm and the system 100 did not intend to image individual nanoparticles.

To mechanically excite the nanoparticles, the system 100 translated a permanent magnet (Neodymium Magnets) along the direction of light propagation periodically (1 Hz). The system 100 used the phase image to render the 3D surface profile of the cell body. FIGS. 8C-8F show the 3D surface profile of the cell obtained at different times. As indicated by the arrows, the surface topology changed over time due to the motion of the nanoparticles.

To highlight the dynamic imaging capability of the system 100, the system 100 performed Doppler analysis on the phase images obtained (200 frames). For each pixel of the phase image acquired at time t, the system 100 calculated the phase difference $(\delta\phi(t)=\phi(t)-\phi(t-\delta t))$ between the current frame and the previous frame. The result is equivalent to Doppler phase shift conventionally used to quantify instantaneous particle motion. For display, the system 100 denoted a positive phase shift using the color of red and a negative phase shift using the color of green, and overlaid the Doppler image with grayscale amplitude image.

FIGS. 8H-8I show the motion map overlaid with amplitude image, for different frames in the acquired sequence. Clearly, regions covered by nanoparticle clusters show visible green or red colors, suggesting high magnitude of axial motion. Other regions show grayscale with zero color saturation, because of negligible axial motion. To reveal the magnetic field induced motion quantitatively, the system 100 selected a region of interest (ROI, 3-pixel by 3-pixel) that is indicated by the black arrow in FIG. 8B (x=114 μm and y=36 μm). For each pixel within the ROI, the system 100 calculated the phase difference ($\delta\phi(t)=\phi(t)-\phi(t-\delta t)$) between the current frame and the previous frame. The system 100 converted the phase difference (averaged within the ROI) to instantaneous velocity along axial direction ($v(t)=\delta\phi(t)\lambda_0/(4\pi\delta t)$).

In FIG. 8J, the system 100 shows the velocity within the time window when images in FIGS. 8G-8I were taken. The data points corresponding to FIGS. 8G-8I are highlighted with red, gray and green circles. Quantitative measurements shown in FIG. 8J are consistent with results in FIGS. 8G-8I. The system 100 also shows the velocity estimation within this ROI for the entire measurement period as the black curve in FIG. 8K. For comparison, the system 100 selected a region free of nanoparticles as indicated by the Asterisk in FIG. 8B (x=86 μm and y=36 μm), quantified axial motion, and show the results as the blue curve in FIG. 8K. Consistent with images in FIGS. 8G-8I, FIG. 8K shows a larger magnitude of axial motion for the region covered by nanoparticle clusters. The system 100 performed Fourier analysis on the traces of motion and show the results in FIG. 8L. Result obtained from the region with nanoparticles (black curve) shows a peak at 1 Hz that was the frequency of external magnetic excitation, while result obtained from the other region (blue curve) does not show such a peak.

FIG. 9A shows an amplitude image obtained from a culture dish with detached HeLa cells and magnetic nanoparticles. FIG. 9B shows a phase image obtained from the culture dish in FIG. 9A. FIG. 9C shows a frame of a Doppler image that quantifies the instantaneous motion. FIG. 9D is a schematic showing the motion of the detached cell being similar to a ball on a rigid surface. FIGS. 9E-9G show adjacent frames of the Doppler image. The red arrow indicates a detached Hela cells; the black arrow indicates a nanoparticle cluster that could be driven mechanically with external magnetic field; and the white arrow indicates the transverse displacement taken by the cell between frames displaced.

The system 100 also was used to image the dynamics of cells driven by magnetic nanoparticles. In one embodiment, the system 100 added Trypsin to the cell culturing medium to introduce cell detachment, and waited until the cells fully detached from the substrate of the culture dish to take a spherical geometry. The system 100 shows the amplitude and phase images of the sample in FIGS. 9A and 9B. In the amplitude image as shown in FIG. 9A, a fully detached cell has a circular shape (red arrows). Cluster of nanoparticles corresponds to a region with lower amplitude (black arrow), similar to results shown in FIG. 8A. In the phase image as shown in FIG. 9B, the detached cells (red arrows) show alternating colors (yellow to blue and blue to yellow) along the direction of phase gradient. This is the phase wrapping artifact that arises due to a phase variation beyond the range of $[-\pi,\pi]$.

To excite motion, the system 100 used an external magnetic field to drive the nanoparticles, with the same approach utilized to obtain results of FIGS. 7A and 7B. The system 100 took the measurements (200 frames), reconstructed the phase images, and calculated the phase shift between the current frame and the previous frame to obtain the Doppler images that quantify instantaneous motion velocity (z direction). One of the Doppler frames ($53^{rd}$ frame) obtained is shown in FIG. 9C. Similar to FIG. 8G, the system 100 used the color of red to represent a positive phase shift and green to represent a negative phase shift.

Several observations can be made from FIG. 9C. First, the cell in proximity to the nanoparticle cluster had a large magnitude of motion (the detached cell closer to the top of the image), while the cell at a larger distance from the nanoparticle cluster (the detached cell at the center of the image) did not move significantly. Second, the Doppler phase shift is positive (red) in half of the cell and negative (green) in the other half. This implies the cell did not take a linear translation as a rigid body. Instead, the spherical cell behaved similar to a ball placed on a rigid surface. When the cell or the ball is mechanically disturbed, it rolls on the surface, resulting in positive axial velocity at one half of the sphere and negative velocity at the other half of the sphere as indicated in FIG. 9D.

To further illustrate this concept, the system 100 selected four pairs of frames from the sequence of Doppler images. The system 100 showed the region corresponding to the same moving HeLa cell in FIGS. 9E-9G and indicated the frame number in the display.

FIGS. 9E-9G show adjacent frames of the Doppler image. The red arrow indicates a detached Hela cells; the black arrow indicates a nanoparticle cluster that could be driven mechanically with external magnetic field; and the white arrow indicates the transverse displacement taken by the cell between frames displaced. The system 100 used a dashed circle in the left image to indicate the contour of the cell. On the right, the same dashed circle is used to indicate the previous location of the cell and a circle with solid line to indicate the current location of the cell.

With these two circles, the system 100 can determine the displacement of the cell in the transverse plane, as indicated by the arrow in the right image. To achieve the displacement indicated by the arrow in FIG. 9E, the left part of the ball (spherical cell) must roll towards the right, have a positive displacement and a positive Doppler phase (red). On the other hand, the right part of the ball must roll towards the left, have a negative displacement and a negative Doppler phase (green). Similar results are shown in FIGS. 9F and 9G. Results in FIGS. 9A-9G show that the system 100 can be used to quantitatively study the motion of freely moving cells.

1.5 Summary of Optically Computed Phase Microscopy

An advantages of the system 100 is its label free imaging capability. At the same time, the fast recording of the system 100 also permits the monitoring of fast dynamics, including cell migration and cell proliferation. As a proof-of-concept, the system 100 enables quantitative imaging of the dynamics when cells interact with nanoparticles. As shown in FIGS. 8A-8K and FIGS. 9A-9G, the system 100 reveals the morphology, optical properties, and motion of the microscopic objects. Particularly, the results of the present disclosure show the size of the nanoparticle clusters and provide quantitative measure of magnetic field induced motion. Following a similar experimental approach, the system 100 can be used to visualize and track varied nanoparticles and track how the cells uptake these nanoparticles over time.

With an increasing number of Food and Drug Administration (FDA) approved cases of nanoparticles based drug delivery systems, the system 100 can enable great potential of the disclosed technique in this field, as the cell-nanoparticle interactions are important factors to achieve efficiency and safe drug delivery. The functions of the system 100 can be added to a generic microscope, by adding a reference arm to create interference and inserting the optical computation assembly 170 between the interferometer 160 and the camera 180. Hence the technology can be easily integrated with existing microscopy technologies for biomedical studies. The cost of the system 100 can be further reduced by replacing the SLM 172 with photon masks that are made by depositing grayscale patterns to a glass substrate with high precision. The SLM 172 can be used in some embodiments, because it is programmable and flexible. It could vary the imaging depth and vary the modulation in y dimension.

The system 100 is different from conventional phase imaging techniques in its contrast mechanism, because it has depth resolution derived from low coherence interferometry and optical computation. According to Equation (1.4), the optical computation assembly 170 determines the imaging depth ($z_{SLM}/2$). The system 100 operated in a reflective mode can image transparent objects such as cultured cells and nontransparent objects such as nanoparticles (FIGS. 8A and 8B and FIGS. 9A and 9B). The system 100 can also resolve a thin layer from a bulk object that is nontransparent and scatters light. Therefore, the system 100, operated in a reflective mode, is translatable to in vivo applications on animals or human subjects. In comparison, it is challenging to perform in vivo imaging using a phase imaging system operated a transmission mode.

The depth resolution in the system 100 also enables Doppler analysis, which is critical for quantitative motion tracking as described herein. For example, the moving-object analysis engine 134 can perform quantitative motion tracking. In the system 100, the phase effectively quantifies the optical path length of light from the center of the scattering field within the selected resolution cell. When the sample moves, the mass within the resolution cell moves and the equivalent center of the scattering field displaces to result in a measurable phase shift. In comparison, a conventional phase imaging system that operates in a transmission mode measures the phase delay along the entire trajectory of light propagation. The system 100 demonstrated Doppler imaging on magnetic nanoparticles (FIGS. 8G-8L and FIGS. 9C-9G), and validated the capability of the system 100 to perform quantitative motion through Doppler analysis.

The system 100 is different from other phase measurement techniques based on low coherence interferometry such as conventional phase resolved OCT, because the waveform used for phase calculation does not come from interference (Equation (1.4)). Instead, the fringe used to calculate the phase is created by optical computation. When a low coherence light source is used, it is challenging to form a dense interference fringe in an extended area, while a denser fringe is needed for high resolution phase measurement. in the system 100, the "apparent fringe" is determined by SLM modulation in y dimension (Equation (1.3) and Equation (1.4), FIGS. 6A-6D). Therefore, the system 100 was able to control the density of the fringe pattern using the modulation parameter $\alpha_y$ to achieve a high transverse resolution (~0.98 μm), although a broadband source 162 with extended emission area (e.g., LED) was used to illuminate the interferometer 160. Nevertheless, the approach utilized to create fringe along y dimension is different from direct amplitude modulation. As suggested by Equation (1.4), the modulation is only applied to signal from the resolution cell located at $z_{SLM}/2$. Experimentally, if the sample is located at a different depth from $z_{SLM}/2$, fringe along y dimension simply does not appear.

In some embodiments, the system 100 can demonstrate the dynamic imaging capability using magnetic nanoparticles, because these nanoparticles move under external magnetic excitation and can be unambiguously identified. For the nanoparticle clusters, the motion (FIGS. 8A-8L) depended on their magnetic properties, the external magnetic field, and the mechanical properties of the environment (cell and cell culturing medium). The system 100 compared region with and without nanoparticles (FIGS. 8K and 8L), and correlated the frequency characteristics of the velocity with the alternating frequency of magnet field (FIG. 8L), to validate the motion was indeed excited by magnetic field.

1.6 Methods and Systems

A. Methods-Deriving Equation (1.4)

The signal modulated by the SLM 172 can be expressed as Equation (1.9). $i_{camera}(x,y)$ can be obtained by taking the integral of $i_{SLM}$ over k, expressed as Equation (1.10).

$$i_{SLM}(x, y, k) = \varepsilon i\left(\frac{x}{m}, \frac{y}{m}, k\right) f(k, y) \tag{1.9}$$

$$i_{camera}(x, y) = \varepsilon \eta \int i\left(\frac{x}{mM}, \frac{y}{mM}, k\right) f\left(k, \frac{y}{m}\right) dk \tag{1.10}$$

Plugging in Equation (1.2) and Equation (1.3) to Equation (1.10), Equation (1.11) is obtained for $i_{camera}(x,y)$. Modulated by fast fluctuating sinusoidal (or complex exponential) functions, terms in the second and third row of Equation (1.10) diminishes after integration, leading to Equation (1.12). Noting that the source spectrum $S_0(k)$ and the axial point spread function $\gamma_0(z)$ form a Fourier transform pair, integration with regard to k in Equation (1.12) can be performed to obtain Equation (1.13). Equation (1.4) can be obtained by expressing the integrations in Equation (1.13) as convolutions.

$$i_{camera}(x, y) = \varepsilon \eta \int S_0(k) g\left(\frac{x}{mM}, \frac{x}{mM}\right) dk + \tag{1.11}$$

$$\varepsilon \eta \int 2R_0 S_0(k) \mathrm{Re}\left[\int A\left(\frac{x}{mM}, \frac{x}{mM}, z\right) e^{2jkz} dz\right] dk +$$

$$\varepsilon \eta \int S_0(k) g\left(\frac{x}{mM}, \frac{x}{mM}\right) \cos\left(kz_{SLM} + \alpha_y \frac{y}{m}\right) dk +$$

$$\frac{\varepsilon \eta}{2} \int\int R_0 S_0(k) A\left(\frac{x}{mM}, \frac{x}{mM}, z\right) e^{j(2kz+kz_{SLM}+\alpha_y \frac{y}{m})} dz dk +$$

$$\frac{\varepsilon \eta}{2} \int\int R_0 S_0(k) A^*\left(\frac{x}{mM}, \frac{x}{mM}, z\right) e^{j(-2kz-kz_{SLM}-\alpha_y \frac{y}{m})} dz dk +$$

$$\frac{\varepsilon \eta}{2} \int\int R_0 S_0(k) A^*\left(\frac{x}{mM}, \frac{x}{mM}, z\right) e^{j(-2kz+kz_{SLM}+\alpha_y \frac{y}{m})} dz dk +$$

$$\frac{\varepsilon \eta}{2} \int\int R_0 S_0(k) A\left(\frac{x}{mM}, \frac{x}{mM}, z\right) e^{j(2kz-kz_{SLM}-\alpha_y \frac{y}{m})} dz dk$$

$$i_{camera}(x, y) = \varepsilon \eta \int S_0(k) g\left(\frac{x}{mM}, \frac{x}{mM}\right) dk + \tag{1.12}$$

$$\frac{\varepsilon \eta}{2} \int\int R_0 S_0(k) A^*\left(\frac{x}{mM}, \frac{x}{mM}, z\right) e^{j(-2kz+kz_{SLM}+\alpha_y \frac{y}{m})} dz dk +$$

$$\frac{\varepsilon \eta}{2} \int\int R_0 S_0(k) A\left(\frac{x}{mM}, \frac{x}{mM}, z\right) e^{j(2kz-kz_{SLM}-\alpha_y \frac{y}{m})} dz dk$$

$$i_{camera} = \varepsilon \eta \gamma_0(0) g\left(\frac{x}{mM}, \frac{x}{mM}\right) + \tag{1.13}$$

$$\frac{\varepsilon \eta R_0}{2} e^{j\alpha_y \frac{y}{m}} \int \gamma_0(2z - z_{SLM}) A^*\left(\frac{x}{mM}, \frac{x}{mM}, z\right) dz +$$

$$\frac{\varepsilon \eta R_0}{2} e^{-j\alpha_y \frac{y}{m}} \int \gamma_0(z_{SLM} - 2z) A\left(\frac{x}{mM}, \frac{x}{mM}, z\right) dz$$

$$i_{camera}(x, y) = \varepsilon \eta \gamma_0(0) g\left(\frac{x}{mM}, \frac{x}{mM}\right) + \tag{1.4}$$

$$\frac{\varepsilon \eta R_0}{2} e^{j(\alpha_y \frac{y}{m} - \phi)} \left[\gamma_0(\tau) \otimes A^*\left(\frac{x}{mM}, \frac{x}{mM}, \tau\right)\right]\bigg|_{\tau = 2z - z_{SLM}} +$$

-continued $$\frac{\varepsilon\eta R_0}{2}e^{-j(\alpha_y\frac{y}{m}-\phi)}\left[\gamma_0(\tau)\otimes A\left(\frac{x}{mM},\frac{x}{mM},\tau\right)\right]|_{\tau=z_{SLM}-2z}$$

B. Hardware Implementation

In some embodiments, as shown in FIG. 1, the light source 162 can be a mounted light emitting diode (LED) with 730 nm central wavelength and 40 nm bandwidth as the broadband source. In the Michelson interferometer 160, the input of the light source 162 can be directed to the reference arm and sample arm by the beam splitter 163A. A pair of water dipping objectives 164A and 164B (40× Nikon CFI APO NIR Objective, NA=0.8) can be used in front of the sample and reference reflector, respectively. The interferometric spectrum can be dispersed by a 1200/mm grating 174, modulated by a 2D SLM 172 (Holoeye LC-R 720), and detected by a CMOS camera 180 (Basler acA2000). The achromatic doublet lens 176A in front of the SLM 172 can have a focal length of 400 mm and the achromatic doublet lens 176B in front of the CMOS camera 180 can have a focal length of 200 mm. Notably, a polarized beam splitter (PBS) 163B can be inserted between the Michaelson interferometer 160. The PBS 163B can ensure that the light incident into the SLM 172 and the light detected by the camera 180 can have orthogonal polarization directions to achieve amplitude modulation by the SLM 172. The image acquisition can be synchronized with the clock of the SLM 172, such that the camera 180 can detect a stable modulation pattern projected by the SLM 172. The exposure time of the camera 180 can be adjusted to fully utilize the dynamic range of the camera 180. For continuous data acquisition, the frame rate can be measured to be 8.3 Hz, given an 100 milliseconds (ms) exposure time of the camera 180 for cell imaging.

C. Discretization of interferometric spectrum by SLM

Continuous variables are used in Equations as used herein, while the electronic devices used in the system 100 are digital. The system 100 can discretize time (t) using the clock from the camera 180 synchronized with the clock of the SLM 172, and can discretize transverse coordinate x and y using camera pixels. Notably, the SLM 172 can discretize the interferometric spectrum, which implicitly determines depth resolved imaging and sampling in z dimension. At the SLM 172, A discrete pattern can be created to approximate Equation (1.3): $f_{discrete}(N_k, N_y) = 1 + \cos(\beta_k N_k + \beta_y N_y)$, where $N_k$ is the pixel index along a row of the SIM 172, $N_y$ is the pixel index along a column of the SLM 172, and $\beta_k$ and $\beta_y$ determine the frequency of the sinusoidal function. Considering continuous k-y plane sampled by SLM's pixels, $N_k$=[k/δk], $N_y$=[y/δy], where δk is the sampling interval for wavenumber k, $\delta_y$ is the sampling interval for y coordinate, k and y are shifted linearly to be centered at 0. Equation (1.3) becomes Equation (1.14) as follows:

$$f_{discrete}(N_k, N_y) \approx 1 + \cos\left[\left(\frac{\beta_k}{\delta_k}\right)k + \left(\frac{\beta_y}{\delta_y}\right)k\right] \quad (1.14)$$

The Equation (1.14) can imply $z_{SLM}=\beta_k/\delta k$ (δk=350 m$^{-1}$) was calculated according to the resolving power of the grating 174, the focal length of the lens 176A in front of the SLM 172, and the pixel size of the SLM 172. The system 100 can select the value of $\beta_k$ such that $z_{SLM}$=90 μm and the actual imaging depth is 45 μm because of the round-trip optical path taken by the sample light.

Due to the nonlinearity of the SLM 172, if one synthesizes a sinusoidal mask according to Equation (1.14) and projects the pattern to the SLM 172, the modulated imposed to the light spectrum is not sinusoidal. Therefore, the system 100 can experimentally characterize the mapping p between pixel value of the synthesized mask ($v_{syn}$) and the actual amplitude modulation value ($v_{actual}$): $v_{actual}$=p($v_{syn}$). The system 100 projected a $f_{calibrated}$=p$^{-1}$($f_{discrete}$) to the SLM 172.

D. Signal Processing in Computing Device

In some embodiments, the system 100 used Matlab 2021 to carry out the signal processing tasks. The system 100 followed procedures in FIG. 5 to obtain the amplitude and phase images. In generally, the system 100 did not perform image enhancement or noise suppression for 2D images presented (other than FIG. 7H). Results in FIGS. 7H-7J involved additional signal processing steps, because the detached cell resulted in a larger local variation of optical path length and different phase images showed different phase wrapping artifacts during the detachment process. To obtain results in Figure FIGS. 7H-7J, the system 100 applied a filter with a half width of $\alpha_y$m/6 in spatial frequency domain along the dimension of $\xi_y$. This suppressed the noise at the cost of spatial resolution. The system 100 unwrapped individual phase images and applied a median filter with a window size of 3.7 μm. 3D visualization of the surface topology is more vulnerable to noise. To suppress the noise, the system 100 applied Gaussian filtering with 2.2 μm standard deviation to the data used for 3D display. FIGS. 8C-8F only display signal within the cell body for visualization.

To obtain Doppler images in FIGS. 8 and 9, the system 100 calculated the augment for ($i_{sample}(x, y, t)i_{sample}^*(x, y, t-\Delta t)$). A mathematically equivalent approach is to extract the phase from each frame first and then calculate the phase difference. Conventionally, Doppler signal may also have phase wrapping artifact. A Doppler phase shift close to $2\pi$ or larger than $2\pi$ is likely due to phase wrapping artifact. The system 100 identified pixels affected by phase wrapping, and corrected the phase wrapping along the time dimension: $\delta\phi_{corrected}=\delta\phi_{Doppler}-2\pi\cdot\text{sign}(\delta\phi_{Doppler})$ s further described below.

E. Cell Culture

HeLa cells were cultured in Dulbecco's Modified Eagle Medium (DMEM) supplemented with 10% fetal bovine serum, 1% penicillin/streptomycin at 37° C. in a humidified 5% $CO_2$ incubator. For imaging, cells were seeded on confocal dish (MatTek) at the density of 4×10$^4$ cells per dish.

F. Nanoparticle Fabrication

Magnetic nanoparticles were prepared by hydrolyzing iron salts in alkaline solutions at room temperature using conventional methods. Ferrous chloride and ferric chloride were used as iron salts (0.05 mol/L), and mixed with 1,6-hexanedimaine solution (0.25 mol/L). After vigorous stirring for 24 hours, the precipitation was collected by filtration and washing with ultra pure water. The black solids were then coated with Pluronic F-127 to improve water solubility and reduce cell toxicity.

G. Comparison of Experimental Imaging Characteristics with Theoretical Estimation Results characterizing the performance of the system 100 are presented in FIG. 6. These results can be correlated with theoretical values based on the mathematical model for the system 100.

The theoretical axial resolution determined by coherence gating was estimated to be 5.9 μm ($\delta z=0.44\lambda_0^2/\delta\lambda$), assuming a Gaussian spectral shape of the light source with a full maximum of 40 nm ($\delta\lambda$=40 nm) as stated by the manufacturer of the light source 162. The experimental results disclosed herein show an ~8.4 μm axial resolution. Several factors may contribute to the difference. First, although the light source 162 has a 40 nm FWHM bandwidth, the effective bandwidth used for interferometric imaging is smaller because of spectral dependent light attenuation by various components used in the system 100. Second, the SLM 172 generated a discrete sinusoidal pattern to represent Equation (1.3), assuming the wavenumber interval ($\delta k$) covered by each SLM pixel is a constant across all the pixels of the SLM 172. However, the nonlinearity of wavenumber in spectrometer is known to result in a compromised axial resolution in conventional OCT imaging. Nevertheless, in some embodiments, the image depth was chosen to be 45 µm for cell imaging. Such a small offset did not result a significant resolution deterioration.

The theoretical lateral resolution determined by diffraction is calculated to be $\delta r_{diff} \approx 0.55$ µm for the objective with NA=0.8 ($\delta r_{diff} = 0.61 \lambda_0/NA$). In y dimension, the lateral resolution is also determined by spatial frequency domain filtering (as shown in FIG. 4E and FIG. 5). The full band width of spatial frequency domain signal after filtering is $\alpha_y/(2m)$. Hence, the smallest structure resolvable in y direction has a dimension of $\delta y_{filt} = 1/(\alpha_y/m)$. With $\alpha_y = 2.51$ µm$^{-1}$ and m=0.5, $\delta y_{filt} \approx 0.8$ µm. When these two factors are convolved, a lateral resolution along y dimension can be estimated $\delta_y = (\delta y_{diff}^2 + \delta y_{filt}^2)^{1/2} \approx 0.94$ µm, given $\delta y_{diff} = \delta r_{diff}$. This is consistent with the experimental result that shows a 0.98 µm lateral resolution. Signals from different x coordinates are processed in the system 100 as individual channels. Therefore, the lateral resolution along x dimension is higher and is expected to be close to $\delta r_{diff}$. As shown in FIG. 6S, the vertical bars in the 2$^{nd}$ and 3$^{rd}$ elements in group 9 can be resolved, suggesting a resolution up to 0.78 µm. The system 100 could not determine $\delta x$ further, determined by the smallest element in the second resolution target (3$^{rd}$ element in group 9).

The capability of the system 100 to detect subtle motion is determined by its phase sensitivity. The uncertainty in phase estimation is inversely related to the signal to noise ratio (SNR) in amplitude measurement ($\sigma_\Theta = \sqrt{3/SNR}$) and the SNR is proportional to the number of photons detected under shot noise limitation (SNR=$N_0 P_r/(P_r + P_s)$). Assuming $P_r = P_s$ and DC signal takes half of the quantum well of the camera pixel ($N_0 = N_{max}/2$ indicating the number of photons corresponding to reference light detected by the camera 180, $N_{max}$=5000 according to the camera specs), $\sigma_\varphi$ was estimated to be 0.033 rad and corresponded to a 1.9 nm sensitivity in displacement tracking. According to the experimental characterization, $\sigma_\phi$ was 0.048 rad, corresponding to a 2.8 nm displacement sensitivity. The mismatch might be due to the overestimation of SNR in the simplified model. Sub-nanometer displacement sensitivity has been achieved in Fourier domain OCT (FD OCT), because FD OCT utilizes measurements taken from multiple pixels to reconstruct spatial domain signal and has a 10 dB to 20 dB SNR advantage compared to time domain OCT. The displacement sensitivity of the system 100 (nanometer scale) is determined by the number of photons utilized for imaging. The motion sensitivity of the system 100 can be improved by utilizing a camera 180 with a larger light saturation capacity and utilizing pixel binning in the detection.

2. Quantitative Dynamic Cellular Imaging Based on 3D Unwrapped Optically Computed Phase Microscopy
2.1 Overview High resolution live cell imaging provides essential knowledge for cell biology and pharmacology. Imaging the dynamics of cells quantitatively is crucial to understand many important biomechanical and biomolecular processes. Phase resolved optical imaging derives its contrast from nanoscale (nanometer) sensitivity to the change of optical path length and provides a label-free approach to image the structure and dynamics of cells.

The system 100 can utilize the optical computation assembly 170 to process interferometric optical signals, achieving depth resolution and quantitative phase measurement. With the unique capability to perform quantitative phase imaging through snap shot measurement, the system 100 allows fast data acquisition and continuous observation of dynamic events, and it is expected to become a powerful label-free imaging technology. The system 100 can also continuously image cell dynamics.

In particular, cell detachment is a dynamic event and is important in cell biology. The study of cell detachment will result in better understanding of cell adhesion, which plays an important role in cell survival, spreading, migration, proliferation, and differentiation. However, conventional phase imaging techniques are affected by phase wrapping artifacts. Phase wrapping leads to incorrect interpretation of sample dynamics. Particularly, when continuous observation is applied, phase wrapping happens between pixels at different spatial coordinates, and between measurements taken at different times.

To unwrap the phase, the system 100 can apply a novel 3D phase unwrapping method to the entire 3D data set. For 3D (x–y–t) measurement, when phase wrapping happens between two sampling points, the phase difference can be attributed to the x, y, or t dimension. The system 100 determines the dimension along which phase wrapping happens and performs unwrapping accordingly. The system 100 unwraps the phase by pursuing continuity in space and time, which is unique. The results demonstrate that the system 100 based on 3D phase unwrapping allows accurate spatial and temporal characterization of cell detachment. The system 100 lies in the 3D phase unwrapping method and quantitative motion tracking based on continuous phase imaging, which can provide a comprehensive solution for dynamic, label-free imaging with phase contrast. It is envisioned that the 3D unwrapping method provided by the system 100 can be used as a generic phase unwrapping method and can have a broad impact on various phase imaging modalities.

2.2 System and Method Overview

Figure 10:
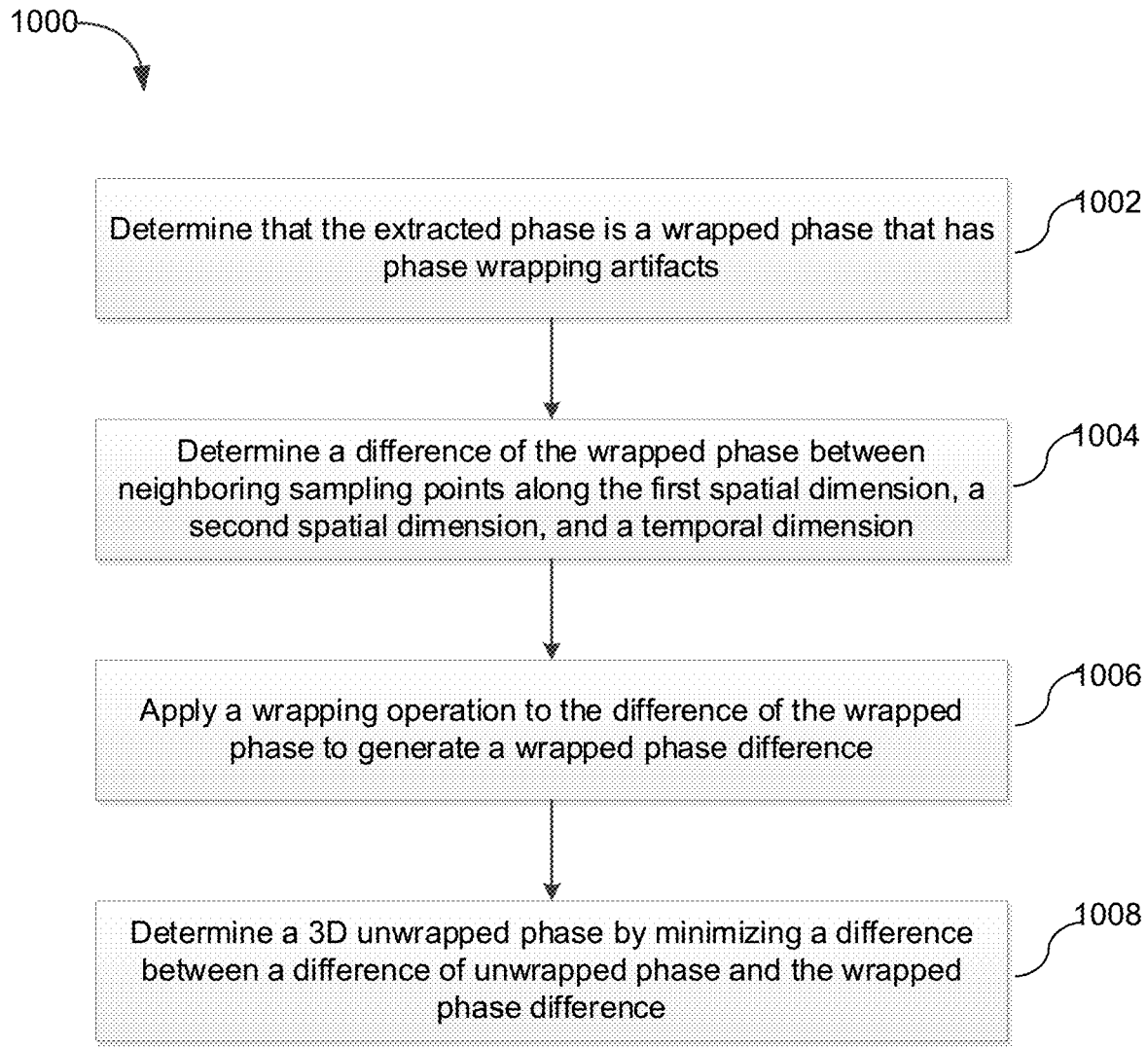
FIG. 10 is a flowchart illustrating overall processing steps for 3D phase unwrapping imaging carried out by the system of the present disclosure.

As described above, continuous phase imaging can be affected by phase wrapping artifacts, which affects correct quantification of sample dynamics. To address this issue, the system provides a 3D unwrapping method that exploits data correlation in space as well as in time and utilize the continuity of phase in time to achieve 3D phase unwrapping imaging to reduce phase wrapping artifact FIG. 10 is a flowchart illustrating processing steps 1000 for 3D phase unwrapping imaging carried out by the system 100 of the present disclosure. In step 1002, the system 100 determines that the extracted phase is a wrapped phase that has phase wrapping artifacts. For example, the system 100 can extract the phase using steps 302-308. The system 100 can use the phase extraction engine 132 to determine that the extracted phase is a wrapped phase that has phase wrapping artifacts.

As describe above, the optical computation assembly 170 effectively selects the imaging depth and enables phase extraction. The measurement taken by the camera 180 is processed by 2D Fourier transform, filtering, frequency shifting, and inverse 2D Fourier transform. The result is the complex optical field $I(I(x, y, t) = I_0(x, y, t)e^{j\Phi(x,y,t)})$. The phase of the optical wave accumulates as the light propagates. The phase accumulation is $2\pi$ when the light travels across a distance of one wavelength of the optical wave. The phase extracted from light interferometry is determined by the optical path length (d) according to Equation (2.1), where d(x, y, t) represents the displacement and $\lambda$ is the central wavelength of the light source. The dynamics of the sample can, thus, be quantified using $\phi$(x, y, t), $$d(x, y, t) = \frac{\lambda \phi(x, y, t)}{4\pi} \quad (2.1)$$

With the complex optical field (I(x, y, t)) obtained, the phase is calculated using arctangent function [Equation (2.2) where Im( ) represents taking the imaginary part of the complex signal and Re( ) represents taking the real part of the complex signal]. According to Equation (2.2), $\psi$(x, y, t)$\in$(−$\pi$, $\pi$] because the output of arctangent function is limited to (−$\pi$, $\pi$]. When the actual phase $\phi$(x, y, t) takes value beyond (−$\pi$, $\pi$], the wrapped $\psi$ is different from the actual phase $\phi$ by a multiple of $2\pi$, as shown in Equation (2.3) where n is an integer and W indicates the wrapping operation, $$\Psi(x, y, t) = \operatorname{atan}\left\{\frac{\operatorname{Im}(I(x, y, t))}{\operatorname{Re}(I(x, y, t))}\right\} \quad (2.2)$$

$$\Psi(x, y, t) = W[\phi(x, y, t)] = \phi(x, y, t) + 2\pi n(x, y, t); \quad (2.3)$$

$$-\pi < \psi(x, y, t) \leq \pi.$$

To correctly profile the spatial and temporal characteristics of the motion, it is critical to reconstruct $\phi$(x, y, t) from wrapped phase $\psi$(x, y, t). The system 100 can consider the continuity of phase in time.

In step 1004, the system 100 determines a difference of the wrapped phase between neighboring sampling points along the first spatial dimension, a second spatial dimension, and a temporal dimension. For example, the system 100 denoted the sampled phase as Equation (2.4), which is obtained by discretizing Equation (2.3) (x=$x_0$+i$\delta$x; y=$y_0$+j$\delta$y; t=$t_0$+k$\delta$t; i, j, and k are integers; $\delta$x, y, and $\delta$t are sampling intervals). $\phi_{i,j,k}$ is an element of 3D data $\phi$ with indices i, j, and k, $$\psi_{i,j,k} = W(\phi_{i,j,k}) = \phi_{i,j,k} + 2\pi n_{i,j,k}; -\pi < \psi_{i,j,k} \leq \pi. \quad (2.4)$$

The goal of 3D phase unwrapping is to determine $\phi_{i,j,k}$ from the measurement of $\psi_{i,j,k}$. To obtain $\phi_{i,j,k}$, the system 100 can consider the change of the phase $\phi$ between adjacent sampling points, $\phi_{i,j,k} - \phi_{i-1,j,k}$, $\phi_{i,j,k} - \phi_{i,j-1,k}$, $\phi_{i,j,k} - \phi_{i,j,k-1}$, along the first, second, and third dimension.

In step 1006, the system 100 applies a wrapping operation to the difference of the wrapped phase to generate a wrapped phase difference. For example, given sufficiently dense spatial and temporal sampling, the change is unlikely to take a value beyond (−$\pi$, $\pi$]. However, the change of the wrapped phase ($\psi_{i,j,k} - \psi_{i-1,j,k}$, $\psi_{i,j,k} - \psi_{i,j-1,k}$, $\psi_{i,j,k} - \psi_{i,j,k-1}$) can be smaller than −$\pi$ or larger than $\pi$ due to phase wrapping. For example, $\psi_{i,j,k} - \psi_{i-1,j,k} = (\phi_{i,j,k} + 2\pi n_{i,j,k}) - (\phi_{i-1,j,k} + 2\pi n_{i-1,j,k}) = \phi_{i,j,k} - \phi_{i-1,j,k} + 2\pi(n_{i,j,k} - n_{i-1,j,k})$ can have an absolute value larger than $\pi$ if $n_{i,j,k} \neq n_{i-1,j,k}$. Meanwhile, if one applies the wrapping operation to $\psi_{i,j,k} - \psi_{i-1,j,k}$, the result W ($\psi_{i,j,k} - \psi_{i-1,j,k}$) is likely to be the same as $\phi_{i,j,k} - \phi_{i-1,j,k}$. Based on such premise, $\phi_{i,j,k}$ can be obtained by minimizing f defined in Equation (2.5), where $\beta$ is a weight for the third dimension. In other words, the system 100 can choose $\phi_{i,j,k}$ such that the changes of $\phi$ (along i, j, and k) are consistent with the wrapped change of $\psi$ in the least squares sense. Notably, if the actual phase (without wrapping artifact) changes drastically (|$\delta\phi$|>$\pi$), the system 100 is expected to have a suboptimal performance. A denser sampling is needed, indicating a larger amount of data acquired, $$f = \sum_{i,j,k} [(\phi_{i,j,k} - \phi_{i-1,j,k}) - W(\psi_{i,j,k} - \psi_{i-1,j,k})]^2 + \quad (2.5)$$

$$\sum_{i,j,k} [(\phi_{i,j,k} - \phi_{i,j-1,k}) - W(\psi_{i,j,k} - \psi_{i,j-1,k})]^2 +$$

$$\beta \sum_{i,j,k} [(\phi_{i,j,k} - \phi_{i,j,k-1}) - W(\psi_{i,j,k} - \psi_{i,j,k-1})]^2$$

The major difference between our approach and other conventional methods is that the system 100 can consider the continuity of phase in the third dimension (time). 2D phase unwrapping methods pursue data continuity along x and y. Therefore, the unwrapped 2D phase image can have an arbitrary ($\alpha$) offset for all the pixels: $\phi=\phi+\alpha$. When 2D phase unwrapping is applied to individual 2D frames to a series of phase images, $\alpha$ can be different for different frames, resulting in incorrect temporal characterization of the phase. The system 100 considers phase continuity in time [the third term on the right-hand side of Equation (2.5)], which is critical for continuous observation of nanoscale dynamics.

In step 1008, the system 100 determines a 3D unwrapped phase by minimizing a difference between a difference of unwrapped phase and the wrapped phase difference. In some embodiments, the system 100 can minimize the difference uses a non-iterative and transform-based method. For example, the system 100 can generate a 3D discrete cosine transform of the wrapped phase difference. The system 100 can apply a coefficient correction to the 3D discrete cosine transform. The system 100 can estimate the 3D unwrapped phase by taking an inverse 3D discrete cosine transform on the corrected 3D discrete cosine transform, as further described below and with respect to FIG. 11.

For example, to obtain $\phi_{i,j,k}$ that minimizes f, the system 100 can rewrite Equation (2.5) as Equation (2.6), where $\phi_{jk} = [\phi_{1,j,k}, \phi_{2,j,k}, \phi_{3,j,k}, \ldots]'$, $\phi_{ik} = [\phi_{i,1,k}, \phi_{i,2,k}, \phi_{i,3,k}, \ldots]'$, $\phi_{ij} = [\phi_{i,j,1}, \phi_{i,j,2}, \phi_{i,j,3}, \ldots]'$, $v_{jk} = W(\psi_{i,j,k} - \psi_{i-1,j,k})$, $v_{ik} = W(\psi_{i,j,k} - \psi_{i,j-1,k})$, $$v_{ik} = W(\psi_{i,j,k} - \psi_{i,j,k-1}), A = \begin{bmatrix} 1 & -1 & 0 & \ldots \\ 0 & 1 & -1 & \ldots \\ \ldots & \ldots & \ldots & \ldots \end{bmatrix}$$

$(A_{i,j} = 1 \text{ for } i = j; A_{i,j} = -1 \text{ for } j = i+1; \text{ otherwise } A_{i,j} = 0).$ is minimized when its gradient with regard to $\phi_{i,j,k}$ vanishes to 0, leading to Equation (2.7), where $\rho_{i,j,k}$ is defined as Equation (2.8). To estimate the actual phase $\phi_{i,j,k}$, the system 100 can apply 3D DCT to Equation (2.7), resulting in Equations (2.9) and (2.10), where $\Phi_{i',j',k'}$ and $P_{i',j',k'}$ are the 3D DCT (D) of $\phi_{i,j,k}$ and $\rho_{i,j,k}$ ($\Phi=D\phi$ and $P=D\rho$), respectively. With $\Phi_{i',j',k'}$ obtained for all the i', j', and k', the system 100 can estimate the 3D phase to be $\phi$ by taking inverse 3D DCT ($D^1$) on $\Phi$ as shown in Equation (2.11). The process of 3D phase unwrapping is summarized in FIG. 11. When implemented using MATLAB 2022 on a Mac computer (Macbook Pro, with Apple M1 CPU and 8 GB RAM), it takes on average 0.45 s to process one frame of a phase image. The processing speed can be significantly improved if the computation is implemented in parallel using a GPU. Although MATLAB can directly run the algorithm using a GPU, it does not significantly improve the processing speed without major optimization of the code. In some embodiments, the system 100 can implement the algorithm using CUDA to accelerate the processing through parallel computation if needed. In Equations (2.5) and (2.6), β is introduced to balance the contribution from x, y, and t dimension. In solving the optimization problem for simulated and experimental data, β=0.05, and the value is chosen empirically to ensure accurate reconstruction of both the spatial profile of the phase and the temporal profile of the phase, $$f = \sum_j \sum_k \|A\phi_{jk} - v_{jk}\|^2 + \sum_i \sum_k \|A\phi_{ik} - v_{ik}\|^2 + \beta \sum_i \sum_j \|A\phi_{ij} - v_{ij}\|^2 \quad (2.6)$$

$$(4 + 2\beta)\phi_{i,j,k} - \phi_{i-1,j,k} - \phi_{i+1,j,k} - \qquad (2.7)$$

$$\phi_{i,j-1,k} - \phi_{i,j+1,k} - \beta\phi_{i,j,k-1} - \beta\phi_{i,j,k+1} = \rho_{i,j,k}$$

$$\rho_{i,j,k} = W(\psi_{i,j,k} - \psi_{i-1,j,k}) - W(\psi_{i-1,j,k} - \psi_{i-2,j,k}) + W(\psi_{i,j,k} - \psi_{i,j-1,k}) - \qquad (2.8)$$

$$W(\psi_{i,j-1,k} - \psi_{i,j-2,k}) + W(\psi_{i,j,k} - \psi_{i,j,k-1}) - W(\psi_{i,j,k-1} - \psi_{i,j,k-2}),$$

$$(4 + 2\beta)\Phi_{i',j',k'} - 2\cos\left(\frac{\pi i'}{2N_x}\right)\Phi_{i',j',k'} - \qquad (2.9)$$

$$2\cos\left(\frac{\pi j'}{2N_y}\right)\Phi_{i',j',k'} - 2\beta\cos\left(\frac{\pi k'}{2N_t}\right)\Phi_{i',j',k'} = P_{i',j',k'}$$

$$\Phi_{i',j',k'} = \frac{P_{i',j',k'}}{4 + 2\beta - 2\cos\left(\frac{\pi i'}{2N_x}\right) - 2\cos\left(\frac{\pi j'}{2N_y}\right) - 2\beta\cos\left(\frac{\pi k'}{2N_t}\right)} \quad (2.10)$$

$$\hat{\phi} = D^{-1}(\Phi) \qquad (2.11)$$

Figure 11:
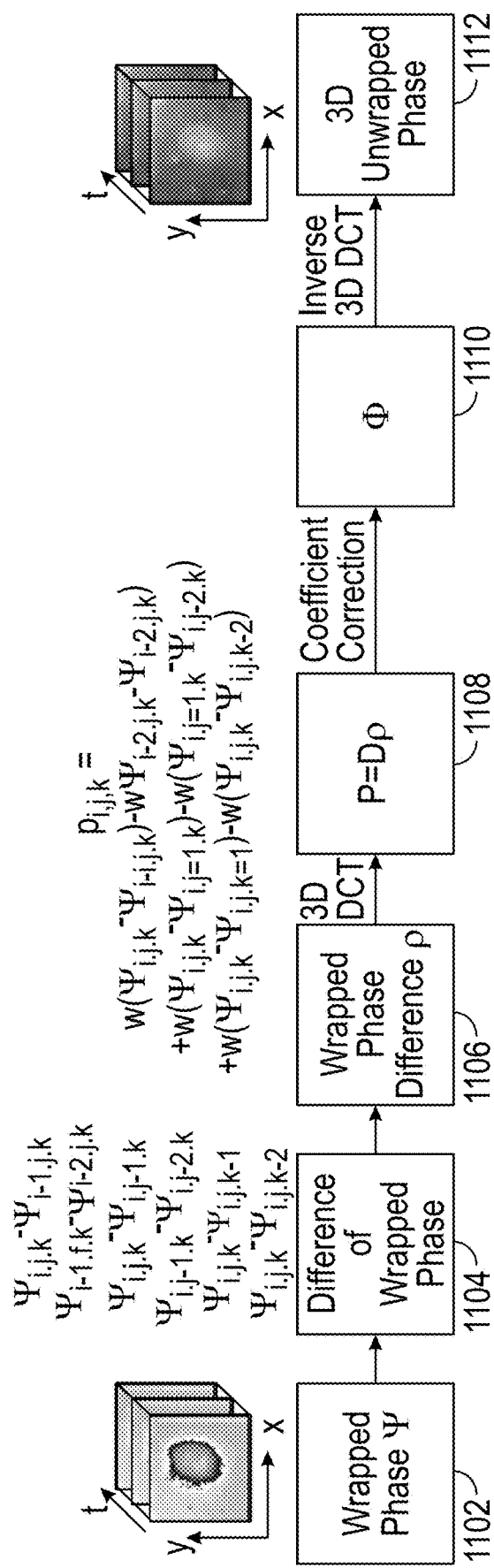
FIG. 11 is a flowchart illustrating example processing steps for 3D phase unwrapping imaging carried out by the system of the present disclosure.

FIG. 11 is a flowchart illustrating processing steps 1100 for 3D phase unwrapping imaging carried out by the system 100 of the present disclosure. In step 1102, the system 100 can determine that a phase is wrapped as described with respect to step 1002. In step 1104, the system 100 can determine a difference of the wrapped phase between neighboring sampling points as described with respect to step 1004. In step 1106, the system 100 can apply a wrapping operation to the difference of the wrapped phase to generate a wrapped phase difference as described with respect to step 1006. In step 1108, the system 100 can generate a 3D discrete cosine transform of the wrapped phase difference. For example, as described with respect to step 1008, the system 100 can apply 3D DCT to Equation (2.7), resulting in Equations (2.9) and (2.10). In step 1110, the system 100 can apply a coefficient correction to the 3D discrete cosine transform. For example, as described with respect to step 1008, the system 100 can use Equation (2.10) to perform the coefficient correction. In step 1112, the system 100 can estimate the 3D unwrapped phase by taking an inverse 3D discrete cosine transform on the corrected 3D discrete cosine transform. For example, as described with respect to step 1008, the system 100 can use Equation (2.11) to perform an inverse 3D discrete cosine transform to generate a 3D unwrapped phase.

2.3 Experimental Results

Figure 12I:
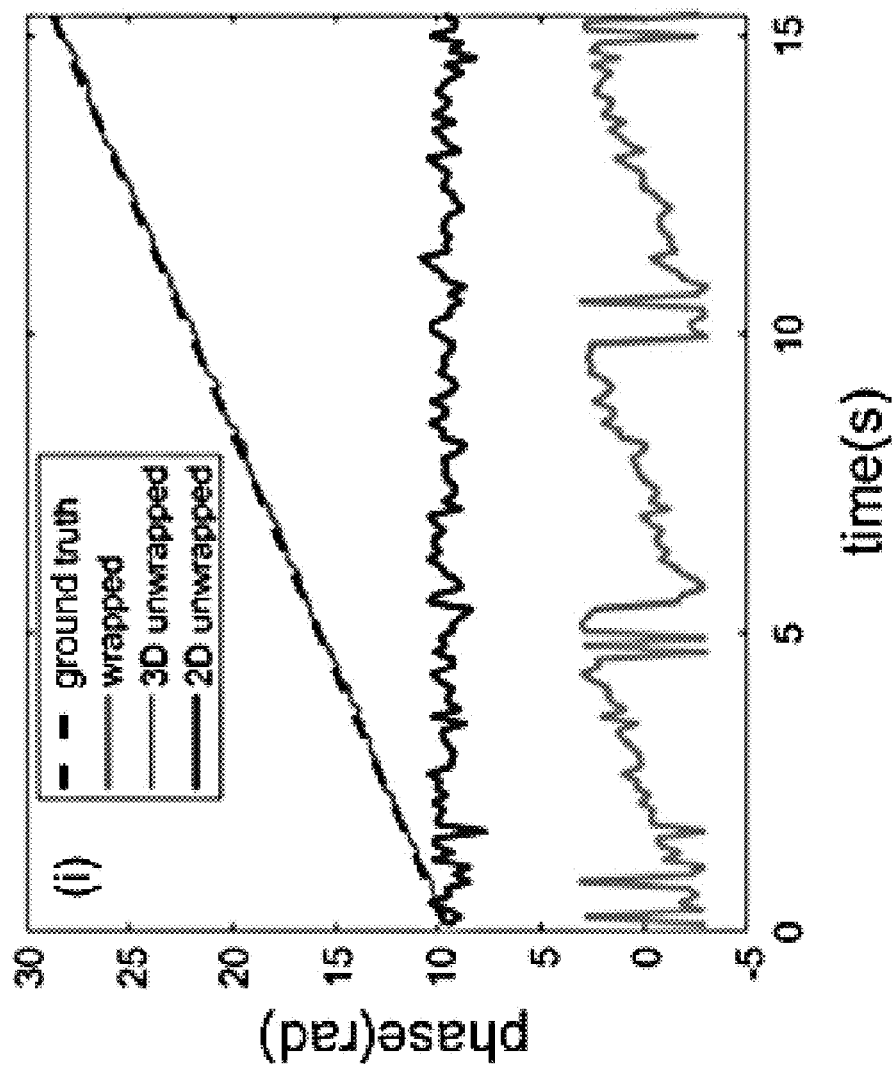
FIG. 12I is a diagram showing values of the central pixel for ground truth, wrapped phase, 2D unwrapped phase, and 3D unwrapped phase of FIGS. 12A-12H.

FIG. 12A illustrates a rendered 3D topology of ground truth phase for 1st frame. FIG. 12B illustrates a rendered 3D topology of ground truth phase for 50th frame. FIG. 12C illustrates a rendered 3D topology of wrapped phase for 1st frame. FIG. 12D illustrates a rendered 3D topology of wrapped phase for 50th frame. FIG. 12E illustrates a rendered 3D topology of 2D unwrapped phase for 1st frame. FIG. 12F illustrates a rendered 3D topology of 2D unwrapped phase for 50th frame. FIG. 12G illustrates a rendered 3D topology of 3D unwrapped phase for 1st frame. FIG. 12H illustrates a rendered 3D topology of 3D unwrapped phase for 50th frame. FIG. 12I illustrates a diagram showing values of the central pixel for ground truth, wrapped phase, 2D unwrapped phase, and 3D unwrapped phase of FIGS. 12A-12H.

The system 100 applied the 3D unwrapping method to simulated data and demonstrated its advantage for motion tracking. The system 100 simulated the actual phase (ϕ) using Equation (2.12), with a Gaussian phase profile and a global offset for all the pixels (A=10 rad; c=50; v=0.15 rad; i=1, 2, . . . , 1024; J=1, 2, . . . , 1024, k=1, 2, . . . , 128; assuming sampling intervals δx=δ_y=0.27 μm and δt=0.12 s), $$\phi_{i,j,k} = Ae^{\frac{(i-i0)^2 + (J-j0)^2}{c^2}} + vk \qquad (2.12)$$

The simulated $\phi_{i,j,1}$ and $\phi_{i,j,50}$ are shown in FIGS. 12A and 12B, and the wrapped phase ($\psi_{i,j,1}$ and $\psi_{i,j,50}$) are shown in FIGS. 12C and 12D. $\psi_{i,j,k}$ was obtained by wrapping $\phi_{i,j,k}$ with added noise $n_{i,j,k}$ that had a variance $\sigma^2/n=0.25$. The system 100 applied 2D phase unwrapping to $\psi_{i,j,1}$ and $\psi_{i,j,50}$. The results are shown in FIGS. 12E and 12F. The system 100 applied 3D phase unwrapping to the 3D wrapped phase ψ and show the 1st frame and 50th frame of the 3D unwrapped phase in FIGS. 12G and 12H. Accurately following the ground truth [FIGS. 12A and 12B], phase images obtained from 3D unwrapping [FIGS. 12G and 12H] show the change between the phase obtained at different sampling times. This is because the 3D unwrapping method pursues data continuity within each frame and between different frames. In comparison, wrapped phase [FIGS. 12C and 12D] and 2D unwrapped phase [FIGS. 12E and 12F] fail to track the motion along time (k that discretizes time t). In other words, the temporal characteristics of the dynamic process cannot be accurately characterized due to phase wrapping and arbitrary offset introduced in 2D unwrapping.

To further demonstrate the difference between 2D and 3D phase unwrapping, the phase of the pixel at $i_0=512$, $j_0=512$ is shown in FIG. 12I (ground truth phase $\phi_{i0,j0,k}$ as the black dashed line, wrapped phase $\psi_{i0,j0,k}$ as the green line, 2D unwrapped phase as the blue line, and 3D unwrapped phase as the red line). According to FIG. 12I, 2D unwrapping is not sensitive for detecting temporal phase changes between frames, and the same results are expected for other pixels of the image. The 3D unwrapped phase accurately follows the temporal change of the ground truth phase, while the 2D unwrapped phase does not change significantly over time due to the arbitrary offset introduced in the reconstruction process.

Figure 13B:
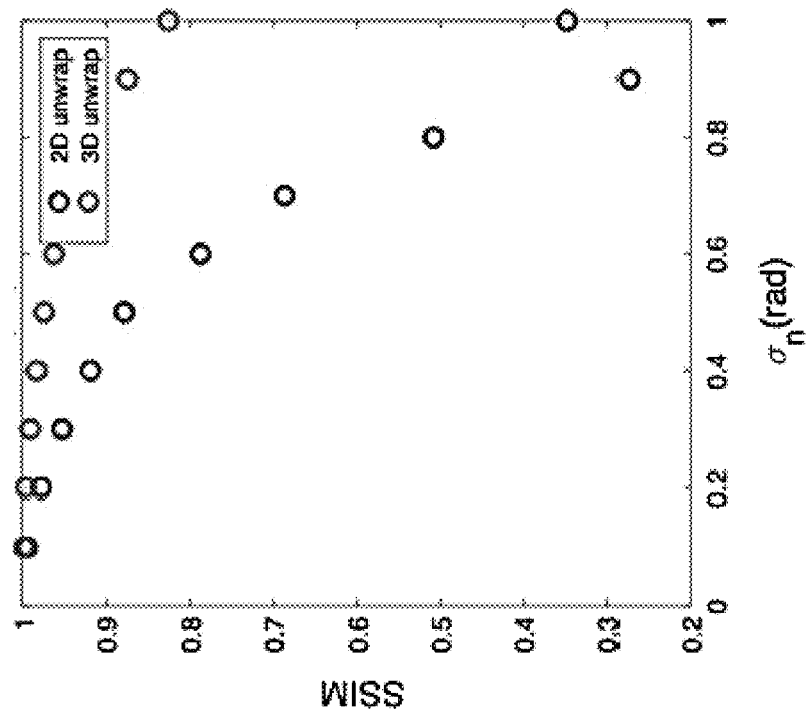
FIG. 13B is a diagram showing performance of 2D and 3D unwrapping of phase affected by noise using structural similarity index measure (SSIM).
Figure 13A:
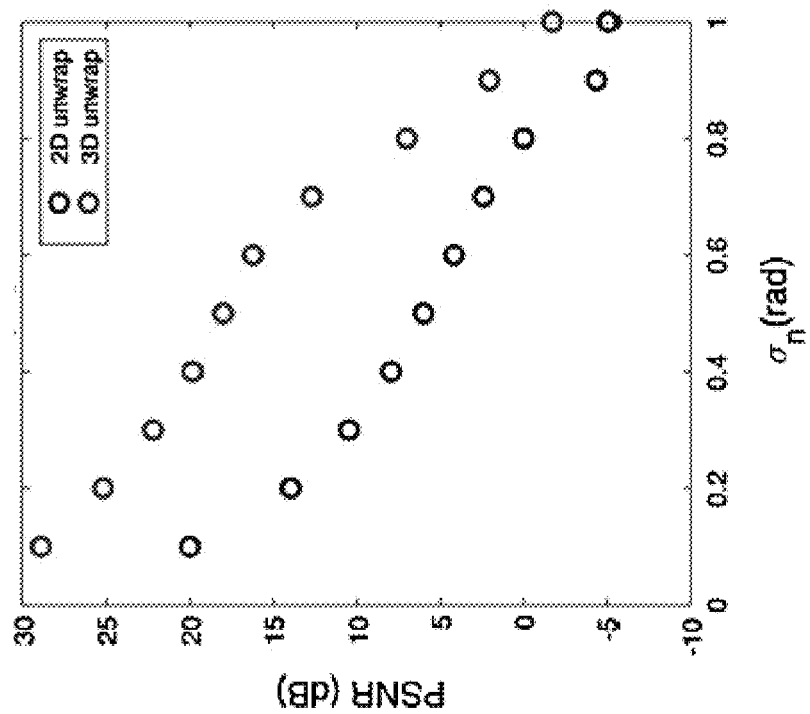
FIG. 13A is a diagram showing performance of 2D and 3D unwrapping of phase affected by noise using peak signal to noise ratio (PSNR).

FIG. 13A is a diagram showing performance of 2D and 3D unwrapping of phase affected by noise using peak signal to noise ratio (PSNR). FIG. 13B is a diagram showing performance of 2D and 3D unwrapping of phase affected by noise using structural similarity index measure (SSIM).

To demonstrate the robustness the 3D unwrapping method, the system 100 added phase noise with variance $\sigma^2/n$ to the simulated phase pattern [Equation (2.12)]. The system 100 compared the 2D unwrapped phase and 3D unwrapped phase with the ground truth and quantitatively evaluated the peak signal to noise ratio [PSNR in FIG. 13A] and the structural similarity index measure [SSIM in FIG. 13B] between the recovered phase and ground truth. Results in FIG. 13 show that 3D unwrapping provides higher phase reconstruction quality compared to 2D unwrapping. This is because 3D unwrapping considers data correlation in a third (time) dimension, leading to improved robustness against noise.

Figure 14B:
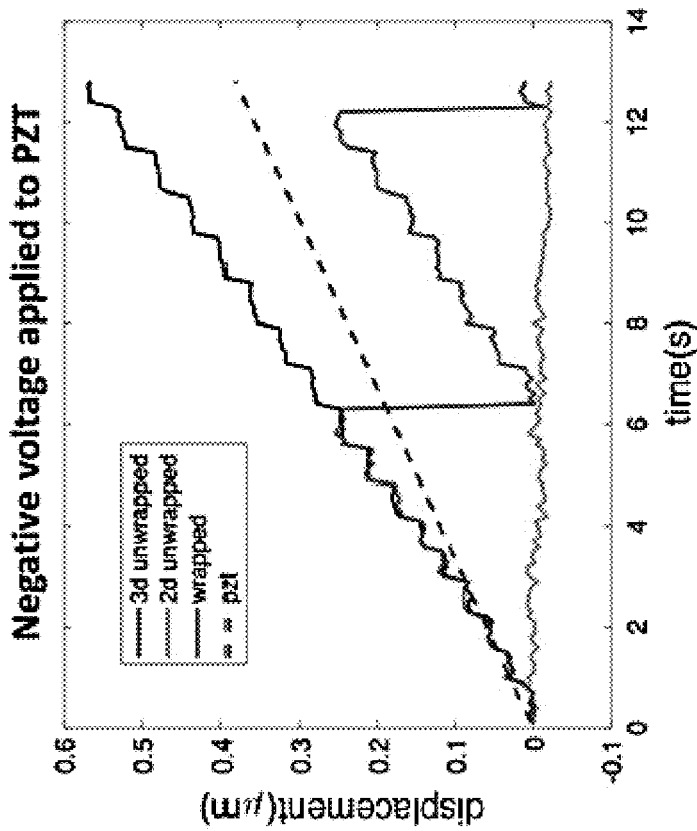
FIG. 14B is a diagram showing displacement at a center of an image, tracked using 3D unwrapped phase (black line), 2D unwrapped phase (green line), wrapped phase (red line), and PZT characteristics (blue dashed line), when the PZT was driven by a negative voltage.
Figure 14A:
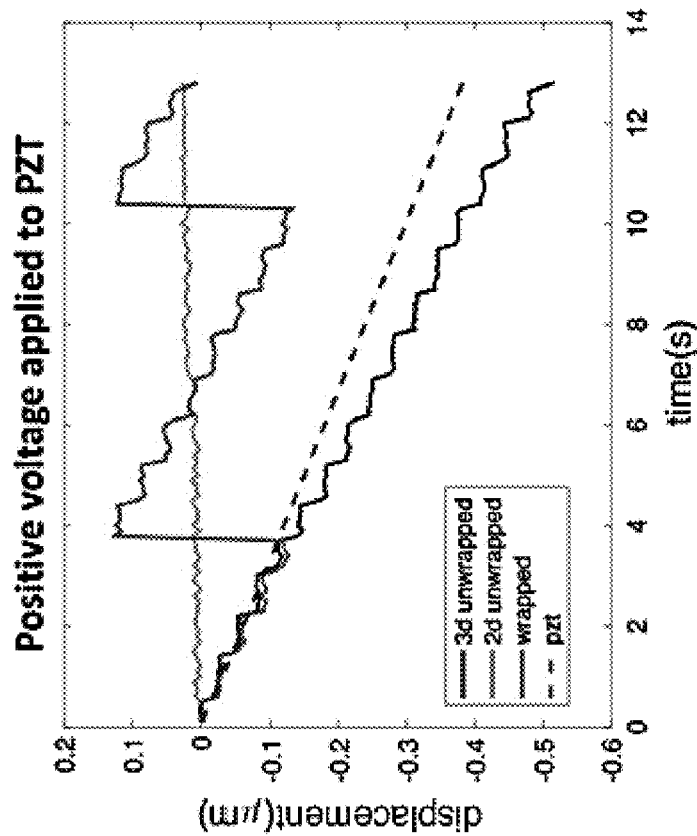
FIG. 14A is a diagram showing displacement at a center of an image, tracked using 3D unwrapped phase (black line), 2D unwrapped phase (green line), wrapped phase (red line), and PZT characteristics (blue dashed line), when the PZT was driven by a positive voltage.

FIG. 14A is a diagram showing displacement at a center of an image, tracked using 3D unwrapped phase (black line), 2D unwrapped phase (green line), wrapped phase (red line), and PZT characteristics (blue dashed line), when the PZT was driven by a positive voltage. FIG. 14B is a diagram showing displacement at a center of an image, tracked using 3D unwrapped phase (black line), 2D unwrapped phase (green line), wrapped phase (red line), and PZT characteristics (blue dashed line), when the PZT was driven by a negative voltage.

To validate that 3D unwrapping allows accurate temporal characterization of dynamic phenomena, the system 100 attached a glass slide to a piezo transducer (PZT, Thorlabs, Multilayer Piezo Actuator, 75V). The system 100 actuated the PZT with a stepwise voltage, and the PZT took one step every second ($\delta$ T=1 s) with the voltage increased or decreased by 0.8 V ($\delta$ V=0.8 V), resulting in an increased (for negative driving voltage) or decreased (for positive driving voltage) optical path length in the sample arm. To capture the motion of the PZT, the system 100 took 128 OCPM measurements (1024 by 1024) at a 10 Hz frame rate. The wrapped phase images were obtained using the arctangent function [Equation (2.2)] and had values within ($-\pi, \pi$). The system 100 applied the 3D unwrapping method to unwrap the entire 3D phase data that had 128 images. The system 100 also applied the 2D unwrapping method to unwrap individual phase images. Using phase data, the system 100 calculated the displacement for the pixel ($i_0, j_0$) located at the center of the image ($i_0$=512, $j_0$=512). Results in FIG. 14A were based on data acquired when a positive voltage drove the PZT. In FIG. 14A, the black, green, and red lines correspond to displacements calculated using 3D unwrapped phase, 2D unwrapped phase, and wrapped phase. FIG. 14A also shows the estimated PZT displacement (blue dashed line) assuming a constant speed (s=$\epsilon\delta$V/$\delta$T=0.03 $\mu$m/s, where $\epsilon$ is the PZT responsivity provided by the manufacturer and $\epsilon$=0.037 $\mu$m/V). Considering the blue line as the ground truth, the 3D unwrapped phase follows motion of the PZT and shows a speed of 0.42 $\mu$m/s estimated by linear fitting. The black curve deviates from the blue line because the PZT loading condition was different from the loading condition recommended by the manufacturer, and the actual responsivity of the PZT was different from $\epsilon$=0.037 $\mu$m/V. In comparison, the 2D unwrapped phase failed to track the motion, and the wrapped phase deviated from the actual motion when the actual phase was beyond ($-\pi, \pi$). To guarantee that the phase differences between consecutive phase frames are within ($-\pi, \pi$), the temporal sampling of the 3D phase must be sufficiently high. Similarly, when a negative voltage was applied to the PZT, the system 100 obtained results summarized in FIG. 14B.

Figure 15C:
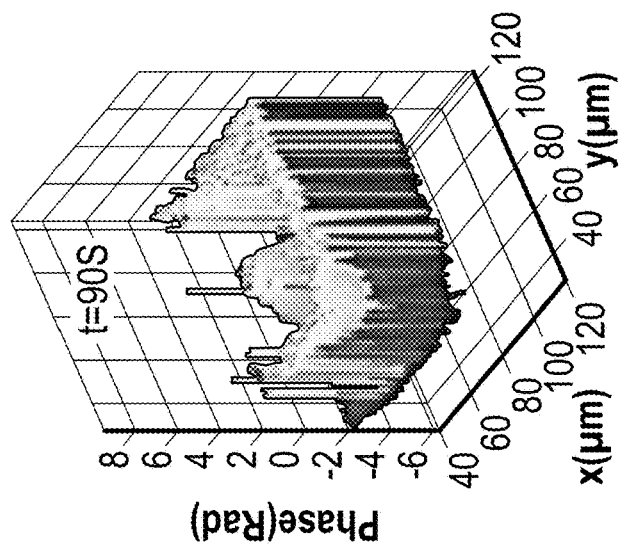
FIGS. 15B-15E are wrapped phase images taken at different times.
Figure 15B:
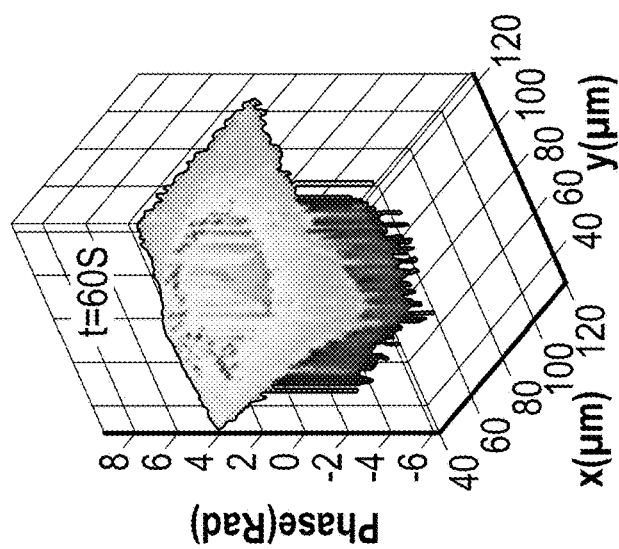
Figure 15A:
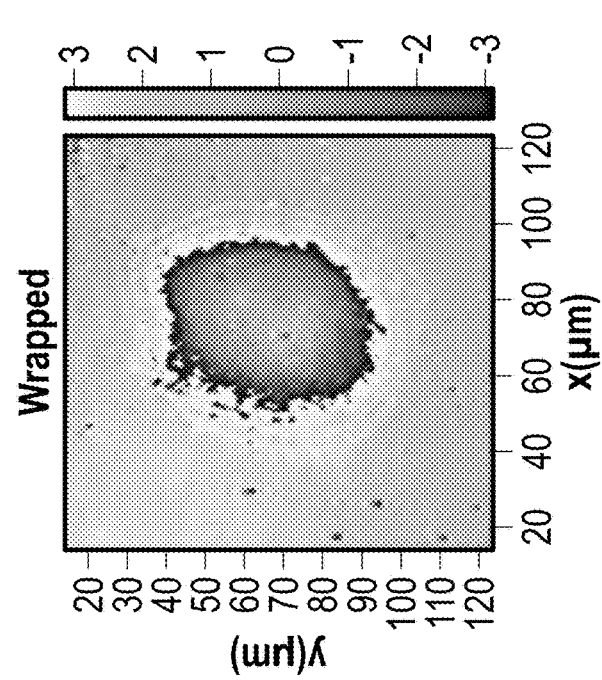
FIG. 15A is a wrapped phase image.
Figure 15E:
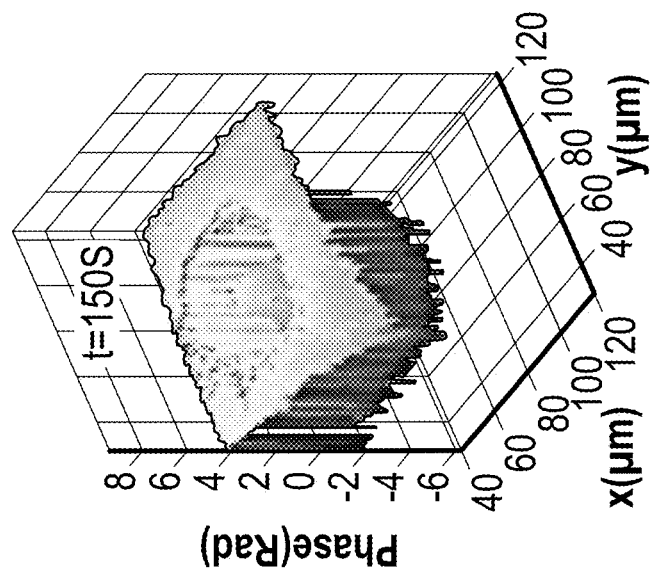
Figure 15D:
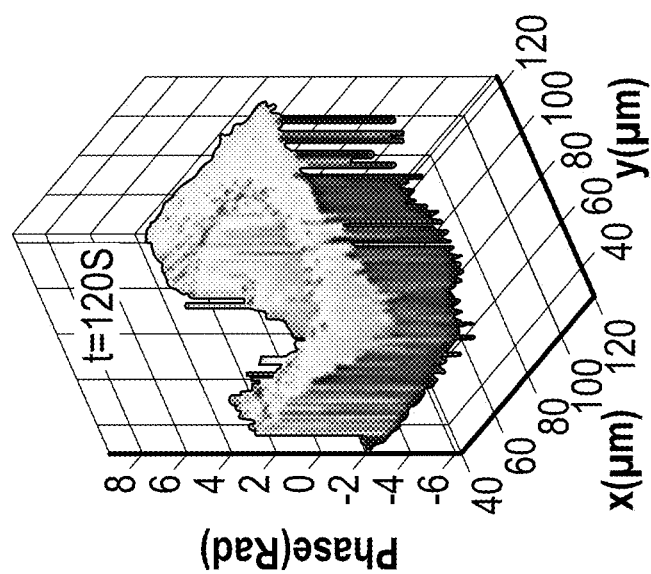
Figure 15G:
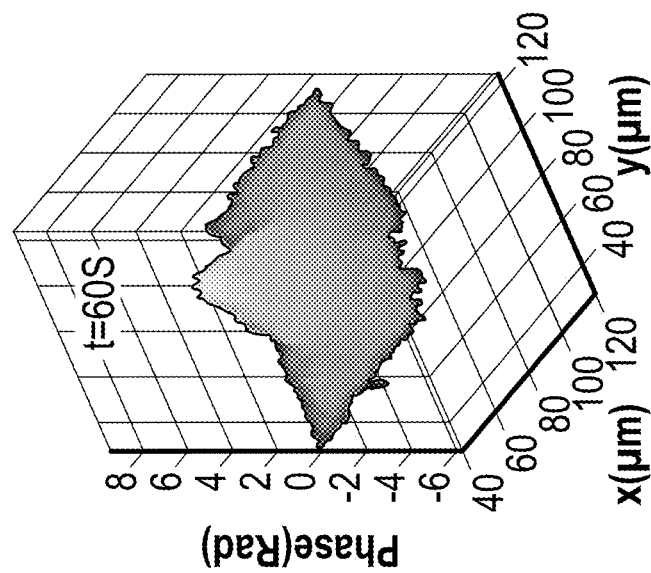
FIGS. 15G-15J are 3D unwrapped phase images taken at different times.
Figure 15F:
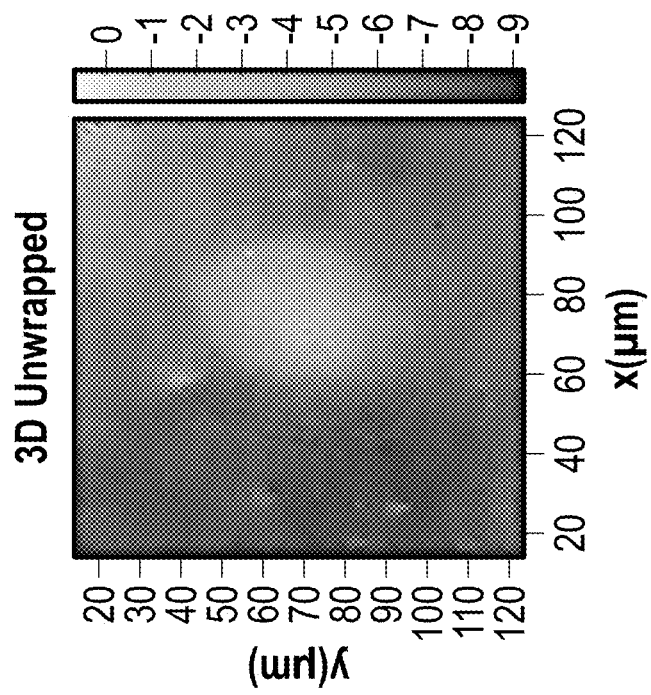
FIG. 15F is a 3D unwrapped phase image.
Figure 15J:
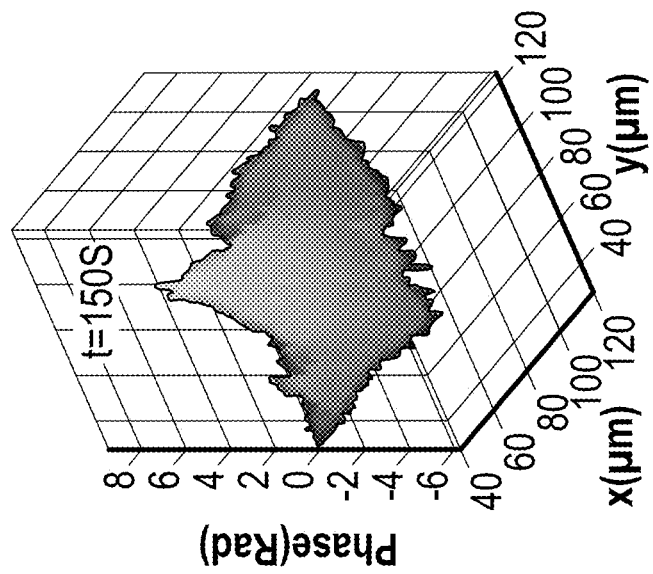

FIG. 15A is a wrapped phase image. FIGS. 15B-15E illustrate wrapped phase images taken at different times. FIG. 15F is 3D unwrapped phase image. FIGS. 15G-15J illustrate 3D unwrapped phase images taken at different times.

Figure 15I:
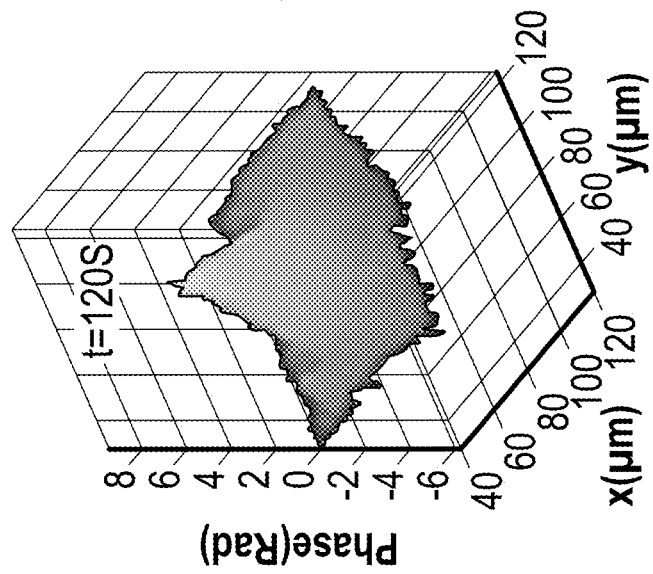
Figure 15H:
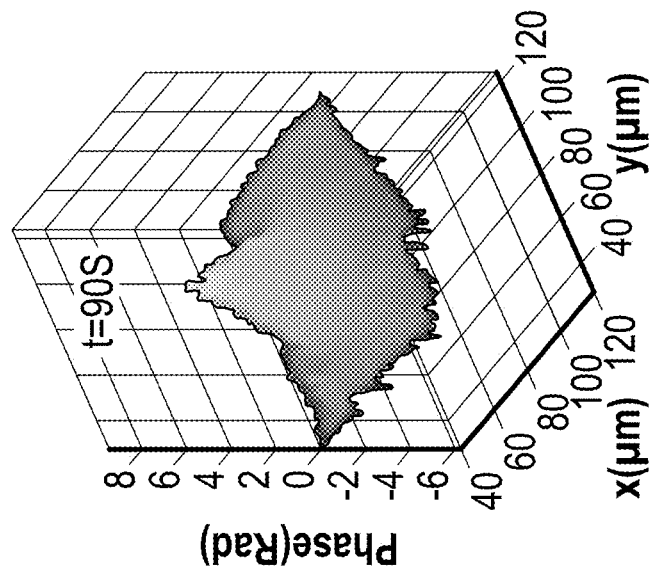

To validate that 3D unwrapping allows accurate temporal characterization of cellular dynamics, the system 100 imaged the process of cell detachment. HeLa cells were cultured in Dulbecco's Modified Eagle Medium supplemented with 10% fetal bovine serum, 1% penicillin/streptomycin at 37° C. in a humidified 5% CO2 incubator. For imaging, cells were seeded on confocal dish (MatTek) at the density of $4\times10^4$ cells per dish. The cells attached to the substrate of the dish tightly. Trypsin that breaks the bonding (adhesion) sites between the cell and the petri dish was used to initiate the detachment process. The system 100 introduced Trypsin to the petri dish at t=0 and performed continuous imaging. Wrapped phase images were obtained using Equation (2.1). A wrapped phase is shown in FIG. 15A, where the abrupt transition from bright yellow to blue (corresponding to phase value change from $\pi$ to $-\pi$) is due to phase wrapping. FIGS. 15B-15E show the 3D surface profile rendered using wrapped phase data obtained at t=60 s, 90 s, 120 s, and 150 s. From wrapped phase [FIGS. 15A-15E], cell morphology and the change of cell morphology cannot be clearly observed. For comparison, FIG. 15F shows the 3D unwrapped phase image corresponding to FIG. 15A, and FIGS. 15G-15I show the 3D surface profile rendered using 3D unwrapped phase at t=60 s, 90 s, 120 s, and 150 s. Results in the second row of FIG. 15 are free of phase wrapping artifacts. Moreover, FIGS. 15G-15I show that the lateral extension of the cell decreases and the phase retardation at the center of the cell increases over time. This is because the dry mass of the cell becomes more concentrated, as the cell gradually detaches from the substrate of the petri dish and finally takes a spherical shape.

Figures 16A, 16B:
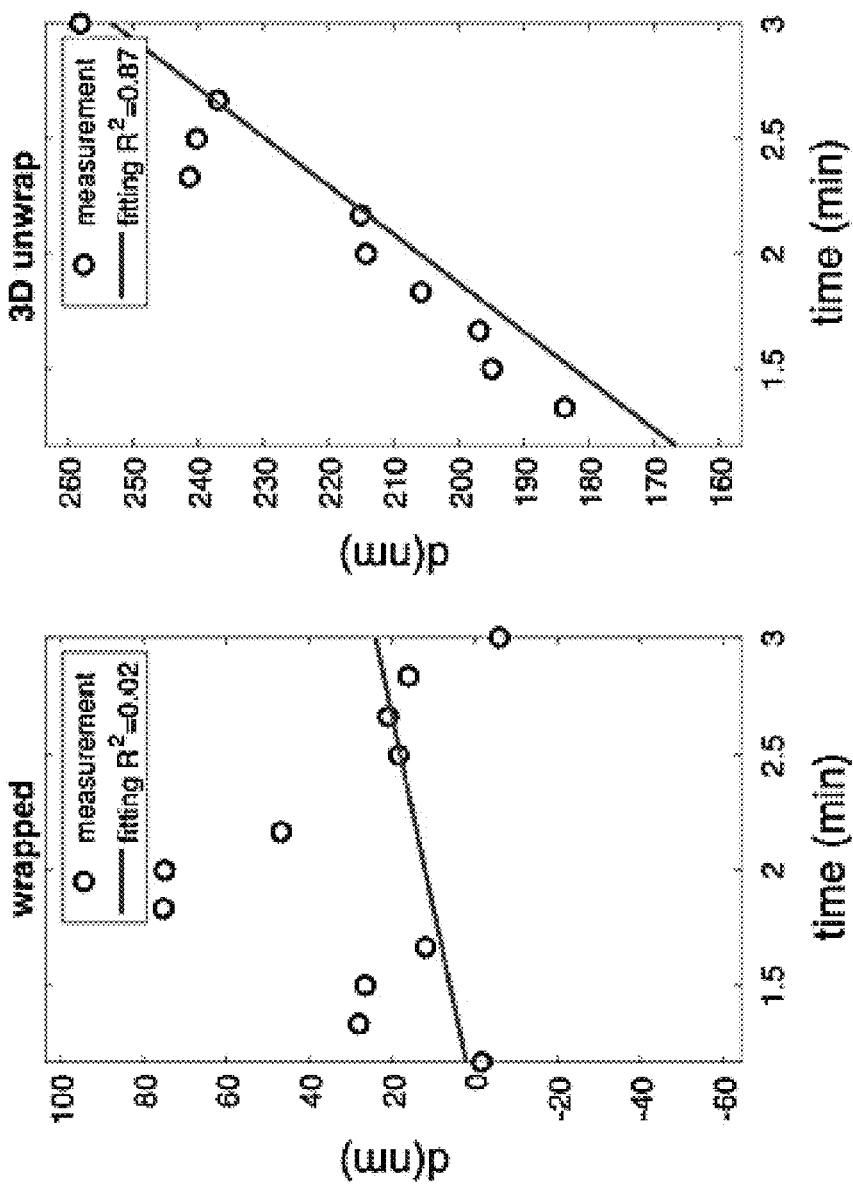
FIG. 16A is a diagram showing optical path length at the center of a cell calculated using wrapped phase.
FIG. 16B is a diagram showing optical path length at the center of the cell in FIG. 16A calculated using 3D unwrapped phase.

FIG. 16A is a diagram showing optical path length at the center of the cell calculated using wrapped phase. FIG. 16B is a diagram showing optical path length at the center of the cell calculated using 3D unwrapped phase.

To further quantify the cell detachment process, the system 100 calculated the optical path lengths at the center of the cells using wrapped ($\psi$) phase and 3D unwrapped ($\phi$) phase: $d_{wrapped}(x_0, y_0, t) = \lambda_0 \psi(x_0, y_0, t)/(4\pi)$ and $d_{unwrapped}(x_0, y_0, t) = \lambda_0 \psi(x_0, y_0, t)/(4\pi)$. FIGS. 16A and 16B show the change of optical path length ($d_{wrapped}$ and $d_{unwrapped}$) averaged within a region of interest that had an area of 97 $\mu$m$^2$. The optical path length calculated using wrapped phase fluctuates over time [FIG. 16A], while the optical path length calculated using 3D unwrapped phase reveals the increase of dry mass at the center of the cell as the cell detaches from the petri dish. Notably, the system 100 chose the observation window (t=17 min to t=37 min) to capture prominent motion due to cell detachment. Immediately after the addition of Trypsin (<17 min), the cell detachment process did not start. After a while (t>37 min), the displacement due to cell detachment was saturated.

2.4 Summary of 3D Unwrapped Phase Imaging

The system 100 can observe dynamic phenomena quantitatively and continuously. To eliminate phase wrapping artifacts in x, y, and t, the system 100 developed a 3D phase unwrapping method that exploited data correlation in space and in time. The system 100 validated the 3D phase unwrapping method using simulated data and experimental data. The results suggested that the system 100 with the assistance of 3D phase unwrapping allowed accurate characterization of sample dynamics.

In some embodiments, the system 100 can take a non-iterative, transform-based method to perform 3D phase unwrapping. Alternatively, iterative algorithms can be implemented to solve Equation (2.4) by incorporating appropriate prior knowledge about the unwrapped phase. Iterative methods may achieve better apparent signal to noise ratio (SNR). However, iterative algorithms generally take a longer computation time and are expected to improve the accuracy of phase recovery. For 3D phase unwrapping, the data involved in the computation have a much larger volume compared to that of 2D phase unwrapping and require a much longer computation time if the iterative algorithm is implemented.

In the 3D phase unwrapping algorithm, the actual phase is obtained by minimizing f defined in Equation (2.5) [and Equation (2.6). f quantifies the difference between $\Delta\phi$ and $W(\Delta\psi)$ along i, j, and k, and effectively averages the contribution from all the pixels with the same weight. f is largely determined by the pixels where the phase does not change much because only a few pixels carry drastic change in phase. Therefore, 3D phase unwrapping allows quantitative reconstruction of the overall phase profile in x, y, and t, but it may have limited accuracy in preserving the fast-changing components of the phase. This issue can be addressed using weighted 3D phase unwrapping where the pixels featuring larger phase change are given larger weight.

To conveniently compare the unwrapped phase and the ground truth, the system 100 introduced linear displacement over time (constant velocity) in the simulation (FIG. 12). The method is also effective for motion with time varying velocity. In fact, the dynamic process recorded experimentally in FIG. 14 corresponded to a time varying velocity. To obtain FIG. 14, the system 100 introduced motion using a PZT with stepwise displacement pattern. Such a stepwise motion pattern (non-uniform) was accurately recovered through 3D phase unwrap. In addition, the displacement can be non-uniform in space, as illustrated in the cell detachment experiment. The displacement at the center of the cell was larger [FIGS. 15G-15J]. This was consistent with the fact that dry mass of the cell became more concentrated when the cell detached from the petri dish. The results validated that the 3D unwrapping method works for spatially non-uniform displacement.

The system 100 can provide quantitative phase contrast (after unwrapping) allowing accurate quantification of axial motion when the transverse motion is minimal. On the other hand, when transverse motion is not negligible and results in abrupt phase change. Doppler contrast (temporal derivative of phase) is a more appropriate contrast mechanism.

3. Optically Computed Phase Microscopy to Assess Cellular Uptake of Lipid Nanoparticles 3.1 Overview Lipid nanoparticles (LNPs) have been widely used for drug delivery. For example, BioNTech/Pfizer's and Moderna's Covid vaccines both use LNPs as mRNA carriers. Understanding the mechanical interactions between cells and nanoparticles is critical for developing efficient and safe drug delivery systems based on LNPs. Currently, there is an unmet need for dynamic imaging cellular uptake of lipid nanoparticles. Conventional phase-resolved optical imaging techniques, including phase contrast microscopy, differential interference contrast microscopy, and phase-resolved optical coherence tomography, are qualitative or have limited spatiotemporal resolution. To address the issues, as described above, the system 100 can process 3D spatial-spectral data before 2D photon detection. The system 100 can study cellular uptake of lipid nanoparticles (LNPs) which will lead to an advanced understanding of cell-LNP interaction.

3.2. System and Method Overview

Figure 17A:
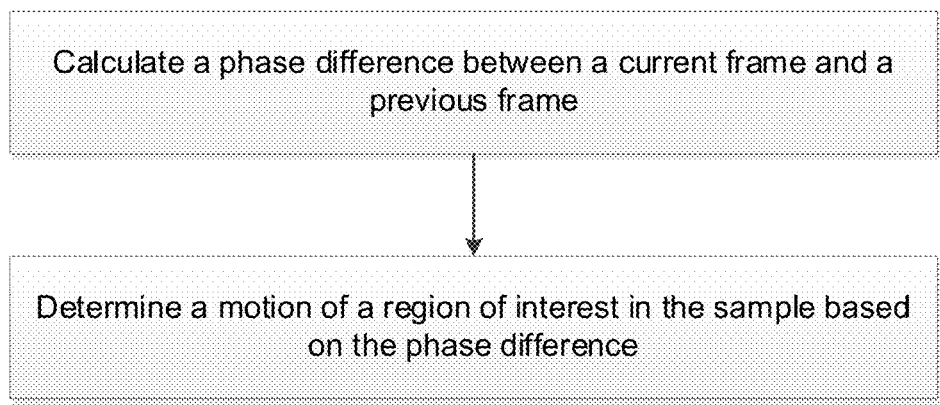
FIG. 17A is a flowchart illustrating example processing steps for analyzing moving objects carried out by the system of the present disclosure.

FIG. 17A is a flowchart illustrating processing steps 1700 for analyzing moving objects carried out by the system 100 of the present disclosure. In step 1702, the system 100 can calculate a phase difference between a current frame and a previous frame. For example, the system 100 can control the detector 180 via the data collection engine 120 to capture a video of the sample or a series of images (e.g., 2D spatial data) of the sample over a time period. The system 100 can use the moving-object analysis engine 134 to calculate a phase difference by Equation (3.1) as follows:

$$\delta\phi(t)=\phi(t)-\phi(t-\delta t) \tag{3.1}$$

As described with respect to FIGS. 8 and 9, the system 100 performed Doppler analysis on the phase images obtained (200 frames). For each pixel of the phase image acquired at time t, the system 100 calculated the phase difference $(\delta\phi(t)=\phi(t)-\phi(t-\delta t))$ between the current frame and the previous frame.

In step 1704, the system 100 determines a motion of a region of interest in the sample based on the phase difference. For example, the system 100 can determine the motion of the nanoparticles to access cellular uptake of lipid nanoparticles as described above with respect to FIGS. 8 and 9.

Figure 17B:
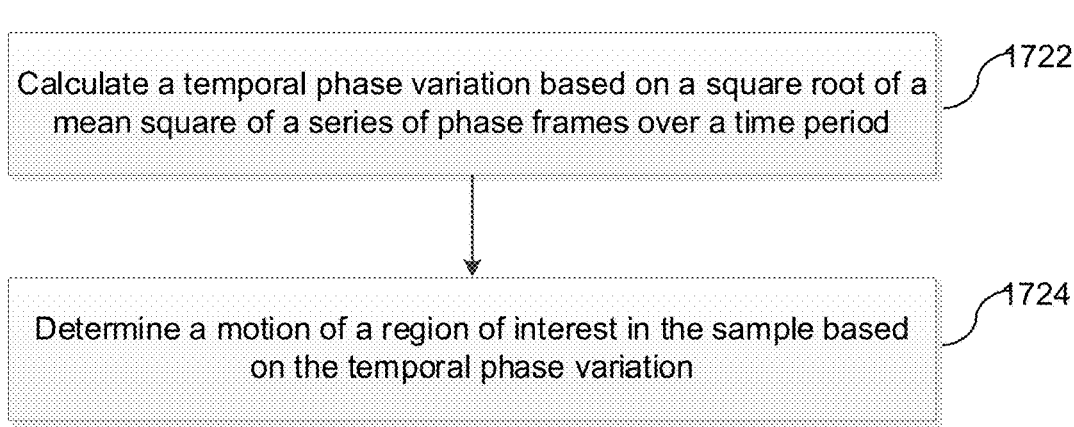
FIG. 17B is a flowchart illustrating example processing steps for analyzing moving objects carried out by the system of the present disclosure.

FIG. 17B is a flowchart illustrating processing steps 1720 for analyzing moving objects carried out by the system 100 of the present disclosure. In step 1722, the system 100 can calculate a temporal phase variation based on a square root of a mean square of a series of phase frames over a time period. For example, the system 100 can calculate a temporal phase variation using Equation (3.2) as follows:

$$\phi_{var}(x, y) = \sqrt{\frac{1}{N}\sum_{n-1}^{N}(\phi(x, y, z) - \overline{\phi}(x, y))^2} \tag{3.2}$$

where n indicates the $n^{th}$ frame within the sequence and N=200.

In step 1724, the system 100 determines a motion of a region of interest in the sample based on the temporal phase variation. For example, the system 100 can determine the motion of the nanoparticles to access cellular uptake of lipid nanoparticles as described with respect to FIG. 18.

Figure 18A:
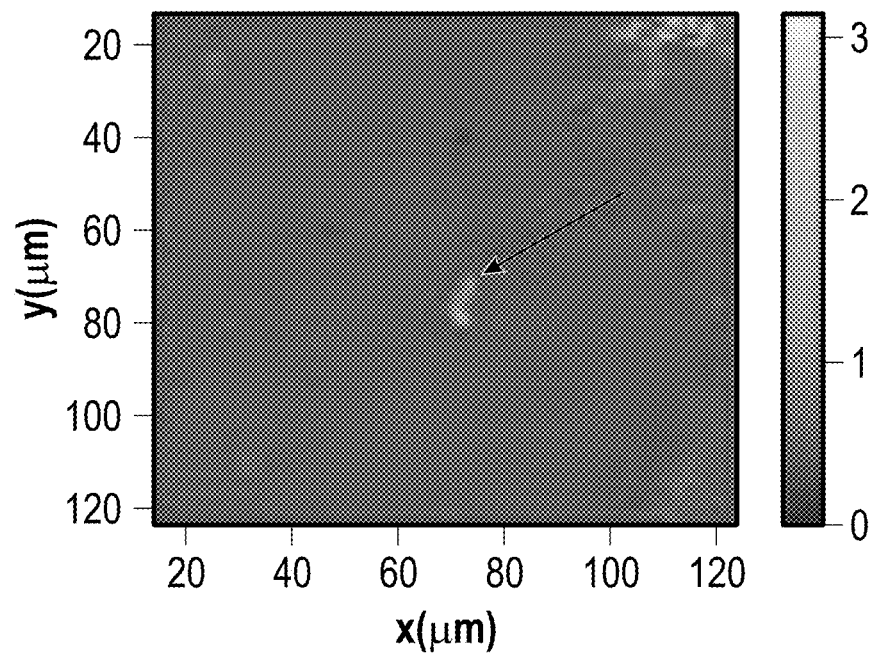
FIG. 18A is an image showing a large phase variation for free lipid nanoparticles (LNPs).
Figure 18B:
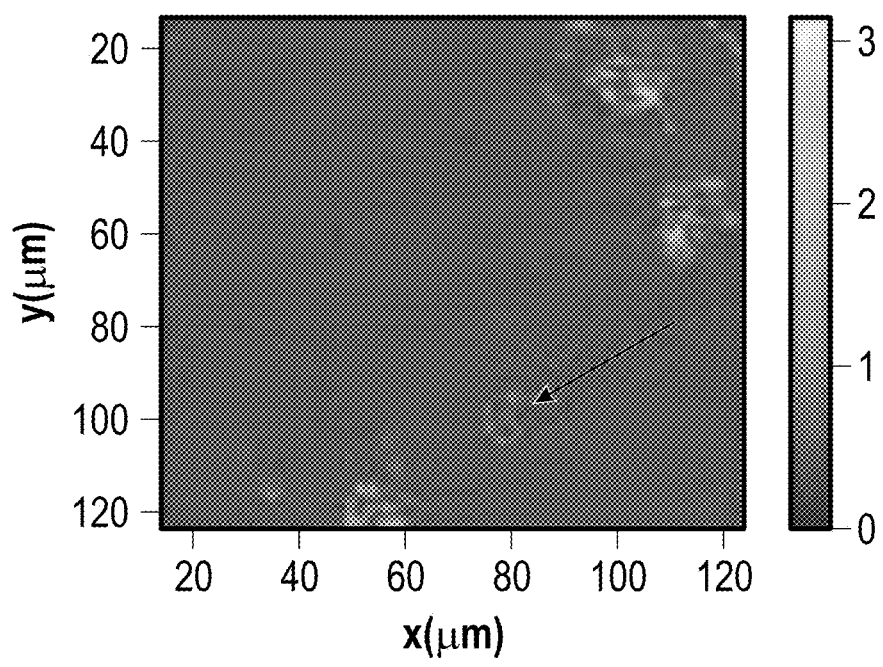
FIG. 18B is an image showing a small phase variation for internalized LNPs.

FIG. 18A is an image showing a large phase variation for free LNPs. FIG. 18B is an image showing a small phase variation for internalized LNPs. Temporal phase variations obtained from free LNPs and uptaken LNPs are shown in FIG. 18, suggesting that temporal variation of the phase can be used as a quantitative measure to determine the uptake status of LNPs.

4. Full Field Doppler Phase Microscopy Based on Optical Computation 4.1 Overview It is crucial to understand the dynamics of cultured cells when they interact with one another and interact with their environment. The capability to measure the subtle motion of cells will advance our understanding in the basic science of cell biology, and will assist the development of drugs and drug delivery systems. Hence, there is a need for a functional microscopic imaging technology that measures the motion of the cells quantitatively with cellular/sub-cellular resolution. Doppler optical coherence tomography (D-OCT), a functional implementation of optical coherence tomography (OCT), has been used for depth resolved measurement of sample dynamics in applications such as blood flow quantification, vessel visualization, optical elastography, etc. D-OCT performs phase $(\emptyset(r,t))$ resolved imaging and its contrast is based on the time derivative of the phase $(\partial\emptyset(r, t)/\partial t)$. To quantitatively measure the motion for cultured cells, it is desirable to perform parallel imaging for all the pixels within the en face plane, using a high-resolution, full-field Doppler imaging platform. However, full field Doppler phase imaging remains challenging. OCT technology is limited by an inherent trade-off between depth imaging range and transverse resolution. A transverse resolution in the order of 10 μm is typical for OCT systems, but is not sufficient for cellular/sub-cellular imaging. To achieve a higher transverse resolution in micrometer to sub-micrometer range, the OCT system is implemented using a high numeric aperture (NA) objective and is termed as optical coherence microscopy (OCM). Despite its higher transverse resolution, OCM prioritizes axial scanning like other OCT configurations and has a prohibitively low temporal resolution for en face imaging, because an image in (x,y) plane is obtained after the scanning of entire 3D volume (x,y,z) is accomplished. Researchers also investigated full field OCT imaging that uses a spatially incoherent light for area illumination and performs parallel signal detection in the en face plane. However, full field OCT systems usually rely on mechanical scanning of the optical path length for depth resolved measurement and signal demodulation, resulting in a limited temporal resolution and phase stability for effective Doppler measurement.

To address the unmet need for Doppler imaging of cultured cells, the system 100 can provide a full field Doppler phase microscopy (FF-DPM) technology based on optical computation for dynamic imaging.

mRNA vaccines combine desirable immunological properties with an outstanding safety profile and the unmet flexibility of genetic vaccines. For the first time in the past two years, mRNA have been used in humans on a large scale. Research on how mRNA interaction with human and human cells is of great meaning and can help to advance this fantastic innovation. Ionizable lipid-containing nanoparticles (LNPs), initially developed for siRNA delivery, are the most widely used in vivo mRNA delivery materials at present. Nanoparticles typically have a diameter of less than 100 nanometers. Based on this property, high-resolution live cell imaging technology can be important in investigations of how cell-LNP interactions work. The system 100 can process data from 3D spatial-spectral measurements with high resolution and sensitivity. In this section, the system 100 focuses on Doppler analysis of nanoparticles and cell movement.

Optical Doppler Tomography (ODT) is a medical imaging technique that uses a broadband light source to image tissue structure and blood flow dynamics simultaneously. By acquiring and calculating the frequency change introduced by the moving object, dynamic information about the target of interest can be obtained. High speed Doppler Fourier domain optical coherence tomography is a well developed imaging technique that can be used to study human retinal blood flow in real time. After Doppler Fourier Domain Optical Coherence Tomography, real-time 3D and 4D Fourier Domain Doppler Optical Coherence Tomography based on dual graphics processing unit presents 3D (2D section image+time) and 4D (3D volume+time) in real time. However, in classic Doppler analysis methods, ODT velocity images are obtained by sequential A-scans at different lateral positions of the sample probe. In addition, an en face Doppler image can only be obtained after the volumetric Doppler image. The time delay between A-scans prevents us from simultaneously acquiring Doppler signals between different A-scans. This inaccuracy is amplified when calculating the Doppler signal of the en face plane. Full-field OCT can retrieve the en face Doppler signal simultaneously. However, background noise can be taken into account when calculating the Doppler signal's accuracy.

To overcome these problems, the system 100 can perform quantitative Doppler analysis by taking direct measurements of real parts of the complex signals using the optical computation assembly over a time period to determine a phase difference between images obtained at different time slots and determine a velocity using the determined phase difference.

4.2. System and Method Overview

The configuration of the system 100 is depicted in FIGS. 1 and 2. The system 100 can use a low coherent light source (LED 730 nm±20 nm) to illuminate a Michelson interferometer 160 that has a reference and a sample arm. The theoretical axial resolution determined by the coherence length is approximately 6 μm. The objective lenses used in the reference arm and sample arm are identical (Nikon Apochromatic Water Dipping Objectives, 40×). The Michelson interferometer's output is interfaced with an optical computation assembly 170 that includes the diffraction grating 174, the lens 176 and the SLM 172 (LC-R 720 Reflective LCOS SLM) that has a wide range of applications in optical imaging.

Figure 19:
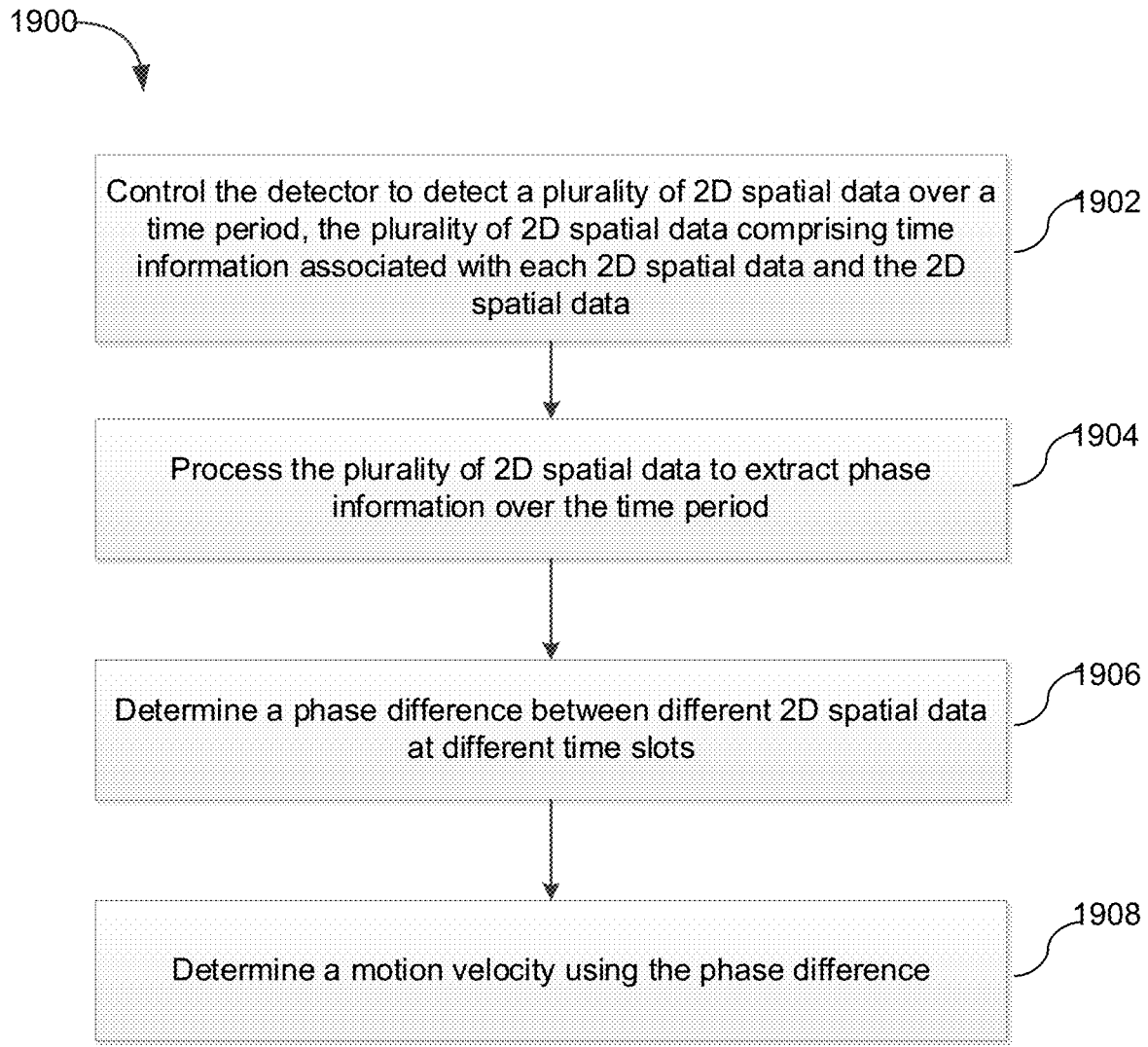
FIG. 19 is a flowchart illustrating processing steps for Doppler phase imaging carried out by the system of the present disclosure.
Figure 20:
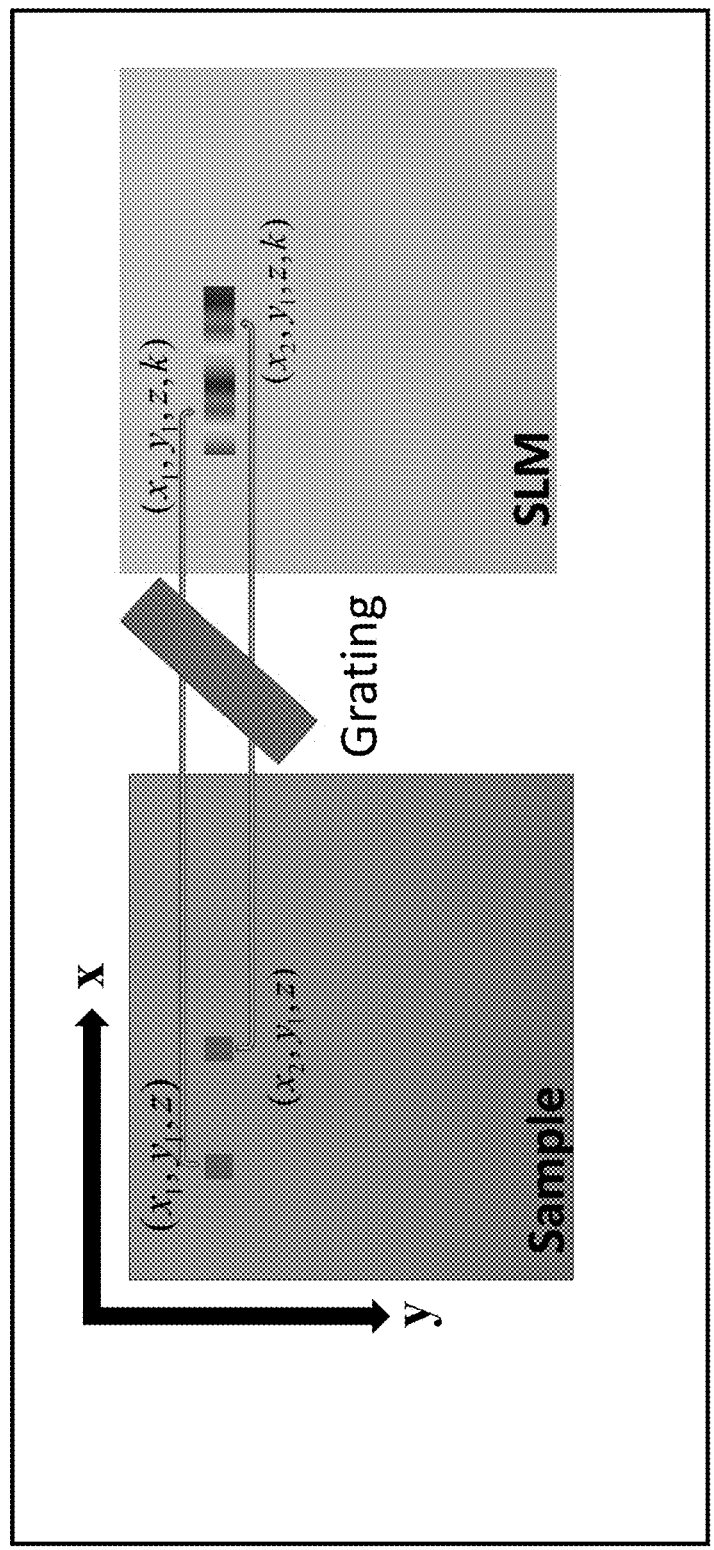
FIG. 20 is a diagram showing a mapping relationship between a sample and an SLM.

FIG. 19 is a flowchart illustrating processing steps 1900 for Doppler phase imaging carried out by the system 100 of the present disclosure. In step 1902, the system 100 controls the detector 180 to detect a plurality of 2D spatial data over a time period. The plurality of 2D spatial data can include time information associated with each 2D spatial data and the 2D spatial data. For example, the system 100 can control the detector 180 via the data collection engine 120 to capture a video of the sample or a series of images (e.g., 2D spatial data) of the sample over a time period using the modulation pattern described with respect to steps 304 and 306 in FIG. 3.

In some embodiments, similar to steps 304 and 306 in FIG. 3, an optical field (complex) from the sample 168 can be expressed as Equation (4.1) in which t is time, k is the wavenumber ($k=2\pi/\lambda$), (x,y) is the transverse coordinate, z is the direction of light propagation, $M_0$ (k) is source spectrum, and A(x, y, z, t) is the complex amplitude of sample reflectivity.

$$i_{sample}(x,y,z,k,t)=A(x,y,z,t)M_0(k)e^{j2kz} \quad (4.1)$$

At the output of the interferometer 160, the sample light (Equation (4.1)) and reference light ($i_{ref}=M_0(k)A_{ref}$ given the reference mirror 166 located at z=0) superimposes. Afterwards, the interferometric light goes through the grating 174 and an achromatic doublet lens (Lens1) 176A, and hits the SLM 172. The grating 174 has periodical groove structure along x direction and does not alter light propagation along y direction. Therefore, signal from a specific y coordinate at the sample space is mapped to a corresponding row of pixels at the same y coordinate of the SLM plane. On the other hand, due to the dispersion introduced by the grating 174, signal from the same x coordinate is linearly shifted along x direction in the SLM plane and the amount of linear shift is proportional to the wavenumber k (FIG. 20 which is a diagram showing a mapping relationship between the sample 168 and the SLM 172). Hence every pixel of the SLM 172 sees superposition of optical signals with different combinations of k and x. The SLM 172 modulates the light intensity $|i_{sample}+A^{ref}|^2=i_{DC}+2A(x,y,z,t)A_{ref} M_0^2$ (k)cos(kz)) with a sinusoidal pattern (Equation (4.2) and FIG. 4). Light modulated by the SLM 172 goes through the grating 174 again and is detected by the camera 180, resulting in Equation (4.3) where the DC term is eliminated, β is a constant, $\gamma_0(z_{SLM})$ is the axial point spread function and is the Fourier transform of source spectrum ($M_0^2(k)$ for intensity). For cultured cells with thickness significantly smaller than the axial resolution of the system 100, the sample 168 can be modeled as an axial impulse function located at depth $z_{cell}$: $A(x,y,z,t) = \delta(z-z_{cell})\alpha(x,y)e^{j\Theta(x,y)+j2k\delta d(x,y,t)}$ where $\delta d(x, y, t)$ indicates axial displacement. With $z_{cell}=z_{SLM}/2$, Equation (4.3) becomes Equation (4.4). As illustrated in Equation (4.3) and Equation (4.4), SLM modulation along k direction effectively selects signals from depth $z_{SLM}/2$ by optically calculating the inner product between two sinusoidal functions ($e^{kz_{SLM}}$ and the interference spectrum). This strategy has been described above. On the other hand, SLM modulation along y direction introduces a modulation term $e^{-j\alpha_y y}$ that enables the extraction of complex field reflectivity and phase.

$$f_{SLM}(y, k) = 1 + \cos(kz_{SLM} + \alpha_y y) \quad (4.2)$$

$$i_{camera}(x, y, t) = \text{Re}\left(\beta A_{ref} e^{-j\alpha_y}\left[\gamma_0\left(\frac{z_{SLM}}{2}\right) \otimes A\left(\frac{(x, y, z_{SLM})}{2}, t\right)\right]\right) \quad (4.3)$$

$$i_{camera}(x, y, t) = \beta A_{ref}\gamma_0(0)\alpha(x, y)\cos[-\alpha_y y + \phi(x, y) + 2k\delta d(x, y, t)] \quad (4.4)$$

In step 1904, the system 100 processes the plurality of 2D spatial data to extract phase information over the time period. For example, as described with respect to FIG. 3, the system 100 can a complex signal (Equation (4.5)) and extract the phase arg ($i_{complex}(x,y)$) by applying Hilbert transform to the real measurement of Equation (4.4) and performing demodulation along y direction. Details on the signal processing can be found with respect to FIGS. 3 and 5.

$$i_{complex}(x,y,t) = \beta A_{ref}\gamma_0\alpha(x,y)e^{j\phi(x,y)+j2k\delta d(x,y,t)} \quad (4.5)$$

In step 1906, the system 100 determines a phase difference between different 2D spatial data at different time slots. For example, the Doppler phase shift is proportional to the magnitude of motion velocity, the system 100 can compute the phase difference between images obtained at different time (t and t+δt in Equation (4.6)).

$$\Delta\phi(x,y,t) = \arg[i_{complex}(x,y,t+\delta t)i_{complex}*(x,y,t)] \quad (4.6)$$

In step 1908, the system 100 determines a motion velocity using the phase difference. For example, the system 100 can extract $$(x, y, t) = \frac{\partial \delta d(x, y, t)}{\partial t}$$

from measurements. Assuming a constant velocity within time interval δt, the system 100 can calculate the velocity using Equation (4.7) where $\lambda_0$ represents central wavelength of the light source 162. Equations (4.4)-(4.6) demonstrate parallel imaging of the phase in (x,y) plane which is desirable for the observation of sub-cellular and cellular motion.

$$v(x, y, t) = \frac{\lambda_0 \Delta\phi(x, y, t)}{4\pi n \delta t} \quad (4.7)$$

In some embodiments, the system 100 can use a frame grabber (NI 1433, National Instruments) to acquire data from the camera 180 (Basler acA2000). The data acquisition is synchronized through a trigger signal provided by the SLM 172. The camera 180 used in the FF-DPM has a maximum frame rate of 340 Hz, corresponding to a 3 ms sampling interval. However, to collect enough signal photons from the weakly scattering sample, the system 100 used a longer exposure time and operated the camera 180 at a 10 Hz frame rate. Therefore, δt=0.1 s is used. This implies a maximum measurable speed of 1.4 μm/s.

4.3 Experimental Results

The capability of the system 100 was validated in quantifying the global motion of a sample that does not have en face structural features. The system 100 performed Doppler imaging of a glass slide attached to a piezo transducer (PZT, TA0505D024 W Thorlabs). The PZT has a dimension of 5.0 mm*5.0 mm*2.4 mm and includes stacked piezoelectric ceramic layers that are sandwiched between inter-digitated electrodes. The system 100 controlled the direction and magnitude of the axial motion by driving the PZT with step-wise voltage:

$$V(t) = \beta\left\lfloor\frac{t}{T_0}\right\rfloor$$

with $T_0=1$ s and obtained a stack of en face Doppler images (Equation (3.6)) for motion tracking. The system 100 averaged the Doppler signal within an area (14 μm by 14 μm) at the center of the image to suppress noise, obtained the averaged Doppler phase ($\Delta\bar{\phi}(t)$) and the instantaneous velocity $$\bar{v}(t) = \frac{\lambda\Delta\bar{\phi}(t)}{4\pi n \delta t}$$

and obtained the displacement using the cumulative sum of the velocity. The results are shown in FIG. 21.

Figure 21A:
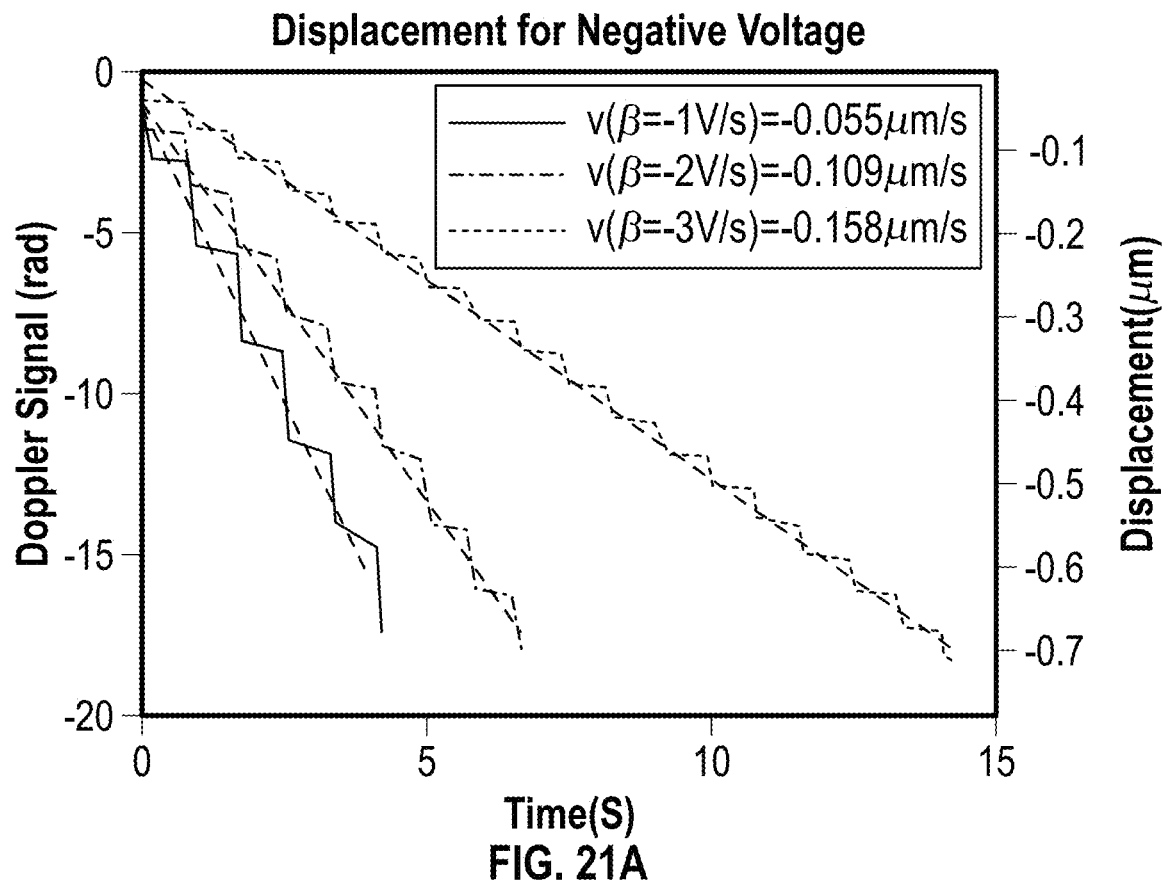
FIG. 21A is a diagram showing phase and displacement tracking for negative voltage.
Figure 21B:
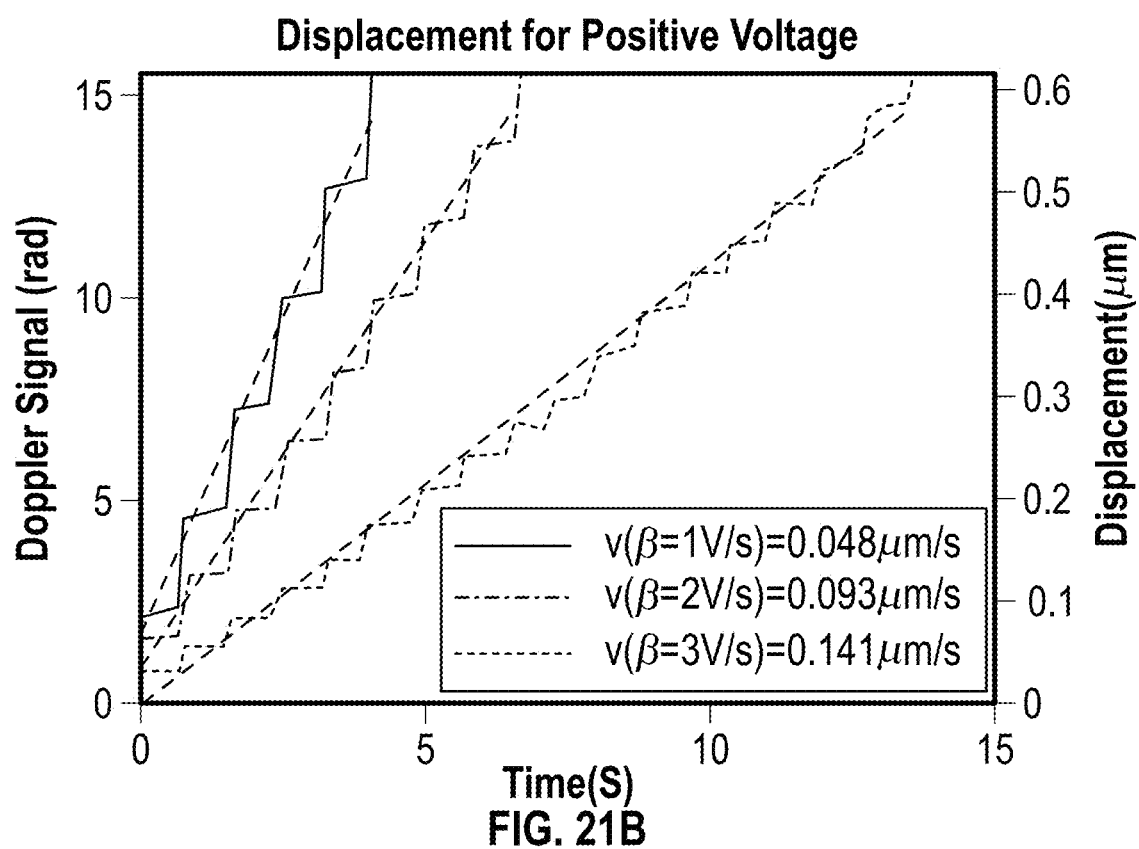
FIG. 21B is a diagram showing phase and displacement tracking for positive voltage.

FIG. 21A is a diagram showing phase and displacement tracking for negative voltage. FIG. 21B is a diagram showing phase and displacement tracking for positive voltage.

FIGS. 21A and 21B show Doppler measurements when the sample 168 moved away from the equal optical path length plane (β<0) and towards the equal optical path length plane (β>0), respectively. In FIG. 21, the blue curves correspond to β=∓3V, the green curves correspond to β=∓2V, the red curves correspond to β=∓1V, the black dotted lines represent linear fitting of the experimental data, the left-y axis represents the accumulated phase ($\int_{t_0}^{t} \Delta\bar{\phi}(\tau)d\tau$) and the right-y axis represents the displacement ($d(t)=\int_{t_0}^{t}\bar{v}(\tau)d\tau$). The step-wise motion observed in FIG. 21 is consistent with the step-wise driving voltage applied to the PZT. The system 100 estimated the slope of d(t) to extract the velocity (see the insert boxes in FIGS. 21A and 21B). For β=−3V, −2V and −1V, the system 100 obtained v=−0.158 μm/s, −0.109 μm/s and −0.055 μm/s, corresponding to a ratio of 2.89:2.00:1. For β=3V, 2V and 1V, the system 100 obtained v=0.141 μm/s. 0.093 μm/s and 0.048 μm/s, corresponding to a ratio of 2.94:1.94:1. On the other hand, assuming a constant responsivity of the PZT ε that is the displacement under a voltage change of 1V, the system 100 can estimate the average motion velocity v=βε/$T_0$. For β=∓3V, ∓2V, ∓1V, the velocities are expected to have a ratio of 3:2:1, which is consistent with Doppler imaging data.

The system 100 further validated the capability of FF-DPM in tracking the motion of an object that had heterogeneous reflectivity. The system 100 placed a Variable Line Grating Target (Thorlabs) on the PZT and drove the PZT using voltage $$V(t) = \beta\left\lfloor\frac{t}{T_0}\right\rfloor$$

with $T_0=1$ s and $\beta=-2V$. The target thus moved away from the equal optical path plane as the voltage decreased. The results of FF-DPM imaging obtained from the resolution target are summarized in FIGS. 20A and 20B.

Figure 22A:
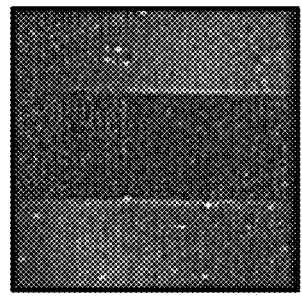
FIG. 22A is n en face amplitude image showing a top view of a variable line grating target.
Figure 22B:
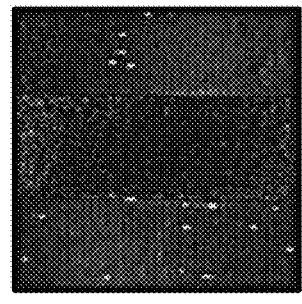
FIG. 22B is a velocity image showing a top view of the variable line grating target in FIG. 22A.
Figure 22C:
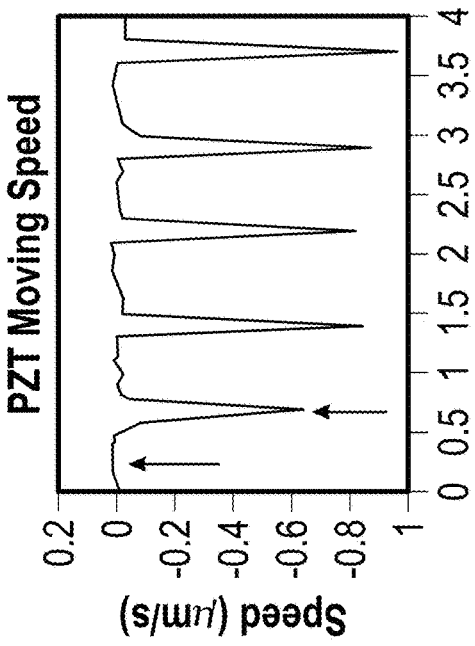
FIG. 22C is a diagram showing speed tracking with time.
Figure 22D:
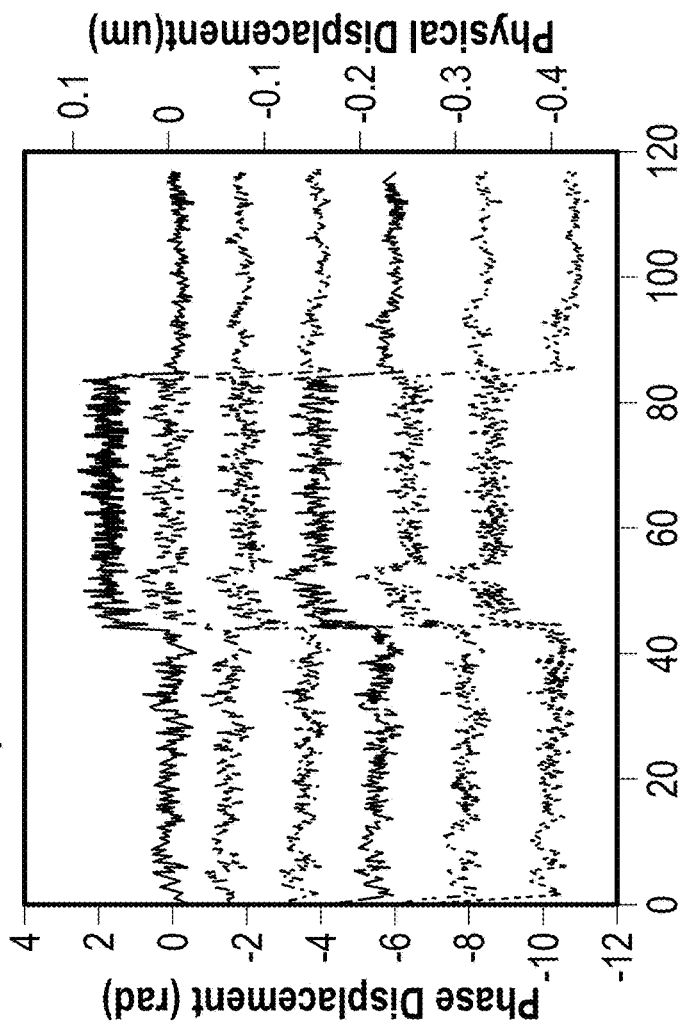
FIG. 22D is a diagram showing motion tracking of a variable line grating target.

FIG. 22A is an en face amplitude image showing a top view of the variable line grating target. FIG. 22B is a velocity image showing a top view of the variable line grating target. FIG. 22C is a diagram showing speed tracking with time. FIG. 22D is a diagram showing motion tracking of the variable line grating target.

FIG. 22A shows an en face amplitude image ($|i_{complex}(x, y, t_0)|$). Areas with large signal magnitude correspond to high reflectivity coating, while areas with low signal magnitude correspond to glass substrate. ROI is selected from a highly reflective region and another ROI from a low reflectivity region. The system 100 averaged the Doppler signal within each ROI, converted the phase shift value to instantaneous velocity ($\bar{v}(t)$), and show the results in FIG. 22B. $\bar{v}(t)$ has discrete peaks, because the PZT was driven by a step-wise voltage and took discrete steps. To display the structural image ($|i_{complex}(x,y)|$) and the Doppler image ($\Delta\phi(x,y)$) simultaneously, the system 100 used the Doppler measurement channel to color code the structural imaging channel. Using a RGB color map, the system 100 assigned the following values to the R, G and B channels of a pixel [R, G, B]: $[I_{complex}-\kappa\Delta\phi, I_{complex}, I]$ for $\Delta\phi<0$ and $[I_{complex}, I_{complex}+\kappa\Delta\phi, I_{complex}]$ for $\Delta\phi>=0$. This effectively overlay the structural image with a red shade for a negative velocity and with a green shade for a positive velocity. FIG. 22C is the overlay of structural image and Doppler image obtained at time point indicated by the black arrow in FIG. 22B. Due to the small instantaneous speed, the contribution of the Doppler channel is minimal. FIG. 22D is the overlay of structural image and Doppler image obtained at time point indicated by the red arrow in FIG. 22B. Due to the large instantaneous speed, the contribution of the Doppler channel is clearly observable.

Results of phase tracking at discrete time points along x dimension in FIG. 22D. The left-y axis and right-y axis correspond to the accumulated phase ($\int_{t_0}^{t}\Delta\phi(x, y_0, \tau) d\tau$) and the displacement ($\int_{t_0}^{t}v(x, y_0, \tau) d\tau$) respectively. As illustrated in FIG. 22D, the glass substrate corresponds to a larger phase retardation compared to region with coating due to longer optical path length. Moreover, the actual height of the chrome coating is approximately 100 nm, which is in accordance with the result the system 100 computed from the phase difference. FIG. 22 also illustrates that the sample moved away from the equal optical path length plane over time.

After validating the capability of FF-DPM in tracking the global motion of an object (FIGS. 21 and 22), the system 100 used FF-DPM to image moving nanoparticles in different environments. In the first experiment, the system 100 suspended magnetic nanoparticles in cell culture medium, and control the motion of the nanoparticles by manually moving a permanent magnet in the horizontal plane ((x,y) plane) at a 1 Hz frequency. The system 100 took a stack of FF-DPM images ($\Delta\phi(x, y, t)$), and overlaid the Doppler measurement with amplitude image using the same approach described above. A positive Doppler phase shift (move to lens) by green and negative Doppler phase shift (move away lens) by red are shown in FIG. 23.

Figure 23A:
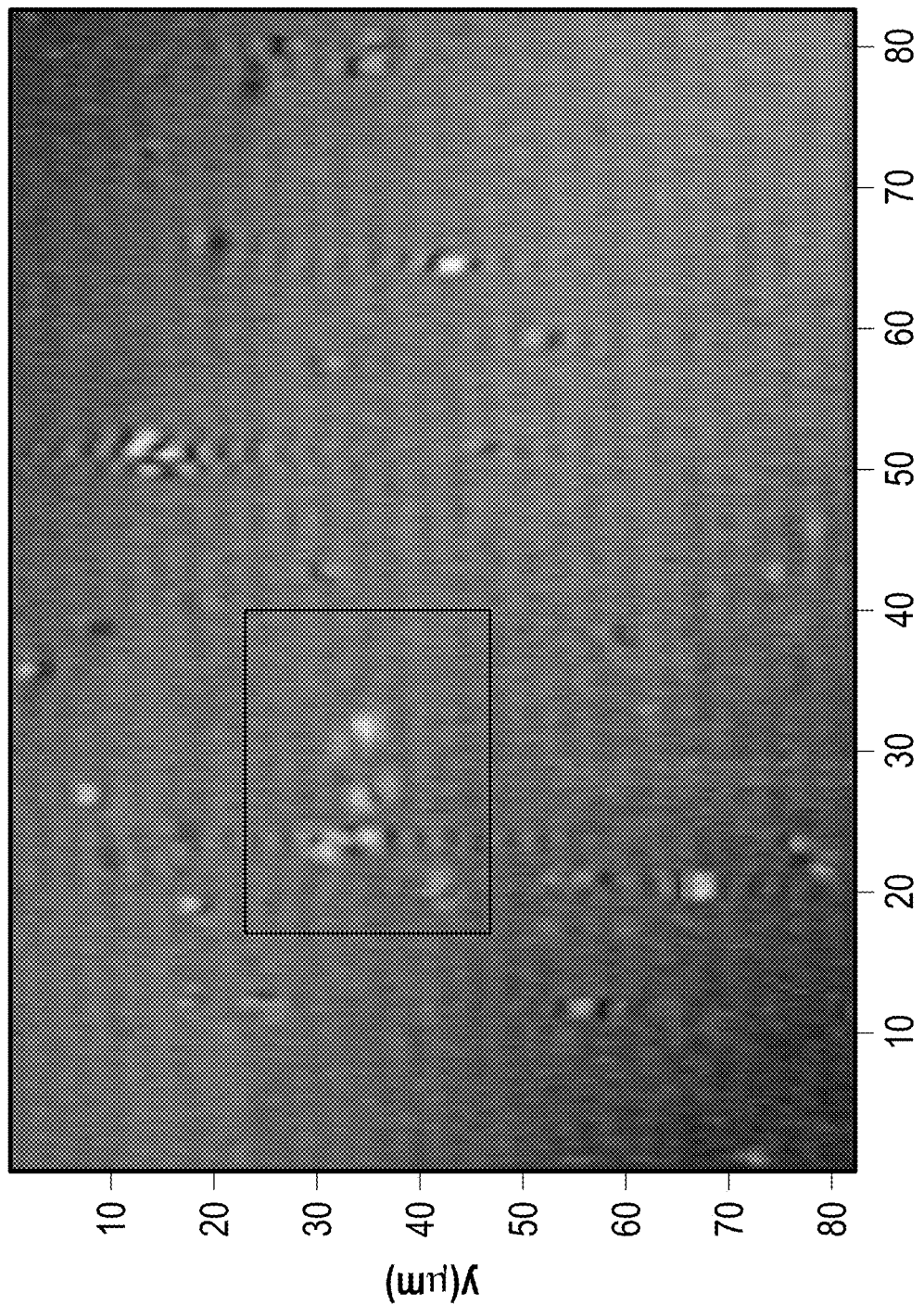
FIG. 23A illustrates a series of Doppler images for the nanoparticles excited by external magnetic field.
Figure 23B:
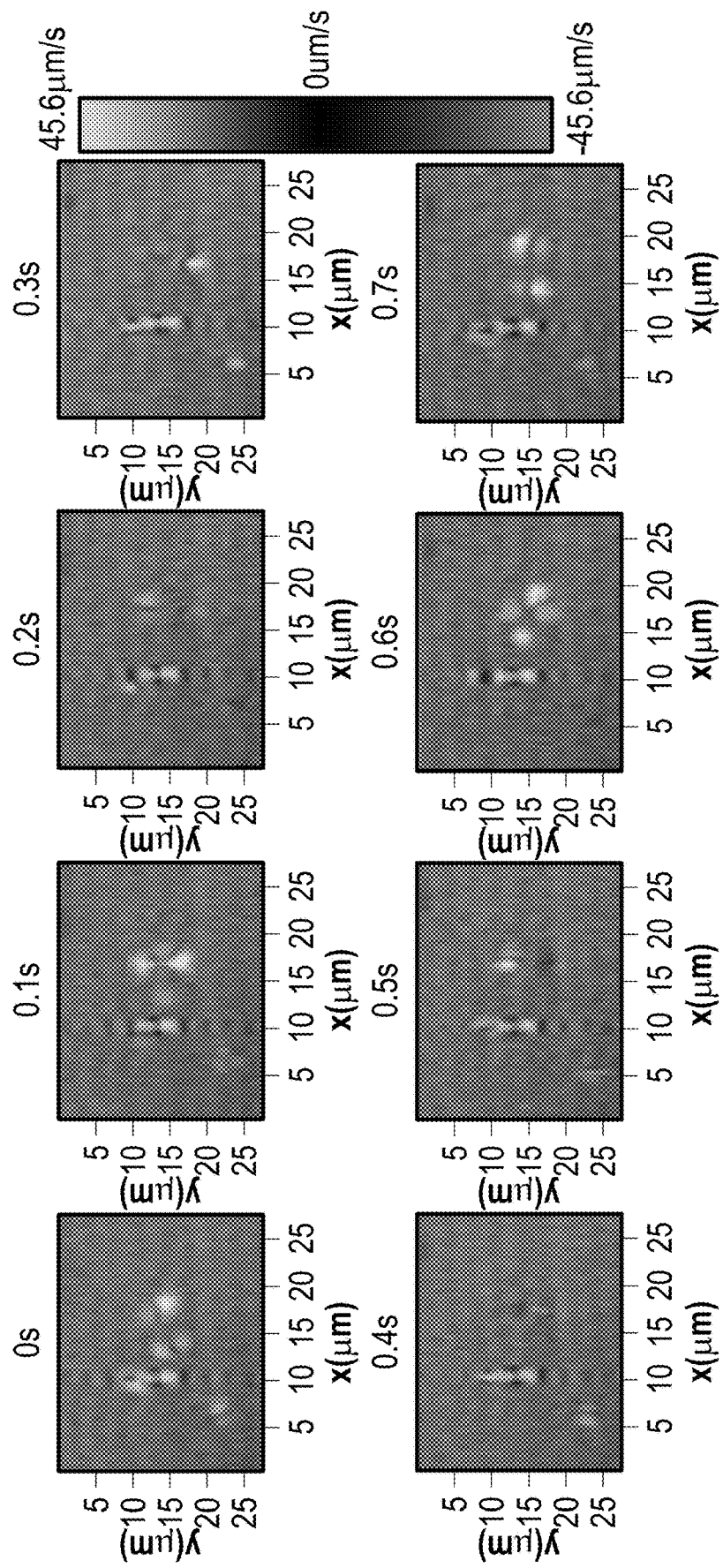
FIG. 23B illustrates a series of Doppler images for interactions between cells and nanoparticles.
Figure 23B:
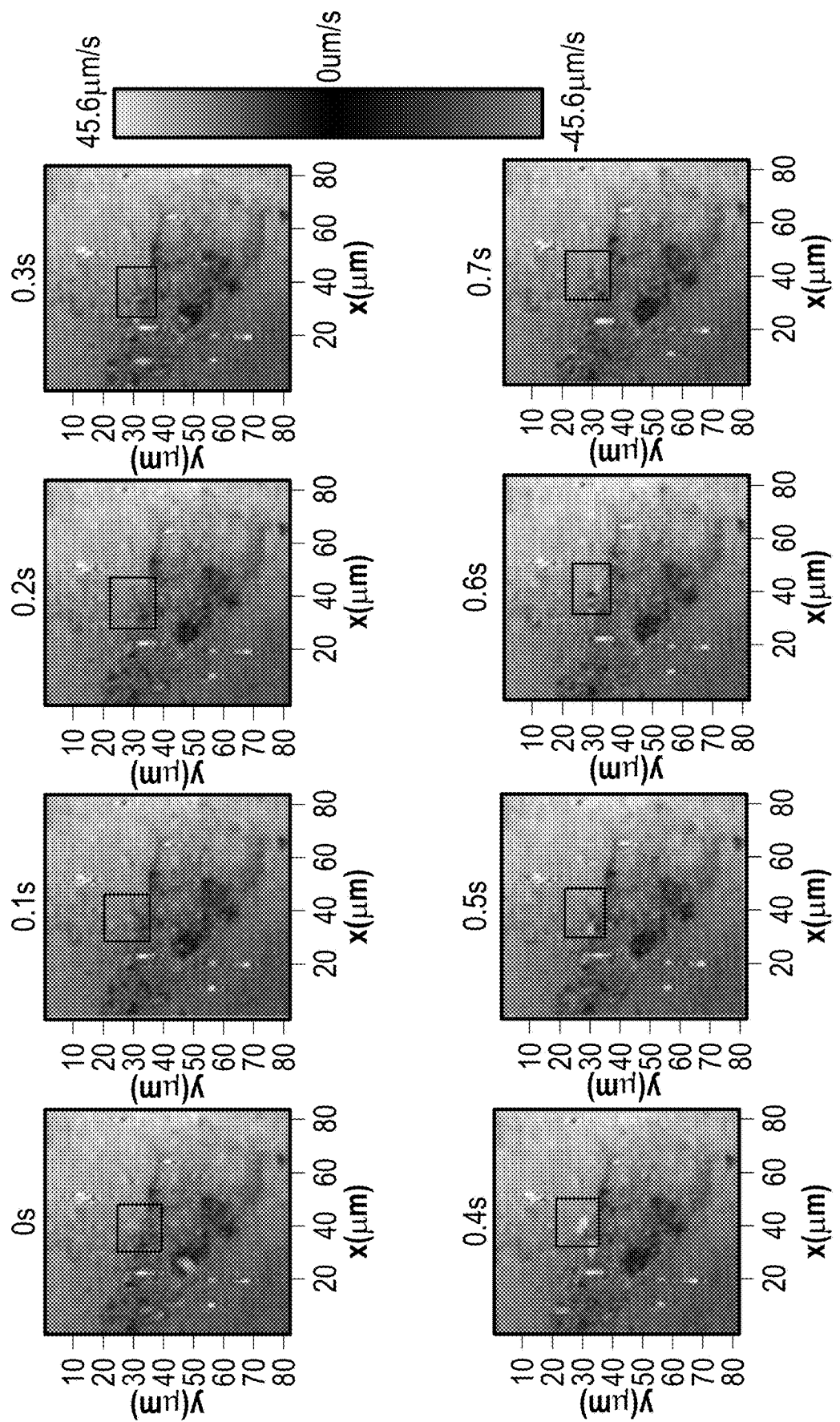

FIG. 23A illustrates a series of Doppler images for the nanoparticles excited by external magnetic field. FIG. 23B illustrates a series of Doppler images for interactions between cells and nanoparticles.

One frame of the overlaid image is shown in the first row of FIG. 23A. To show the results of Doppler measurement at different time, the system 100 selected an ROI (red box) that contained a cluster of clearly visible nanoparticles. In the second row of FIG. 23A, the nanoparticles exhibited clock-wise motion and in the second row of FIG. 23A the nanoparticles exhibited counter clock-wise motion. The nanoparticle nearly completed one cycle of rotation during a 0.8 s period which was the time for the external magnetic field to perform one full reciprocating motion.

To further demonstrate the system 100, the motion tracking of the interaction between nanoparticles is shown in FIG. 23B. The concentration of nanoparticles is diluted to the appropriate level at which cell viability is not greatly affected. The nanoparticles with the red box are highlighted. The nanoparticle is also excited by external magnetic filed in 1 hz. In these figures, the movement of the nanoparticles seems to be restricted in some way, this may be because the nanoparticles are attached to the cell and therefore cannot move freely. From FIG. 23B, some parts of the cell render Doppler frequency shift, which could be driven by the nanoparticles, the cells moved with them.

In summary, the system 100 was demonstrated in space phase tracking. The system 100 obtained quantitative images of cells and nanoparticles. Compared with other conventional systems, the system 100 can image and compute the phase of the en face plane simultaneously. In addition, the system 100 can track different depth en face planes by adjusting the pattern in the SLM 172. Also, if results with different phase resolutions are needed, the system 100 can replace the lenses 176 with different magnifications.

The system 100 performed two experiments including Doppler analysis of moving nanoparticles and cells surrounded with moving nanoparticles. The PZT is driven by a voltage between 0V to 75V, corresponding to a vertical displacement ranging from 0 to 2.8 µm (approximately). Hence, a 1V change in voltage displaces the PZT by 0.037 µm (approximately) corresponding to a PZT velocity of −0.111, −0.074, −0.037, 0.037, 0.074, 0.111 µm/s. Given that the PZT is linearly driven by a voltage change, the overall voltage change is 18 v, so the corresponding totally physical displacement is 0.672 µm. The measurement of physical displacement, the error is also within the acceptable range. Considering the error of physical displacement, physical displacement for positive voltage have a larger error compared with negative voltage samples. A more precise and linear PZT may reduce this error.

5. Complex Optically Computed Phase Microscopy for Label-Free Sub-Cellular Imaging 5.1 Overview Phase-resolved imaging techniques have been extensively investigated, including methods for qualitative phase imaging (phase contrast microscopy and differential interference contrast microscopy) and methods for quantitative phase measurement. High-resolution imaging with quantitative phase contrast remains challenging. To study the dynamics of cells when they interact with each other and their environment, there is an unmet need for quantitative phase measurement with high motion sensitivity and spatial resolution. To address this unmet need, the system 100 can provide a complex optically computed phase microscopy (complex-OCPM) technology based on a low cost LED light source, along with the unique combination of low coherence interferometry and optical computation. The key innovations of complex-OCPM include direct measurement of complex optical field and extraction of the phase as the argument of the complex optical field. The complex-OCPM system 100 enables high resolution phase imaging of label-free living cells. The system 100 obtained high-resolution complex-OCPM images of cells, including muscle cell culture myoblasts C2C12 and epithelial cell HeLa. The results from the system 100 suggest complex-OCPM is a promising label-free tool for observing morphology and dynamics of bio-samples at sub-cellular level.

Current techniques for quantitative phase imaging can be divided into two categories, depending on how the phase is extracted. One category of technologies extracts the phase from spatial domain interferometric fringes, such as imaging systems based on off-axis interferometry. In these imaging systems, the spatial resolution or localization accuracy of the phase measurement is limited by the imposed waveform (specifically the density of interferometric fringe). Another category of technologies extracts the phase from a time domain waveform, such as imaging systems based on phase-shifting interferometry. Phase-shifting interferometry usually relies on mechanical scanning of the optical path length, and has a limited the temporal resolution and phase stability. Optical coherence tomography (OCT) based on low coherence interferometry has also been used in quantitative phase measurement. However, conventional OCT systems perform raster scanning prioritizing axial (z) dimension, leading to a low imaging speed in the transverse ((x,y)) plane.

Define the complex field reflectivity of the sample in a Cartesian coordinate system (x,y,z): $a_{complex}(x,y,z)=|a_{complex}(x,y,z)|e^{j\phi(x,y,z)}$ (z is along the direction of light propagation and (x,y) indicates the transverse plane). The goal of complex-OCPM imaging is to perform high-resolution measurement of $\phi$ (x,y,z). However, detecting complex optical field is not a trivial task. Photon detectors create real electrical signals (current or voltage) proportional to light intensity. Many quantitative phase imaging technologies extract the phase as the position of a point within a waveform. The period of the waveform effectively limits the spatial resolution of these phase imaging technologies.

As describe above, the system 100 can provide optically computed phase microscopy (OCPM, referred as real-OCPM subsequently) that takes real measurement and performs quantitative phase imaging. In real-OCPM, the signal photons go through the low coherence interferometer 160 and the optical computation assembly 170 to enable depth resolved imaging and phase quantification. Similar to Hilbert quantitative phase imaging, real-OCPM performs post-processing (spatial frequency domain filtering and frequency shifting) of the measured signal to extract the phase, while its spatial resolution is determined by the density of imposed waveform. With a system configuration similar to that of real-OCPM and a unique data acquisition strategy, the system 100 can also provide a complex-OCPM that directly measures the real and imaginary parts of the complex optical field, by modulating the interferometric spectra with different patterns at the SLM 172. Through direct measurement of the complex optical field, complex-OCPM considers the phase as the argument of a complex function, fully utilizes the resolving power of the imaging optics and allows high-resolution quantitative phase imaging.

5.2 System and Method Overview

The system 100 can provide complex-OCPM as described with respect to FIGS. 1 and 2. Briefly, in some embodiments, the system 100 includes the low coherence interferometer 160 and the optical computation assembly 170. The low coherent interferometer 160 uses an LED (730 nm central wavelength and 40 nm bandwidth) as the broadband source. The system 100 has a theoretical axial resolution of 5.9 µm and the experimentally characterized axial resolution is 8.4 µm. The reference arm and sample arm use a pair of water dipping lenses 164 (40× Nikon CFI APO NIR Objective, NA=0.8) for sample illumination and signal/reference photon collection. Light exiting the interferometer 160 is processed by the optical computation assembly 170 which has the diffraction grating 174 (1200 lines/mm), a lens 176, and a reflective spatial light modulator (SLM, Holoeye LC-R 720). Within the optical computation assembly 170, the grating 174 does not alter light propagation along y direction, as the periodical groove structure of the grating 174 is along x direction. Signal photons from different y coordinates arrive at different rows of the SIM 172 and eventually hit different rows of the camera's sensing array. On the other hand, light originated from a specific x coordinate of the sample plane is dispersed by the grating 174, and modulated by different pixels in the corresponding row of the SLM 172. After SLM modulation, the light goes through the grating 174 for the second time, which effectively cancels out the dispersion introduced during its previous passage through the grating 174. The camera 180 then detects light without spectral discrimination. The system 100 establishes a one-to-one mapping between transverse coordinates in the sample plane and in the sensor plane, and utilizes optical computation to select the depth of imaging.

Figure 24:
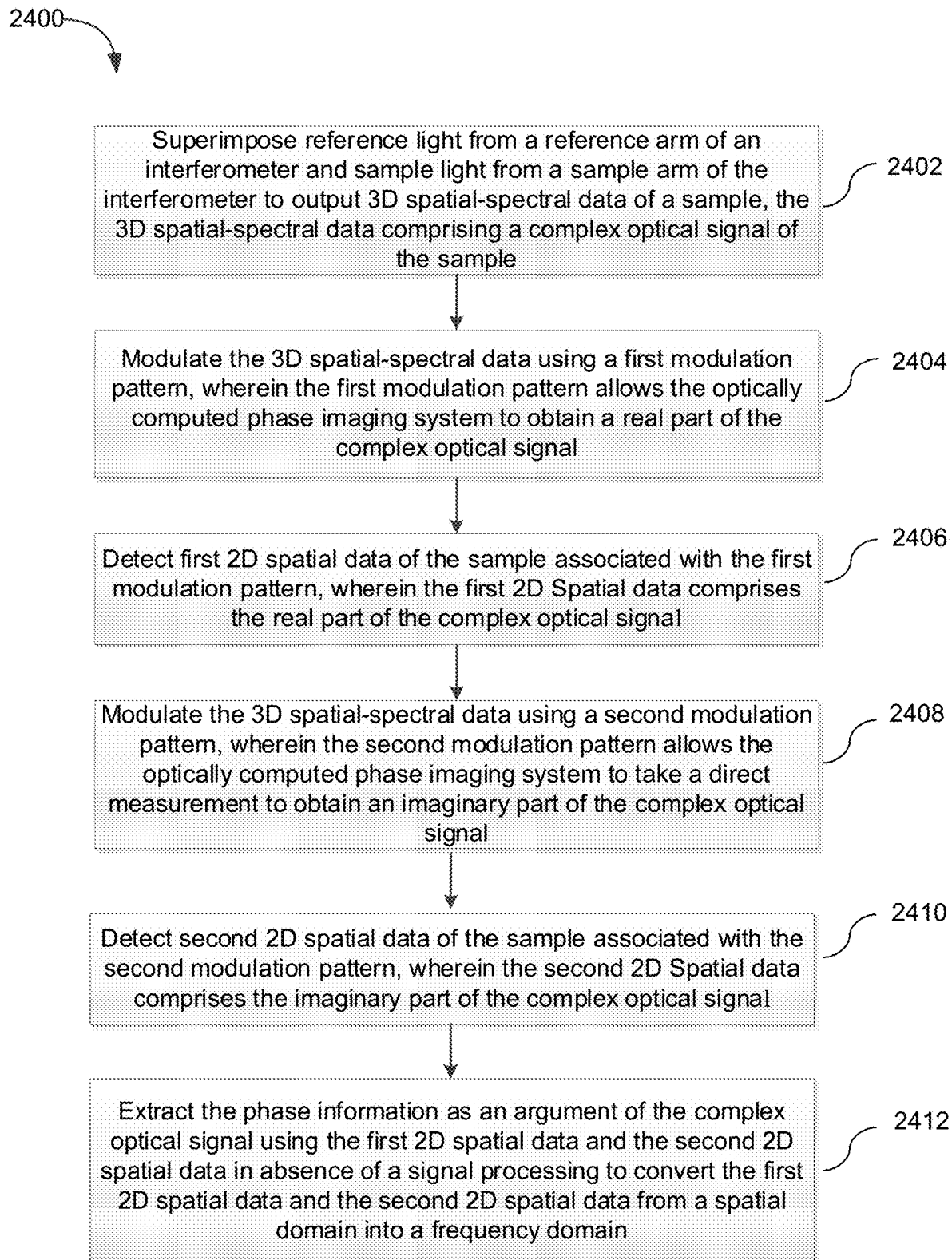
FIG. 24 is a flowchart illustrating processing steps for complex optically computed phase imaging carried out by the system of the present disclosure.
Figure 25A:
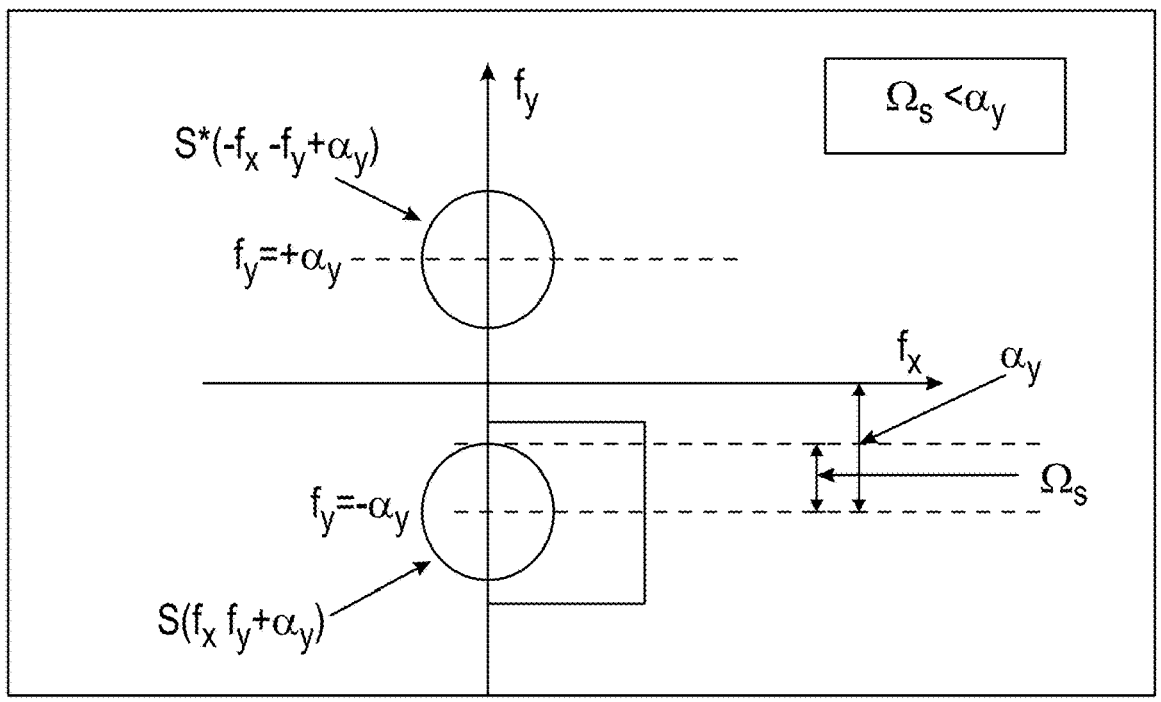
FIG. 25A is a diagram showing $I_{cos}(f_x, f_y)$ with complex conjugation symmetry.
Figure 25B:
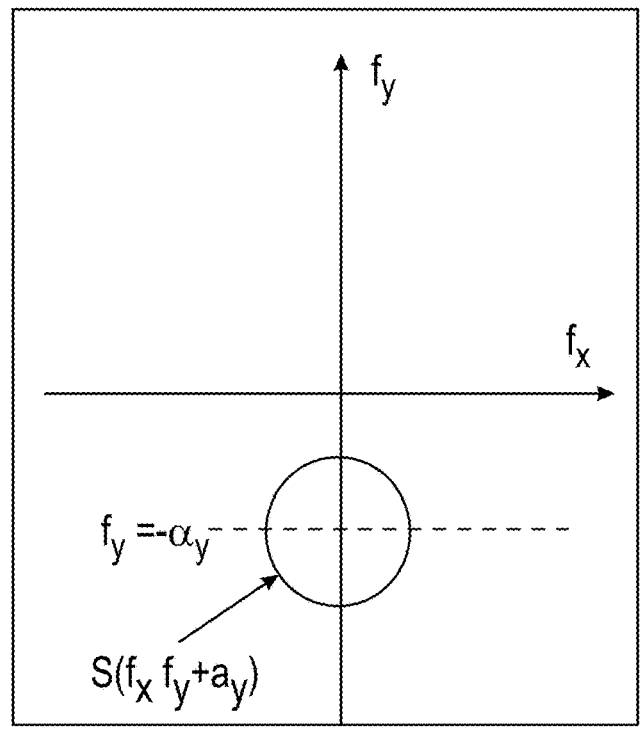
FIG. 25B is a diagram showing a spatial-frequency domain representation obtained by filtering $I_{cos}(f_x, f_y)$ in a real measurement.
Figure 25C:
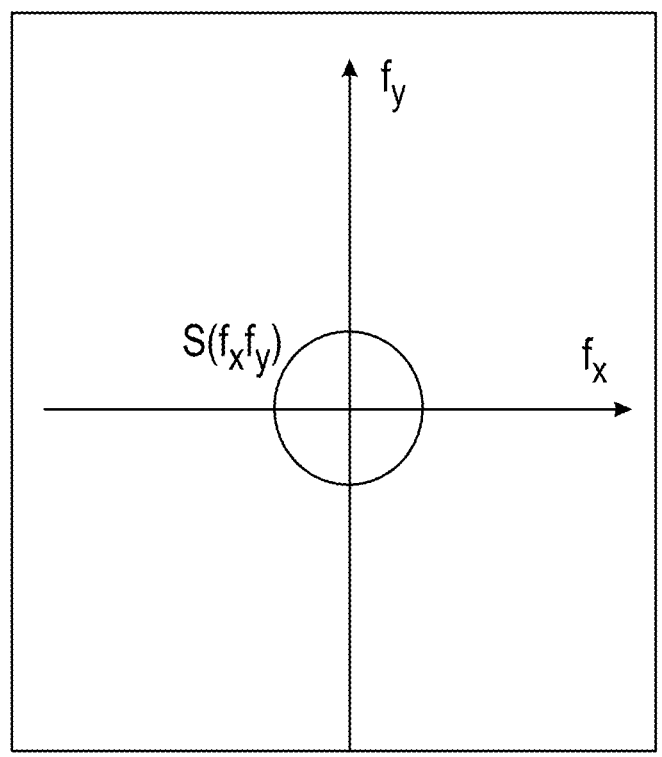
FIG. 25C is a diagram showing a spatial-frequency domain representation obtained by directly measuring in a complex measurement.

FIG. 24 is a flowchart illustrating processing steps 2400 for complex optically computed phase imaging carried out by the system 100 of the present disclosure. In step 2402, the system 100 superimposes reference light from a reference arm of an interferometer and sample light from a sample arm of the interferometer to output 3D spatial-spectral data of a sample. The 3D spatial-spectral data includes a complex optical signal of the sample. Examples are described with respect to step 302 in FIG. 3 and further described below.

In step 2404, the system 100 modulates the 2D spatial-spectral data using a first modulation pattern. The first modulation pattern allows the system 100 to obtain a real part of the complex optical signal. Examples are described with respect to step 302 in FIG. 3 and further described below.

In step 2406, the system 100 detects first 2D spatial data of the sample associated with the first modulation pattern. The first 2D Spatial data includes the real part of the complex optical signal. Examples are described with respect to step 302 in FIG. 3 and further described below.

For example, unlike conventional optical imaging systems where the signal processing is conducted after photon detection, the system 100 process the signal optically before photon detection, as described above. The optical computation strategy enables a low-dimensional (2D) detector 180 to sample the high-dimensional (3D) data. Output from the interferometer 160, the superposed sample and reference light is modulated by the SLM 172. The sample light from transverse coordinate (x,y) over different depths z is expressed as the following integral: $\int a_{complex}(x,y,z)e^{jkz} dz$, where k represents wavenumber. Assuming the reference reflector has a reflectivity ($R_s$) and is located at z=0, the system 100 can express the light spectrally dispersed by the grating 174 as $\beta M_0(k)|\int a_{complex}(x,y,z)e^{jkz} dz+R_s|^2$ ($\beta$: system efficiency; $M_0(k)$: source spectrum). Light intensity at the SLM 172 is further written as Equation (5.1) where $a_{dc}(x,y)=|\int a_{complex}(x,y,z)e^{jkz}] dz|^2+|R_s|^2$ and Re( ) represents to take the real part of a complex function. The second term in Equation (5.1) is the interferometric term and is the linear combination of sinusoidal functions. Each sinusoidal function corresponds to optical signal from a specific depth (z). To achieve depth resolved measurement, the SLM 172 modulates the incident light with a sinusoidal pattern Equation (5.2). The light modulated and reflected by the SLM 172 goes through the grating 174 again, which effectively cancels out dispersion introduced during its previous passage through the grating 174. Afterwards, the camera 180 performs photon detection without spectral discrimination, as indicated by the integral with regard to k in Equation (5.3). From Equation (5.3), the system 100 uses Equation (5.4) following derivation detailed as described above. For simplicity, assuming β=1 and $R_s$=1. In Equation (5.4) ⊗ indicates 1D convolution with regard to v, and $\gamma_0$( ) represents the axial point spread function of the system 100. $\gamma_0(v)$ is the Fourier transform of source spectrum $M_0(k)$ and diminishes as v increases. The width of $\gamma_0(v)$ represents the axial resolution of the system 100. As shown in Equation (5.4), optical computation (SLM modulation according to Equation (5.2)) and detection without spectral discrimination in Equation (5.3) enable depth resolved imaging. The imaging depth ($z_{SLM}$=45 µm) is determined by the SLM pattern and the depth resolution is determined by the coherence property of the light source $y_0(v)$). For cultured cells with thickness significantly smaller than the axial resolution of the system 100, the sample 168 can be modeled as an axial impulse function located at depth $z_{cell}$: $a_{complex}(x,y,z)=\delta(z-z_{cell})s(x,y)$. For such a sample function, Equation (5.4) becomes Equations (5.5) given γ(0)=1 and $z_{SLM}=z_{cell}$. In real-OCPM, the phase is extracted from Equation (5.5), according to step 306 in FIG. 3. Briefly, 2D Fourier transform is applied to Equation (5.5), leading to Equation (5.6) where S* ( ) is the complex conjugate of S( ) and $A_{dc}(f_x, f_y)$ is the 2D Fourier transform of $a_{dc}(x,y)$. $S(f_x, f_y)$ is the spatial-frequency domain representation of the complex signal s(x,y), and $S(f_x, f_y+\alpha_y)$ and $S^*(-f_x, -f_y+a\alpha_y)$ are two spectral shifted copies of $S(f_x, f_y)$. $I_{cos}(f_x, f_y)$ in Equation (5.6) has two spectral copies with complex conjugation symmetry (FIG. 25A which is a diagram showing $I_{cos}(f_x, f_y)$ with complex conjugation symmetry), because the measurement $i_{cos}(x,y)$ is real. $S(f_x, f_y)$ is obtained by band-pass filtering (FIG. 25B which is a diagram showing $S(f_x, f_y+\alpha_y)$ obtained by filtering $I_{cos}(f_x, f_y)$ in real-OCPM) and frequency shifting (FIG. 25C which is a diagram showing $S(f_x, f_y+\alpha_y)$ obtained by directly measured in complex-OCPM). Following inverse Fourier transform, complex valued s(x,y) and its phase can be obtained.

As shown in Equation (5.6) and FIG. 25, to spatially resolve a signal s(x,y), its bandwidth $$\Omega_s \left( |S(f_x, f_y)| = 0 \text{ for } \sqrt{f_x^2 + f_y^2} > \Omega_s \right)$$

must be smaller than $\alpha_y$. Otherwise, $S(f_x, f_y+\alpha_y)$ and $S^*(-f_x, -f_y+\alpha_y)$ have overlap in spatial frequency domain and $S(f_x, f_y)$ cannot be accurately recovered by filtering $I_{cos}(f_x, f_y)$. Therefore, the transverse resolution of real-OCPM $\delta r_{real}$ is determined by: $\alpha_y$:

$$\delta r_{real} = \frac{2\pi}{\Omega_s} > \frac{2\pi}{\alpha_y}.$$

To create modulation shown as Equation (5.2), the pixels of the SLM 172 must sample the sinusoidal function above Nyquist rate. This needs $\alpha_y > \pi M/(L_{SLM})$, where $L_{SLM}$ is the width of the SLM pixel and M is the magnification from the sample plane to the SLM plane. In some embodiments, α is less or greater than $$\frac{1}{2}\pi M/(L_{SLM}).$$

With $L_{SLM}$=20 µm and M=80, the transverse resolution is approximately 1 µm and is inferior to diffraction limit:

$$\delta r_{diff} = \frac{0.61 \lambda_0}{NA} = 0.56 \, \mu m.$$

Therefore, the transverse resolution of real-OCPM is determined by the modulation pattern imposed by the SLM 172 and is generally inferior to the diffraction limit of the imaging optics.

$$a_{SLM}=\beta M_0(k)[a_{dc}(x,y)+2 \text{ Re}(R_s*\int a_{complex}(x,y,z)e^{jk_z}dz)] \quad (5.1)$$

$$f_{cos}(y,k)=1+\cos(kz_{SLM}+\alpha_y y) \quad (5.2)$$

$$i_{cos}(x,y)=\int [f_{cos}(y,k)a_{SLM}]dk \quad (5.3)$$

$$i_{cos}(x,y)=\gamma_0(0)a_{dc}(x,y)+2 \text{ Re}([\gamma_0(z_{SLM})\otimes a_{complex}(x,y,z_{slm})]e^{-j\alpha_y y}) \quad (5.4)$$

$$i_{cos}(x,y)=\gamma_0(0)a_{dc}(x,y)+2 \text{ Re}(\gamma_0(0)s(x,y)e^{-j\alpha_y y}=a_{dc}(x,y)+2 \text{ Re}(s(x,y)e^{-j\alpha_y y}) \quad (5.5)$$

$$I_{cos}(f_x,f_y)=A_{dc}(f_x,f_y)+S(f_x,f_y+\alpha_y)+S^*(-f_x,-f_y+\alpha_y) \quad (5.6)$$

In step 2408, the system 100 modulates the 3D spatial-spectral data using a second modulation pattern. The second modulation pattern allows the system 100 to take a direct measurement to obtain an imaginary part of the complex optical signal. Examples are described below with respect to Equations (5.7)-(5.10).

In step 2410, the system 100 detects second 2D spatial data of the sample associated with the second modulation pattern. The second 2D Spatial data includes the imaginary part of the complex optical signal. Examples are described below with respect to Equations (5.7)-(5.10).

In step 2412, the system 100 extracts the phase information as an argument of the complex optical signal using the first 2D spatial data and the second 2D spatial data in absence of a signal processing to convert the first 2D spatial data and the second 2D spatial data from a spatial domain into a frequency domain. Examples are described below with respect to Equations (5.7)-(5.10).

Complex-OCPM takes a different data acquisition and signal processing strategy. By projecting another SLM pattern (Equation (5.7)) and taking an additional measurement (Equation (5.8) where Im( ) indicates the imaginary part of a complex value), the system 100 assembles a complex measurement (Equation (5.9)) and extracts the phase φ(x,y). Direct measurement of the complex signal is critical for complex-OCPM to fully utilize the spatial resolving power of the imaging optics. To demonstrate this, the system 100 considers $I_{complex}(f_x, f_y)$, the spatial-frequency domain representation of $i_{complex}(x,y)$. With a complex $i_{complex}(x,y)$, $I_{complex}(f_x, f_y)$, (Equation (5.10)) does not have complex conjugation symmetry. As a result, $S(f_x, f_y)$ can be directly obtained by spectrally shifting $I_{complex}(f_x, f_y)$. The resolvable bandwidth of s(x,y) is not limited by the waveform imposed by the SLM 172 and can approach the limit of imaging optics.

$$f_{sin}(y,k)=1+\sin(kz_{SLM}+\alpha_y y) \quad (5.7)$$

$$i_{sin}(x,y)=a_{dc}(x,y)+\text{Im}(s(x,y)e^{-j\alpha_y y}) \quad (5.8)$$

$$i_{complex}(x,y)=(i_{cos}(x,y)-a_{dc}(x,y)+j(i_{sin}(x,y)-a_{dc}(x,y))=s(x,y)e^{-j\alpha_y y}=|s(x,y)|e^{j\phi(x,y)}e^{-j\alpha_y y} \quad (5.9)$$

$$I_{complex}(f_x,f_y)=S(f_x,f_y+\alpha_y) \quad (5.10)$$

5.3 Experimental Results

To demonstrate the advantage of complex-OCPM in spatial resolution and validate its quantitative phase imaging capability, the system 100 projected sinusoidal patterns to the SLM 172 (Equations (5.2) and (5.7) with $\alpha_y \approx 0.82 \, \mu m^{-1}$) and imaged a resolution target with reflective bars (Reflective Variable Line Grating Target, Thorlabs). The system 100 chose to project sinusoidal patterns with low frequency along y dimension (small $\alpha_y$).

Figures 26A, 26B, 26C, 26D, 26E, 26F:
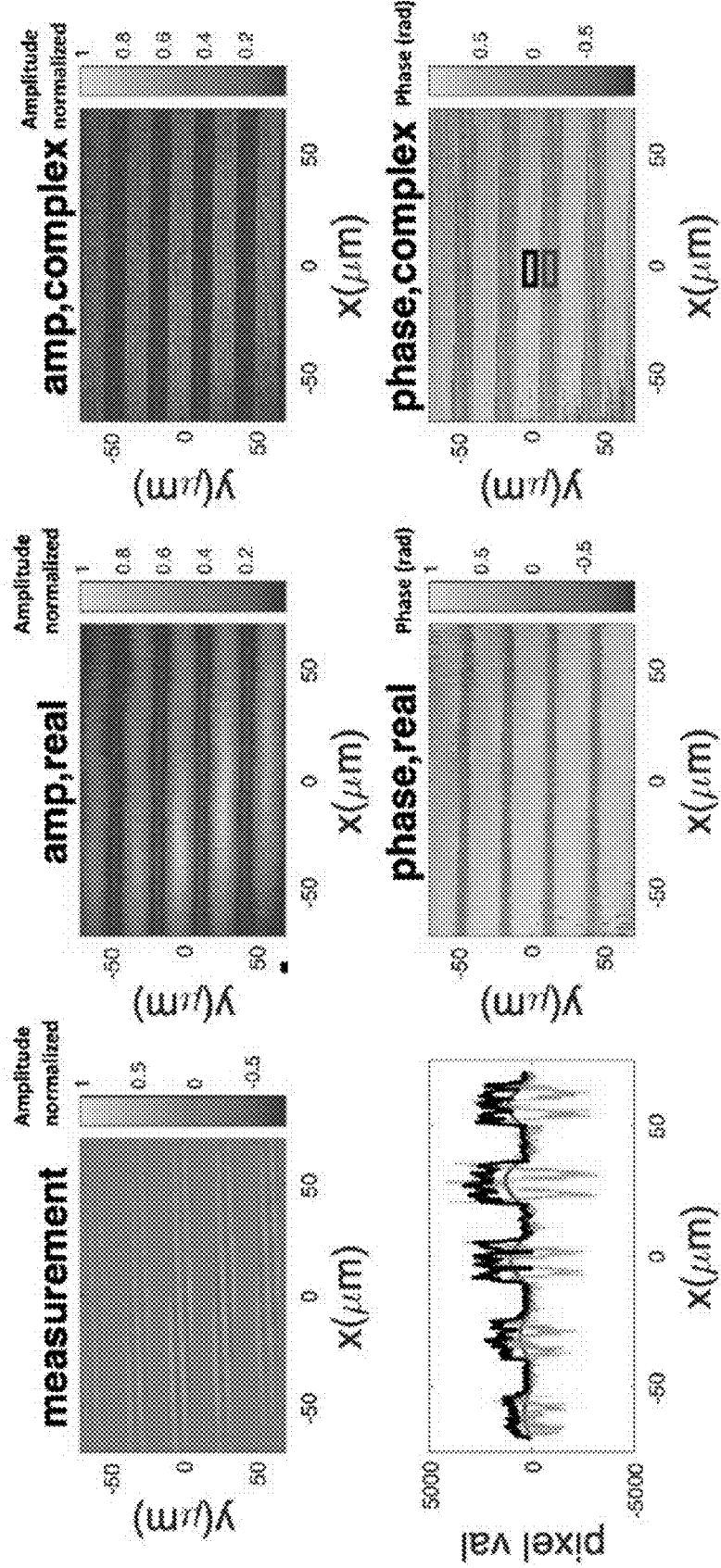
FIG. 26A is an intensity image of a resolution target.
FIG. 26B is an amplitude image of the resolution target in FIG. 26A taken from a real measurement.
FIG. 26C is an amplitude image of the resolution target in FIG. 26A taken from a complex measurement.
FIG. 26D is a diagram showing signals along x=0 from FIGS. 26A-26C.
FIG. 26E is a phase image of the resolution target taken from the real measurement in FIG. 26B.
FIG. 26F illustrates a phase image of the resolution target taken from the complex measurement in FIG. 26C.

FIG. 26A is an intensity image of a resolution target. FIG. 26B is an amplitude image of the resolution target in FIG. 26A taken from a real measurement. FIG. 26C is an amplitude image of the resolution target in FIG. 26A taken from a complex measurement. FIG. 26D is a diagram showing signals along x=0 from FIGS. 26A-26C. FIG. 26E is a phase image of the resolution target taken from the real measurement in FIG. 26B. FIG. 26F is a phase image of the resolution target taken from the complex measurement in FIG. 26C.

FIG. 26A shows $i_{cos}(x,y)$ (DC subtracted), the real measurement obtained with a cosine pattern projected to the SLM 172. FIGS. 26B and 26C show the amplitude images for real-OCPM and complex-OCPM. The high reflectivity bars in FIGS. 26B and 26C correspond to regions with chrome coating and the low reflectivity background corresponds to the glass substrate. FIG. 26C shows a much sharper edge between different parts of the sample. To further illustrate the difference in spatial resolution between real-OCPM and complex-OCPM, FIG. 26D shows signals along x=0 in FIGS. 26A-26C (green, red and black). The period of the modulation waveform seen from the green curve is approximately 8 µm which is consistent with the value of $\alpha_y \approx 0.82 \, \mu m^{-1}$. The real-OCPM signal (red) fails to show the sharp transition from high reflectivity region to low reflectivity region (and vice versa). This is because a small $\alpha_y$ leads to a low spatial resolution $$\delta r > \frac{2\pi}{\alpha_y} = 8 \, \mu m.$$

In comparison, the complex-OCPM signal (black) clearly shows a sharp edge between regions with different reflectivities, as the spatial resolution of complex-OCPM is independent of $\alpha_y$. The phase images are shown in FIG. 26E (real-OCPM) and FIG. 26F (complex-OCPM). Similar to amplitude image, the phase image obtained from complex-OCPM (FIG. 26F) has higher spatial resolution compared to real-OCPM phase image (FIG. 26E). To validate the capability of complex-OCPM in phase quantification, the system 100 averaged the phase values within regions of interests (ROIs) indicated by the boxes in FIG. 26F. ROI1 in the black box corresponded to an elevated area with chrome deposition and ROI2 in the red box corresponded to the glass substrate. The system 100 converted the phase to optical path length $$\left(d = \frac{\lambda_0 \phi}{4\pi}\right),$$

and estimated the height of the chrome deposition to be $d_{chrome}=d_{ROI1}-d_{ROI2}=117$ nm which is consistent with the value provided by the manufacturer (120 nm).

The system 100 quantitatively evaluated the transverse resolution of complex-OCPM by imaging a 1951 USAF resolution target. The system 100 projected sinusoidal patterns (Equations (5.2) and (5.7)) with $\alpha_y=4.2 \, \mu m^{-1}$. With such a modulation waveform, real-OCPM was expected to have a resolution of 1.5 µm. However, complex-OCPM image achieved a higher spatial resolution, as illustrated in FIG. 27.

Figures 27A, 27B, 27C, 27D:
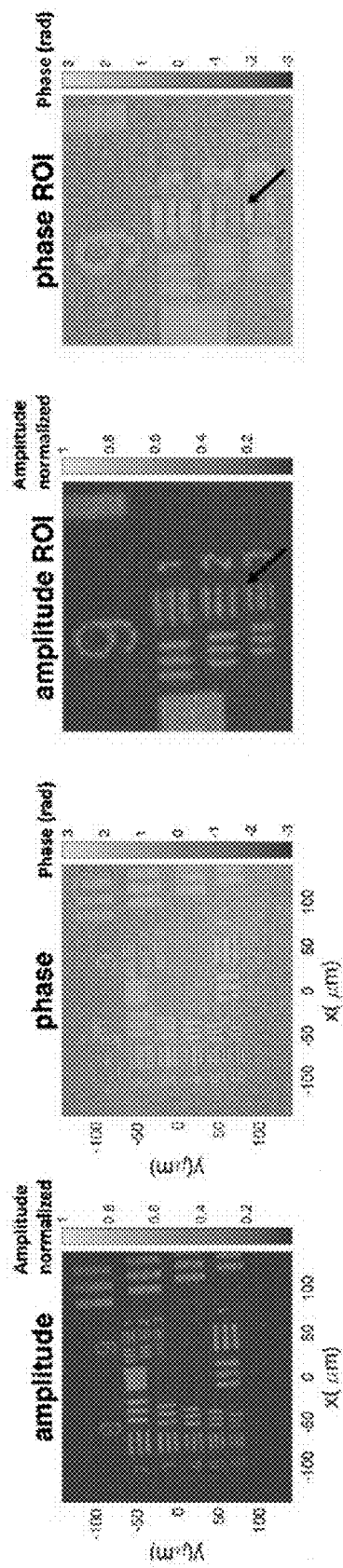
FIG. 27A is an amplitude image of a resolution target taken from a complex measurement.
FIG. 27B is a phase image of the resolution target taken from the complex measurement in FIG. 27A.
FIG. 27C is an amplitude image of a region of interest (ROI) of a resolution target taken from a complex measurement.
FIG. 27D is a phase image of the ROI of the resolution target taken from the complex measurement in FIG. 27C.

FIG. 27A is an amplitude image of a resolution target taken from a complex measurement. FIG. 27B is a phase image of the resolution target taken from the complex measurement in FIG. 27A. FIG. 27C is an amplitude image of a region of interest (ROI) of a resolution target taken from a complex measurement. FIG. 27D is a phase image of the ROI of the resolution target taken from the complex measurement in FIG. 27C.

FIGS. 27A and 27B show amplitude image and phase image of complex-OCPM. FIGS. 27C and 27D are the ROIs showing elements of the 9$^{th}$ group of the resolution target, in the phase and amplitude images. Individual bars of the 3$^{rd}$ element in the 9$^{th}$ group are clearly discernible (indicated by the arrows), suggesting a resolution higher than 0.78 µm and higher than the value limited by $\alpha_y$. The smallest structure of the resolution target (3$^{rd}$ element in the 9$^{th}$ group) has a dimension of 0.78 µm. The half-widths of the rising and falling edge along x and y dimensions were approximately two pixels (approximately 0.55 µm), corresponding to the diffraction limited spatial resolution.

The system 100 demonstrated complex-OCPM imaging on cultured Hela cells and C2C12 cells. Hela cell line and C2C12 cell line were cultured in Dulbecco's Modified Eagle Medium (DMEM) supplemented with 10% fetal bovine serum, 1% penicillin/streptomycin at 37° C. in a humidified 5% $CO_2$ incubator.

Figures 28A, 28B, 28C, 28D:
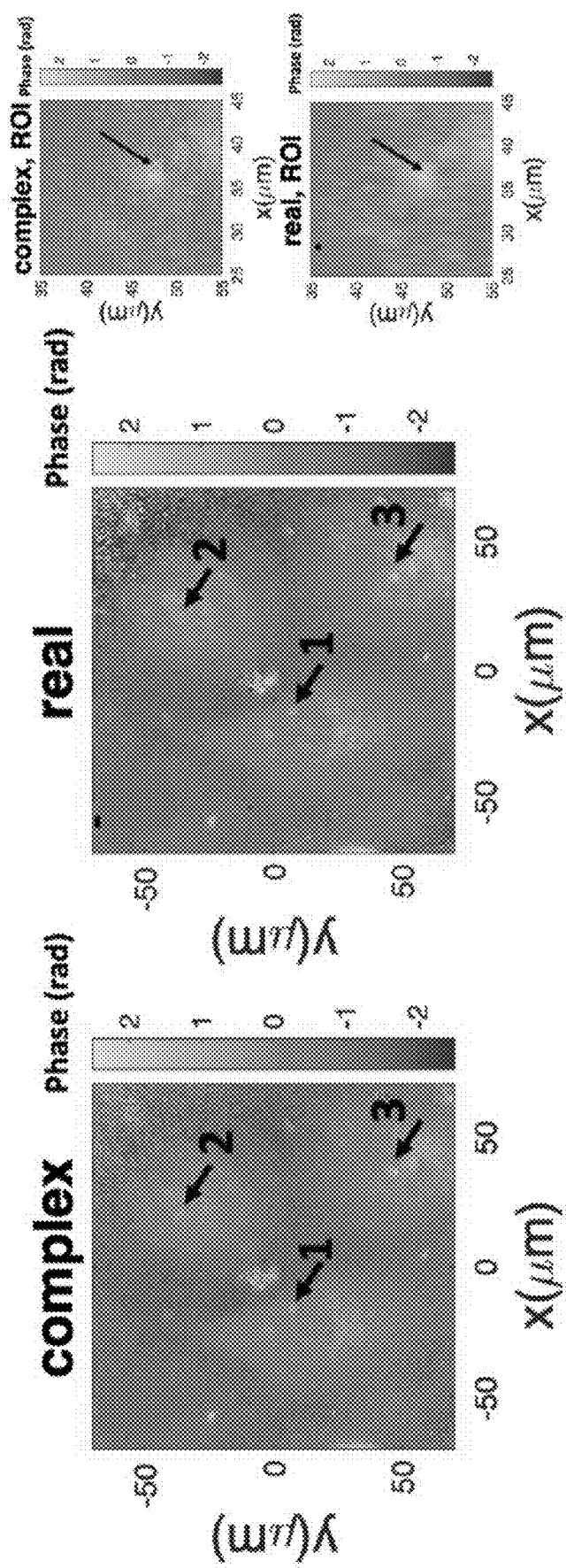
FIG. 28A is a phase image of HeLa cells taken from a complex measurement.
FIG. 28B is a phase image of the HeLa cells in FIG. 28A taken from a real measurement.
FIG. 28C is a phase image of a ROI of HeLa cells taken from a complex measurement.
FIG. 28D is a phase image of the ROI of the Hela cells in FIG. 28C taken from a real measurement.

FIG. 28A is a phase image of HeLa cells taken from a complex measurement. FIG. 28B is a phase image of the HeLa cells in FIG. 28A taken from a real measurement. FIG. 28C is a phase image of a ROI of Hela cells taken from a complex measurement. FIG. 28D is a phase image of the ROI of the Hela cells in FIG. 28C taken from a real measurement.

FIGS. 28A and 28B show label-free phase images of Hela cells (complex-OCPM and real-OCPM phase images). Regions with larger phase retardation correspond to cell nucleus with a higher refractive index. Individual nucleolus can be identified in FIGS. 28A and 28B (arrows). In addition, some small spots in the cytoplasm can be clearly seen, which may be lysosomes, lipid droplets, or other organelles. Compared to real-OCPM, complex-OCPM achieves a higher spatial resolution and provides visualization of organelles such as nucleolus with a larger contrast. This is seen more clearly in FIGS. 28C and 28D, where the same nucleolus (indicated by arrow 3 in FIGS. 28A and 28B) has a smaller spatial extension in complex-OCPM image.

Figures 29A, 29B, 29C, 29D:
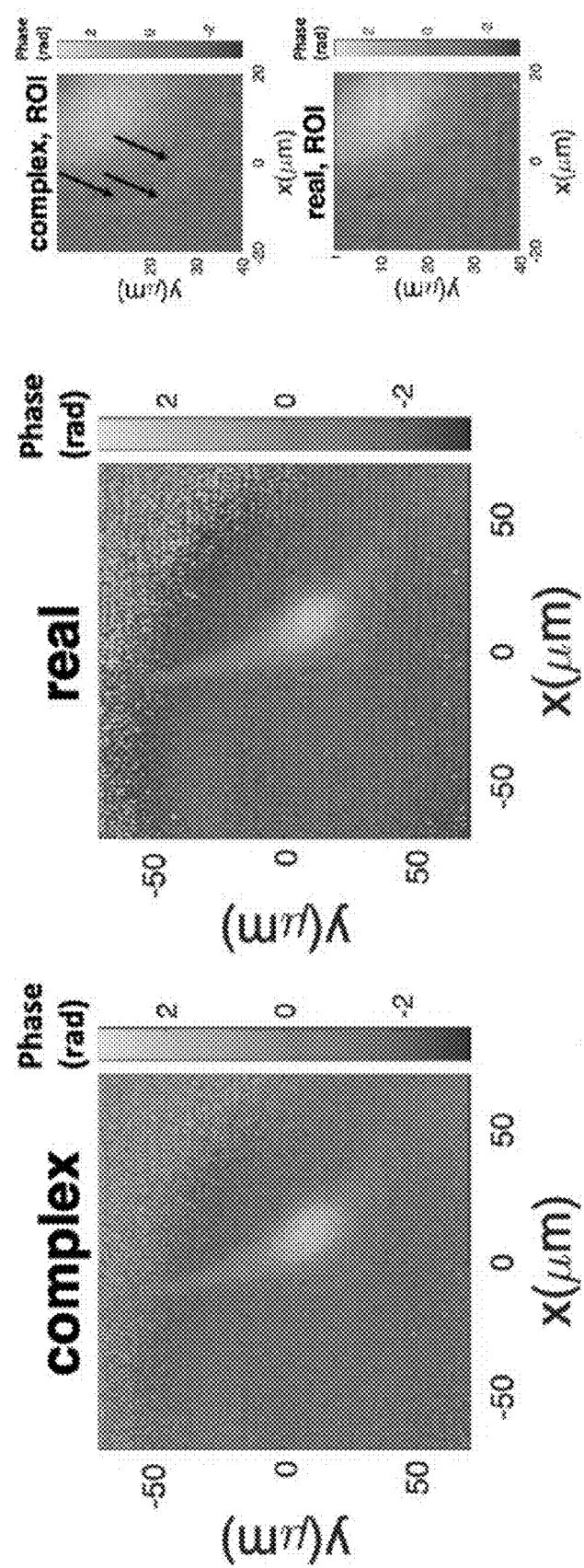
FIG. 29A is a phase image of C2C12 cells taken from a complex measurement.
FIG. 29B is a phase image of the C2C12 cells in FIG. 29A taken from a real measurement.
FIG. 29C is a phase image of a ROI of C2C12 cells taken from a complex measurement.
FIG. 29D is a phase image of the ROI of the C2C12 cells in FIG. 29C taken from a real measurement.

FIG. 29A is a phase image of C2C12 cells taken from a complex measurement. FIG. 29B is a phase image of the C2C12 cells in FIG. 29A taken from a real measurement. FIG. 29C is a phase image of a ROI of C2C12 cells taken from a complex measurement. FIG. 29D is a phase image of the ROI of the C2C12 cells in FIG. 29C taken from a real measurement.

FIGS. 29A-29D show images of the cultured C2C12 cells. The C2C12 cell line is a subclone of myoblasts and features a radial branching morphology consisting of long fibers. FIGS. 29A and 29B show label-free phase images of C2C12 cells (complex-OCPM and real-OCPM phase images). FIGS. 29C and 29D are the ROIs showing the fibrous morphological feature of C2C12 cells. Complex-OCPM provides higher spatial resolution and resolves the tracks of fibers, as indicated by arrows in FIG. 29C. In comparison, the fiber tracks are not visible in FIG. 29D.

5.4. Summary of Complex Optically Computed Phase Imaging

The system 100 provides a complex-OCPM imaging technology that directly measures the complex optical field through optical computation to achieve high-resolution phase imaging. Instead of extracting the phase from a local (spatially or temporally) waveform, complex-OCPM extracts the phase as the argument of a complex number for each pixel of the image. Hence, complex-OCPM allows phase resolved measurement to fully utilize the spatial resolution of the imaging optics. In addition to a high spatial resolution, a high sensitivity in phase imaging is critical for the measurement of subtle motion, such as the measurement of cell dynamics or neural activities. Conventional quantitative phase imaging techniques based on phase shifting interferometry achieve a high spatial resolution at the cost of the temporal resolution, while complex-OCPM is advantageous in phase stability/sensitivity compared to phase shifting interferometry, because complex-OCPM does not rely on mechanical scanning. On the other hand, the sensitivity of phase measurement is fundamentally dependent on the signal to noise ratio (SNR) of the intensity measurement and is determined by the number of signal photons under shot noise limit. In complex-OCPM, a higher spatial resolution implies fewer photons contributing to individual resolution cells, resulting in a reduced phase sensitivity. This can be seen from the experimental results where complex-OCPM images have a lower apparent SNR compared to real-OCPM images. To improve phase sensitivity, the system 100 can synthesize the phase image by projecting more patterns to the SLM 172, taking more measurements and utilizing more photons to render the signal at individual pixels. Alternatively, the system 100 can impose SLM patterns that are adaptive to the characteristics of the sample and reconstruct the image using appropriate prior knowledge to improve phase measurement sensitivity. The capability of complex-OCPM in detecting subtle motion (phase change) over space and time can impact a broad range of applications.

Figure 30:
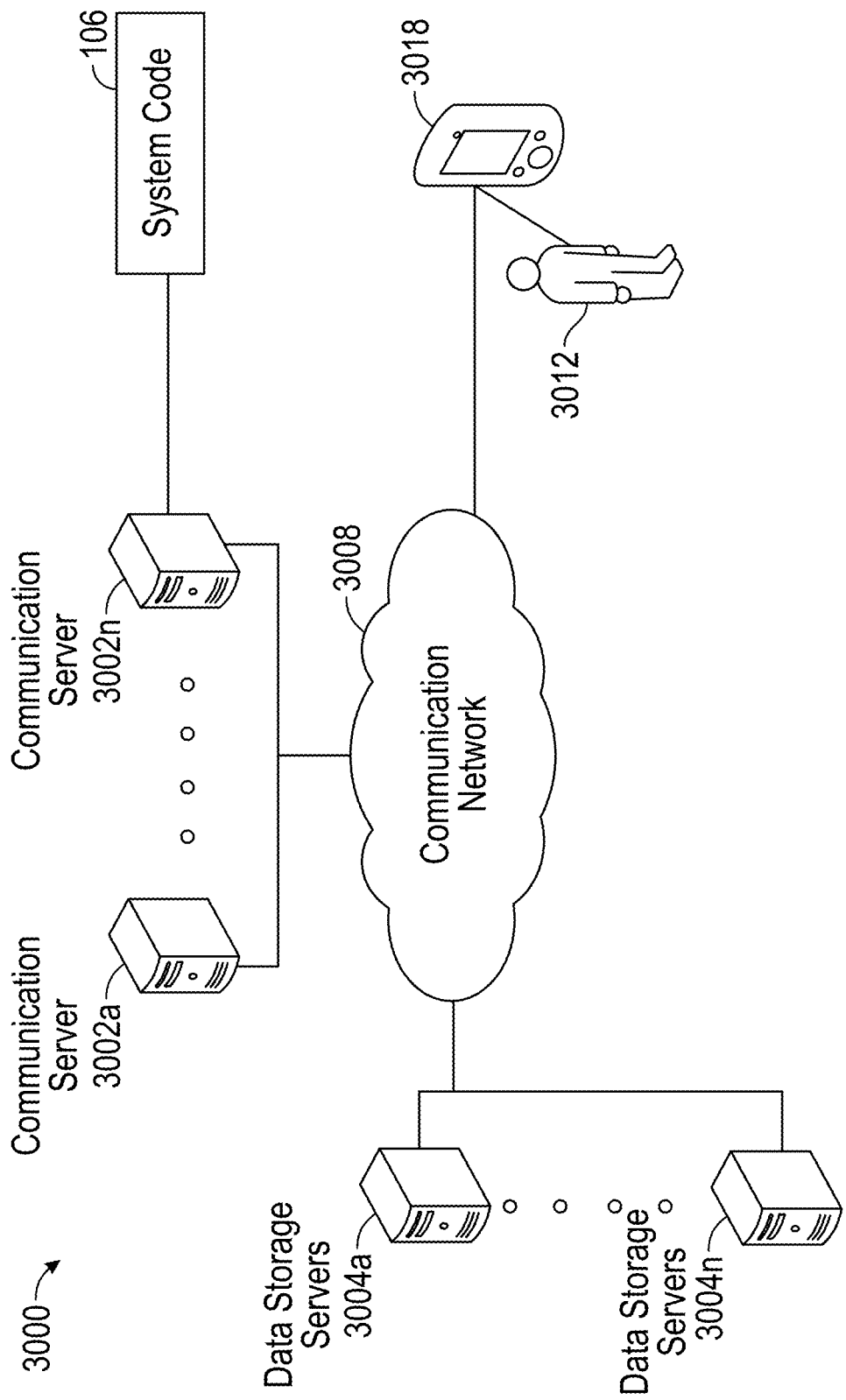
FIG. 30 is an example diagram illustrating computer hardware and network components on which the system can be implemented.

FIG. 30 is an example diagram illustrating computer hardware and network components on which the system 3000 can be implemented. The system 3000 can include a plurality of computation servers 3002a-3002n having at least one processor (e.g., one or more graphics processing units (GPUs), microprocessors, central processing units (CPUs), tensor processing units (TPUs), application-specific integrated circuits (ASICs), etc.) and memory for executing the computer instructions and methods described above (which can be embodied as system code 106). The system 3000 can also include a plurality of data storage servers 3004a-3004n for storing data. The computation servers 3002a-3002n, the data storage servers 3004a-3004n, and the user device 3010 can communicate over a communication network 3008. Of course, the system 3000 need not be implemented on multiple devices, and indeed, the system 3000 can be implemented on a single (e.g., a personal computer, server, mobile computer, smart phone, etc.) without departing from the spirit or scope of the present disclosure.

Figure 31:
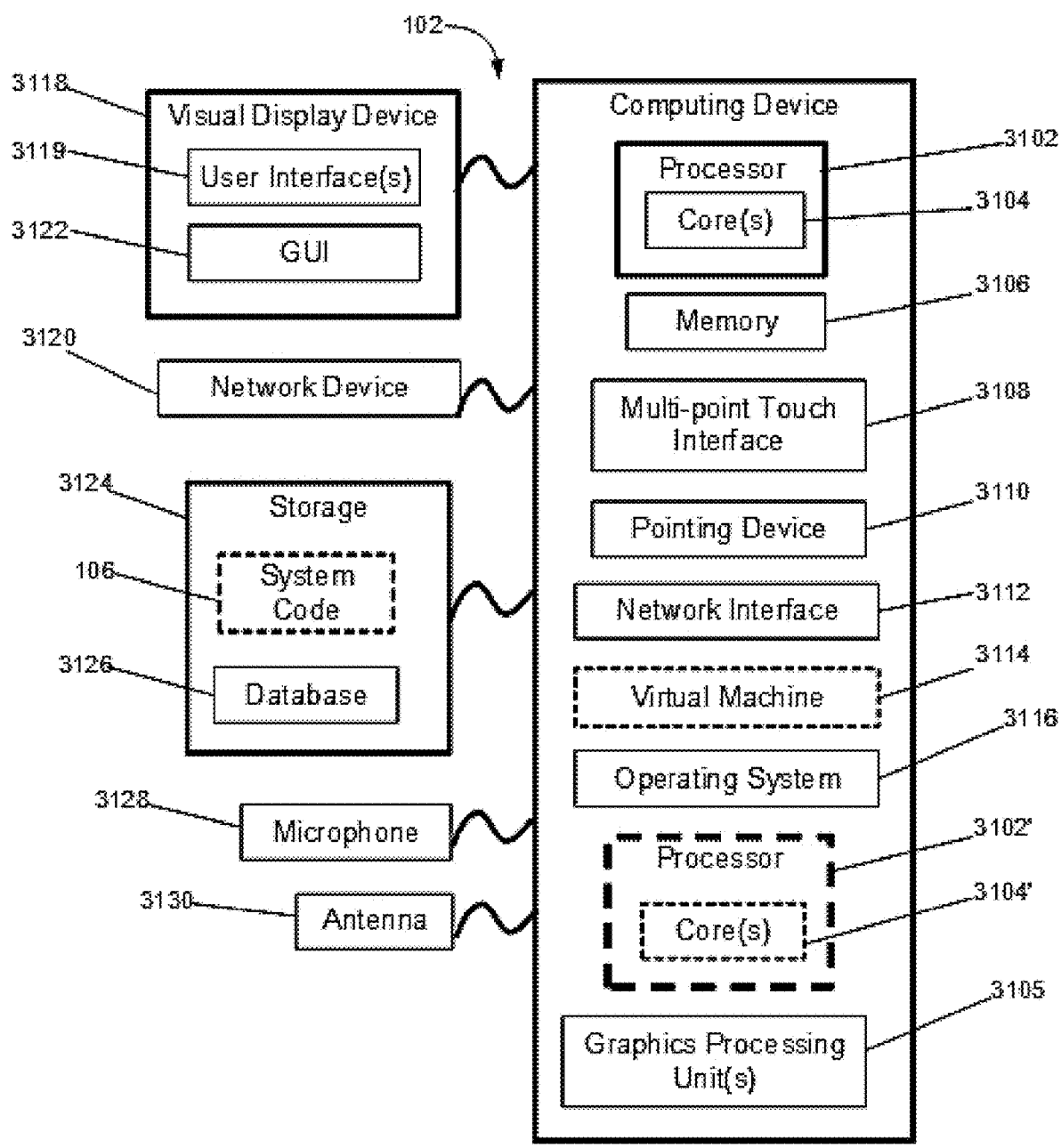
FIG. 31 is an example block diagram of an example computing device that can be used to perform one or more steps of the methods provided by example embodiments.

FIG. 31 is an example block diagram of an example computing device 102 that can be used to perform one or more steps of the methods provided by example embodiments. The computing device 102 includes one or more non-transitory computer-readable media for storing one or more computer-executable instructions or software for implementing example embodiments. The non-transitory computer-readable media can include, but are not limited to, one or more types of hardware memory, non-transitory tangible media (for example, one or more magnetic storage disks, one or more optical disks, one or more USB flash-drives), and the like. For example, memory 3106 included in the computing device 102 can store computer-readable and computer-executable instructions or software for implementing example embodiments. The computing device 102 also includes processor 3102 and associated core 3104, and optionally, one or more additional processor(s) 3102' and associated core(s) 3104' (for example, in the case of computer systems having multiple processors/cores), for executing computer-readable and computer-executable instructions or software stored in the memory 3106 and other programs for controlling system hardware. Processor 3102 and processor(s) 3102' can each be a single core processor or multiple core (3104 and 3104') processor. The computing device 102 also includes a graphics processing unit (GPU) 3105. In some embodiments, the computing device 102 includes multiple GPUs.

Virtualization can be employed in the computing device 102 so that infrastructure and resources in the computing device can be shared dynamically. A virtual machine 3114 can be provided to handle a process running on multiple processors so that the process appears to be using only one computing resource rather than multiple computing resources. Multiple virtual machines can also be used with one processor.

Memory 3106 can include a computer system memory or random access memory, such as DRAM, SRAM, EDO RAM, and the like. Memory 3106 can include other types of memory as well, or combinations thereof. A user can interact with the computing device 102 through a visual display device 3118, such as a touch screen display or computer monitor, which can display one or more user interfaces 3119. The visual display device 3118 can also display other aspects, transducers and/or information or data associated with example embodiments. The computing device 102 can include other I/O devices for receiving input from a user, for example, a keyboard or any suitable multi-point touch interface 3108, a pointing device 3110 (e.g., a pen, stylus, mouse, or trackpad). The keyboard 3108 and the pointing device 3110 can be coupled to the visual display device 3118. The computing device 102 can include other suitable conventional I/O peripherals.

The computing device 102 can also include one or more storage devices 3124, such as a hard-drive, CD-ROM, or other computer readable media, for storing data and computer-readable instructions, applications, and/or software that implements example operations/steps of the system (e.g., the systems 100 and 1000) as described herein, or portions thereof, which can be executed to generate user interface 3119 on display 3118. Example storage device 3124 can also store one or more databases for storing any suitable information required to implement example embodiments. The databases can be updated by a user or automatically at any suitable time to add, delete or update one or more items in the databases. Example storage device 3124 can store one or more databases 3126 for storing provisioned data, and other data/information used to implement example embodiments of the systems and methods described herein.

The system code 106 as taught herein may be embodied as an executable program and stored in the storage 3124 and the memory 3106. The executable program can be executed by the processor to perform the in-situ inspection as taught herein.

The computing device 102 can include a network interface 3112 configured to interface via one or more network devices 3122 with one or more networks, for example, Local Area Network (LAN), Wide Area Network (WAN) or the Internet through a variety of connections including, but not limited to, standard telephone lines, LAN or WAN links (for example, 802.11. T1, T3, 56 kb, X.25), broadband connections (for example, ISDN, Frame Relay, ATM), wireless connections, controller area network (CAN), or some combination of any or all of the above. The network interface 3112 can include a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 102 can run any operating system 3116, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In some embodiments, the operating system 3116 can be run in native mode or emulated mode. In some embodiments, the operating system 3116 can be run on one or more cloud machine instances.

It should be understood that the operations and processes described above and illustrated in the figures can be carried out or performed in any suitable order as desired in various implementations. Additionally, in certain implementations, at least a portion of the operations can be carried out in parallel. Furthermore, in certain implementations, less than or more than the operations described can be performed.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes multiple system elements, device components or method steps, those elements, components or steps may be replaced with a single element, component or step. Likewise, a single element, component or step may be replaced with multiple elements, components or steps that serve the same purpose. Moreover, while example embodiments have been shown and described with references to particular embodiments thereof, those of ordinary skill in the art will understand that various substitutions and alterations in form and detail may be made therein without departing from the scope of the present disclosure. Further still, other embodiments, functions and advantages are also within the scope of the present disclosure.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An optically computed phase imaging system comprising:
   an interferometer configured to output three-dimensional (3D) spatial-spectral data of a sample by superimposing reference light from a reference arm and sample light from a sample arm, wherein the 3D spatial-spectral data comprises an interferometric signal from the sample;
   an optical computation assembly comprising a spatial light modulator configured to modulate the 3D spatial-spectral data with a modulation pattern, wherein the modulation pattern modulates the interferometric signal along a spectral dimension to select a depth to obtain a sample signal at the selected depth and modulates the interferometric signal along a first spatial dimension to create a waveform to facilitate phase extraction;
   a detector configured to detect two-dimensional (2D) spatial data of the sample, wherein the 2D spatial data is an integral of the modulated 3D spatial-spectral data over the spectral dimension;
   a processor coupled to a memory, the processor configured to:
   generate the modulation pattern;
   control the spatial light modulator to project the modulation pattern for spectral and spatial modulations;
   receive the 2D spatial data from the detector; and
   process the 2D spatial data to extract phase information of the sample;
   wherein the modulation pattern produces a first sinusoidal modulation along the spectral dimension and a second sinusoidal modulation along the first spatial dimension.

2. The optically computed phase imaging system of claim 1, wherein the modulation pattern modulates the 3D spatial-spectral data along the spectral dimension by imposing the first sinusoidal modulation to the interferometric signal to obtain the sample signal at the selected depth, resulting in an inner product between the first sinusoidal modulation and the interferometric signal, wherein the modulation pattern modulates the 3D spatial-spectral data along the first spatial dimension by imposing the second sinusoidal modulation to the interferometric spectrum to create the waveform.

3. An optically computed phase imaging system comprising:
   an interferometer configured to output three-dimensional (3D) spatial-spectral data of a sample by superimposing reference light from a reference arm and sample light from a sample arm, wherein the 3D spatial-spectral data comprises an interferometric signal from the sample;

an optical computation assembly comprising a spatial light modulator configured to modulate the 3D spatial-spectral data with a modulation pattern, wherein the modulation pattern modulates the interferometric signal along a spectral dimension to select a depth to obtain a sample signal at the selected depth and modulates the interferometric signal along a first spatial dimension to create a waveform to facilitate phase extraction;

a detector configured to detect two-dimensional (2D) spatial data of the sample, wherein the 2D spatial data is an integral of the modulated 3D spatial-spectral data over the spectral dimension;

a processor coupled to a memory, the processor configured to:

generate the modulation pattern;

control the spatial light modulator to project the modulation pattern for spectral and spatial modulations;

receive the 2D spatial data from the detector; and process the 2D spatial data to extract phase information of the sample;

wherein the modulation pattern is generated by a Fourier basis function having a modulation parameter indicative of a density of fringes in the modulation pattern along the first spatial dimension, wherein the denser fringes in the modulation pattern produces a larger frequency shift in a spatial frequency domain.

4. An optically computed phase imaging system comprising:

an interferometer configured to output three-dimensional (3D) spatial-spectral data of a sample by superimposing reference light from a reference arm and sample light from a sample arm, wherein the 3D spatial-spectral data comprises an interferometric signal from the sample;

an optical computation assembly comprising a spatial light modulator configured to modulate the 3D spatial-spectral data with a modulation pattern, wherein the modulation pattern modulates the interferometric signal along a spectral dimension to select a depth to obtain a sample signal at the selected depth and modulates the interferometric signal along a first spatial dimension to create a waveform to facilitate phase extraction;

a detector configured to detect two-dimensional (2D) spatial data of the sample, wherein the 2D spatial data is an integral of the modulated 3D spatial-spectral data over the spectral dimension;

a processor coupled to a memory, the processor configured to:

generate the modulation pattern;

control the spatial light modulator to project the modulation pattern for spectral and spatial modulations;

receive the 2D spatial data from the detector; and process the 2D spatial data to extract phase information of the sample;

wherein the modulation pattern is a cosine pattern allowing the optically computed phase imaging system to take a measurement of a real part of a complex signal of the sample.

5. The optically computed phase imaging system of claim 1, wherein the optical computation assembly further comprises a diffraction grating configured to disperse the interferometric signal along a second spatial dimension, wherein the spatial light modulator modulates the interferometric signal after the interferometric signal is dispersed by the diffraction grating, wherein the modulated interferometric signal goes through the diffraction grating again before the detector detects the modulated interferometric signal such that the dispersion introduced during its previous passage is canceled out.

6. The optically computed phase imaging system of claim 1, wherein the processor is further configured to:

generate a 2D Fourier transform of the 2D spatial data;

process the 2D Fourier transform by at least one of spatial frequency domain filtering, bandpass filtering, or frequency shifting and scaling;

generate an inverse Fourier transform of the processed 2D Fourier transform to generate a spatial domain signal having the phase information and amplitude information of the sample;

estimate the phase information using the spatial domain signal; and estimate the amplitude information using the spatial domain signal.

7. The optically computed phase imaging system of claim 5, wherein the phase is an argument of the spatial domain signal and the amplitude is a magnitude of the spatial domain signal.

8. The optically computed phase imaging system of claim 1, wherein the processor is further configured to:

calculate a phase difference between a current frame and a previous frame; and determine a motion of a region of interest in the sample based on the phase difference.

9. The optically computed phase imaging system of claim 1, wherein the sample is label free.

10. The optically computed phase imaging system of claim 1, wherein the optically computed phase imaging system operates in a reflective mode to image transparent and non-transparent objects.

11. The optically computed phase imaging system of claim 1, wherein the processor is further configured to:

determine that the extracted phase is a wrapped phase that has phase wrapping artifacts;

determine a difference of the wrapped phase between neighboring sampling points along the first spatial dimension, a second spatial dimension, and a temporal dimension;

apply a wrapping operation to the difference of the wrapped phase to generate a wrapped phase difference; and determine a 3D unwrapped phase by minimizing a difference between a difference of unwrapped phase and the wrapped phase difference.

12. The optically computed phase imaging system of claim 11, wherein minimizing the difference uses a non-iterative and transform-based method.

13. The optically computed phase imaging system of claim 12, wherein the processor is further configured to:

generate a 3D discrete cosine transform of the wrapped phase difference;

apply a coefficient correction to the 3D discrete cosine transform; and estimate the 3D unwrapped phase by taking an inverse 3D discrete cosine transform on the corrected 3D discrete cosine transform.

14. The optically computed phase imaging system of claim 1, wherein the 3D spatial-spectral data comprises a complex optical signal of the sample, wherein the modulation pattern allows the optically computed phase imaging system to obtain a real part of the complex optical signal, and wherein the 2D spatial data comprises the real part of the complex optical signal, wherein the processor is further configured to:
generate an additional modulation pattern, wherein the additional modulation pattern allows the optically computed phase imaging system to take a direct measurement to obtain an imaginary part of the complex optical signal by modulating the 3D spatial-spectral data along the spectral dimension to obtain the sample signal at the selected depth and modulates the 3D spatial-spectral data along the first spatial dimension to create a different waveform;
control the spatial light modulator to project the additional modulation pattern;
control the detector to detect additional 2D spatial data associated with the additional modulation pattern, the additional 2D spatial data comprising the imaginary part of the complex optical signal;
receive the additional 2D spatial data; and
extract the phase information as an argument of the complex optical signal using the 2D spatial data and the additional 2D spatial data in absence of a signal processing to convert the 2D spatial data and the additional 2D spatial data from a spatial domain into a frequency domain.

15. The optically computed phase imaging system of claim 1, wherein the processor is further configured to:
calculate a temporal phase variation based on a square root of a mean square of a series of phase frames over a time period; and
determine a motion of a region of interest in the sample based on the temporal phase variation.

16. The optically computed phase imaging system of claim 1, wherein the processor is further configured to:
control the detector to detect a plurality of 2D spatial data over a time period, the plurality of 2D spatial data comprising time information associated with each 2D spatial data and the 2D spatial data;
receive the plurality of 2D spatial data;
process the plurality of 2D spatial data to extract phase information over the time period;
determine a phase difference between different 2D spatial data at different time slots; and
generate a Doppler image using the phase difference.

17. A method for optically computed phase imaging comprising:
superimposing reference light from a reference arm of an interferometer and sample light from a sample arm of the interferometer to output 3D spatial-spectral data of a sample, wherein the 3D spatial-spectral data comprises an interferometric signal from the sample;
modulating the 3D spatial-spectral data using a modulation pattern, wherein the modulation pattern modulates the interferometric signal along a spectral dimension to select a depth to obtain a sample signal at the selected depth and modulates the interferometric signal along a first spatial dimension to create a waveform to facilitate phase extraction;
detecting 2D spatial data of the sample, wherein the 2D spatial data is an integral of the modulated 3D spatial-spectral data over the spectral dimension; and
processing the 2D spatial data to extract phase information of the sample;
wherein the modulation pattern produces a first sinusoidal modulation along the spectral dimension and a second sinusoidal modulation along the first spatial dimension.

18. The method of claim 17, wherein the modulation pattern modulates the 3D spatial-spectral data along the spectral dimension by imposing the first sinusoidal modulation to the interferometric signal to obtain the sample signal at the selected depth, resulting in an inner product between the first sinusoidal modulation and the interferometric signal, wherein the modulation pattern modulates the 3D spatial-spectral data along the first spatial dimension by imposing the second sinusoidal modulation to the interferometric spectrum to create the waveform.

19. The method of claim 17, wherein the modulation pattern is generated by a Fourier basis function having a modulation parameter indicative of a density of fringes in the modulation pattern along the first spatial dimension, wherein the denser fringes in the modulation pattern produces a larger frequency shift in a spatial frequency domain.

20. The method of claim 17, wherein the modulation pattern is a cosine pattern allowing the optically computed phase imaging method to take a measurement of a real part of a complex signal of the sample.

21. The method of claim 17, further comprising:
dispersing the interferometric signal along a second spatial dimension prior to modulating the interferometric signal; and
dispersing the modulated interferometric signal prior to detecting the modulated interferometric signal such that the dispersion introduced during its previous passage is canceled out.

22. The method of claim 17, further comprising:
generating a 2D Fourier transform of the 2D spatial data;
processing the 2D Fourier transform by at least one of spatial frequency domain filtering, bandpass filtering, or frequency shifting and scaling;
generating an inverse Fourier transform of the processed 2D Fourier transform to generate a spatial domain signal having the phase information and amplitude information of the sample;
estimating the phase information using the spatial domain signal; and
estimating the amplitude information using the spatial domain signal.

23. The method of claim 22, wherein the phase is an argument of the spatial domain signal and the amplitude is a magnitude of the spatial domain signal.

24. The method of claim 17, further comprising:
calculating a phase difference between a current frame and a previous frame; and
determining a motion of a region of interest in the sample based on the phase difference.

25. The method of claim 17, further comprising:
determining that the extracted phase is a wrapped phase that has phase wrapping artifacts;
determining a difference of the wrapped phase between neighboring sampling points along the first spatial dimension, a second spatial dimension, and a temporal dimension;
applying a wrapping operation to the difference of the wrapped phase to generate a wrapped phase difference; and
determining a 3D unwrapped phase by minimizing a difference between a difference of unwrapped phase and the wrapped phase difference.

26. The method of claim 17, wherein the 3D spatial-spectral data comprises a complex optical signal of the sample, wherein the 2D spatial data comprises a real part of the complex optical signal, the method further comprising:

taking a direct measurement to obtain an imaginary part of the complex optical signal by using an additional modulation pattern to modulate the 3D spatial-spectral data along the spectral dimension to obtain the sample signal at the selected depth and modulate the 3D spatial-spectral data along the first spatial dimension to create a different waveform;

detecting additional 2D spatial data associated with the additional modulation pattern, the additional 2D spatial data comprising the imaginary part of the complex optical signal; and extracting the phase information as an argument of the complex optical signal using the 2D spatial data and the additional 2D spatial data in absence of a signal processing to convert the 2D spatial data and the additional 2D spatial data from a spatial domain into a frequency domain.

27. The method of claim 17, further comprising:

calculating a temporal phase variation based on a square root of a mean square of a series of phase frames over a time period; and determining a motion of a region of interest in the sample based on the temporal phase variation.

28. The method of claim 17, further comprising:

detecting a plurality of 2D spatial data over a time period, the plurality of 2D spatial data comprising time information associated with each 2D spatial data and the 2D spatial data;

processing the plurality of 2D spatial data to extract phase information over the time period;

determining a phase difference between different 2D spatial data at different time slots; and generating a Doppler image using the phase difference.

* * * * *